United States Patent
Hwang et al.

(10) Patent No.: US 11,343,730 B2
(45) Date of Patent: May 24, 2022

(54) METHOD AND APPARATUS FOR INTER-NODE COORDINATION FOR AUTO NEIGHBOR RELATION

(71) Applicant: Samsung Electronics Co., Ltd., Suwon-si (KR)

(72) Inventors: June Hwang, Suwon-si (KR); Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 16/696,951

(22) Filed: Nov. 26, 2019

(65) Prior Publication Data
US 2020/0169926 A1 May 28, 2020

(30) Foreign Application Priority Data

Nov. 26, 2018 (KR) .................. 10-2018-0147856

(51) Int. Cl.
*H04W 24/10* (2009.01)
*H04W 36/00* (2009.01)
(Continued)

(52) U.S. Cl.
CPC ........ *H04W 36/0079* (2018.08); *H04W 8/24* (2013.01); *H04W 24/10* (2013.01);
(Continued)

(58) Field of Classification Search
CPC ........ H04W 36/0079; H04W 36/0061; H04W 24/10; H04W 80/08; H04W 8/24;
(Continued)

(56) References Cited

U.S. PATENT DOCUMENTS

2009/0191862 A1* 7/2009 Amirijoo ............. H04W 36/14
  455/424
2011/0070897 A1  3/2011 Tang et al.
(Continued)

OTHER PUBLICATIONS

Nokia et al., "CR on MN/SN coordination for report CGI procedure", 3GPP TSG-RAN WG2 Meeting #104, Nov. 12-16, 2018, R2-1819059, 18 pages.
(Continued)

*Primary Examiner* — Chuong A Ngo

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method by a first base station, which includes receiving, from a second base station, a first message for requesting cell global identity (CGI) measurement; transmitting, to a terminal, a second message including configuration information for the CGI measurement based on the first message; and transmitting, to the second base station, a third message including a measurement report based on the configuration information.

16 Claims, 35 Drawing Sheets

(51) Int. Cl.
   H04W 80/08   (2009.01)
   H04W 8/24    (2009.01)
   H04W 80/02   (2009.01)
   H04W 76/11   (2018.01)

(52) U.S. Cl.
   CPC ........ *H04W 36/0061* (2013.01); *H04W 76/11* (2018.02); *H04W 80/02* (2013.01); *H04W 80/08* (2013.01)

(58) Field of Classification Search
   CPC ..... H04W 80/02; H04W 76/11; H04W 92/20; H04W 24/02
   See application file for complete search history.

(56) References Cited

U.S. PATENT DOCUMENTS

| 2013/0122909 | A1* | 5/2013 | Takahashi | H04W 24/00 |
| | | | | 455/436 |
| 2013/0143550 | A1* | 6/2013 | Ostrup | H04W 24/08 |
| | | | | 455/424 |
| 2014/0106756 | A1 | 4/2014 | Amirijoo et al. | |
| 2017/0086131 | A1* | 3/2017 | Gupta | H04W 36/0061 |
| 2018/0007591 | A1 | 1/2018 | Xu et al. | |

OTHER PUBLICATIONS

Vivo, "Report of email discussion [101 bis#47][NR] ANR", 3GPP TSG-RAN WG2 Meeting #102, May 21-25, 2018, R2-1807626, 19 pages.

Ericsson, "Cell Global Identity and strongest measured cell(s) (ANR)", 3GPP TSG-RAN WG2 Meeting #103bis, Oct. 8-12, 2018, R2-1814108, 2 pages.

International Search Report dated Mar. 3, 2020 in connection with International Patent Application No. PCT/KR2019/016399, 3 pages.

Written Opinion of the International Searching Authority dated Mar. 3, 2020 in connection with International Patent Application No. PCT/KR2019/016399, 5 pages.

\* cited by examiner

FIG. 2FA

TypeI-SinglePanelCodebook — 2f-05

| | | |
|---|---|---|
| maxNumberTxPortsPerResource | ENUMERATED {p2, p4, p8, p12, p16, p24, p32}, | |
| maxNumberResources | INTEGER (1..64), | 2f-30 |
| totalNumberTxPorts | INTEGER (2..256), | |
| supportedCodebookMode | ENUMERATED {mode1, mode2andMode2}, | 2f-55 |
| maxNumberCSI-RS-PerResourceSet | INTEGER (1..8) | |

TypeI-MultiPanelCodebook — 2f-10

| | | |
|---|---|---|
| maxNumberTxPortsPerResource | ENUMERATED {p8, p16, p32}, | |
| maxNumberResources | INTEGER (1..64), | 2f-35 |
| totalNumberTxPorts | INTEGER (2..256), | |
| supportedCodebookMode | ENUMERATED {mode1, mode2, both}, | |
| supportedNumberPanels | ENUMERATED {n2, n4}, | 2f-60 |
| maxNumberCSI-RS-PerResourceSet | INTEGER (1..8) | |

TypeII-Codebook — 2f-15

| | | |
|---|---|---|
| maxNumberTxPortsPerResource | ENUMERATED {p4, p8, p12, p16, p24, p32}, | |
| maxNumberResources | INTEGER (1..64), | 2f-40 |
| totalNumberTxPorts | INTEGER (2..256), | |
| parameterLx | INTEGER (2..4), | |
| amplitudeScalingType | ENUMERATED {wideband, widebandAndSubband}, | 2f-65 |
| amplitudeSubsetRestriction | ENUMERATED {supported} | |

FIG. 2FB

TypeII-CodebookPortSelection

| | | |
|---|---|---|
| maxNumberTxPortsPerResource | ENUMERATED {p4, p8, p12, p16, p24, p32}, | 2f-45 |
| maxNumberResources | INTEGER (1..64), | |
| totalNumberTxPorts | INTEGER (2..256), | |
| parameterLx | INTEGER (2..4), | 2f-70 |
| amplitudeScalingType | ENUMERATED {wideband, widebandAndSubband} | |

2f-20

SRS-AssocCSI-RS

| | | |
|---|---|---|
| maxNumberTxPortsPerResource | ENUMERATED {p2, p4, p8, p12, p16, p24, p32}, | 2f-50 |
| maxNumberResources | INTEGER (1..64), | |
| totalNumberTxPorts | INTEGER (2..256) | |

2f-25

METHOD AND APPARATUS FOR INTER-NODE COORDINATION FOR AUTO NEIGHBOR RELATION

CROSS-REFERENCE TO RELATED APPLICATION

This application is based on and claims priority under 35 U.S.C. 119 to Korean Patent Application No. 10-2018-0147856 filed on Nov. 26, 2018, in the Korean Intellectual Property Office, the disclosure of which is herein incorporated by reference in its entirety.

BACKGROUND

1. Field

The disclosure relates to a method for inter-node coordination for auto neighbor relation in a wireless communication system.

Further, the disclosure relates to a mobile communication system, which particularly includes a method by a terminal for reporting its own capability, for example, an overall process of reporting a default value, in order to be supported with a feedback operation based on channel state information (CSI) codebook in a MIMO function newly defined in NR.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the development of mobile communication systems and those as described above, various services can be provided, and thus schemes for effectively providing such services have been demanded.

SUMMARY

The disclosure relates to a method by a terminal for performing an operation for collecting one piece of auto neighbor relation information at one moment through coordination between base stations in a dual connection (DC) structure in order for a base station to make an auto neighbor relation (ARN).

One embodiment of the disclosure provides an apparatus and a method capable of effectively providing services in a mobile communication system.

Another embodiment of the disclosure manages a method by an applicable terminal for configuring and reporting a default value, for example, in the case where CSI codebook information is not transferred to a base station in relation to a method by a NR terminal for reporting its own capability related to CSI.

According to an embodiment of the disclosure, by sending and receiving a mark for performing an auto neighbor relation operation between base stations, it can be avoided that the respective base stations simultaneously configure the auto neighbor relation to a terminal.

According to an embodiment of the disclosure, a terminal is made to perform one auto neighbor relation operation at a specific time in a mobile communication system, and thus the terminal can be prevented from performing an operation beyond capability of the terminal.

According to another embodiment of the disclosure, if a NR terminal does not report CSI codebook related capability, it becomes vague what configuration is to be applied as a default value, and the disclosure can solve this problem in a manner that even if the terminal does not report the CSI codebook related information, a network can understand the capability of the terminal through the default value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1FB illustrates a diagram of the configuration for a default terminal configuration state in the disclosure;

FIG. 1O illustrates a flowchart of a method by a first base station according to an embodiment of the disclosure;

FIG. 2FA illustrates a diagram explaining arrangement of terminal report parameters in accordance with a CSI codebook type in a NR system;

FIG. 2FB illustrates a diagram explaining arrangement of terminal report parameters in accordance with a CSI codebook type in a NR system;

FIG. 2GB illustrates a diagram explaining embodiment 1 that is a candidate of a CSI codebook related UE capability report method in a NR system to which the disclosure is applied;

FIG. 2HB illustrates a diagram explaining embodiment 2 that is a candidate of a CSI codebook related UE capability report method in a NR system to which the disclosure is applied;

FIG. 2O illustrates a diagram of the block configuration of a base station according to an embodiment of the disclosure.

DETAILED DESCRIPTION

First Embodiment

Figure 1A:
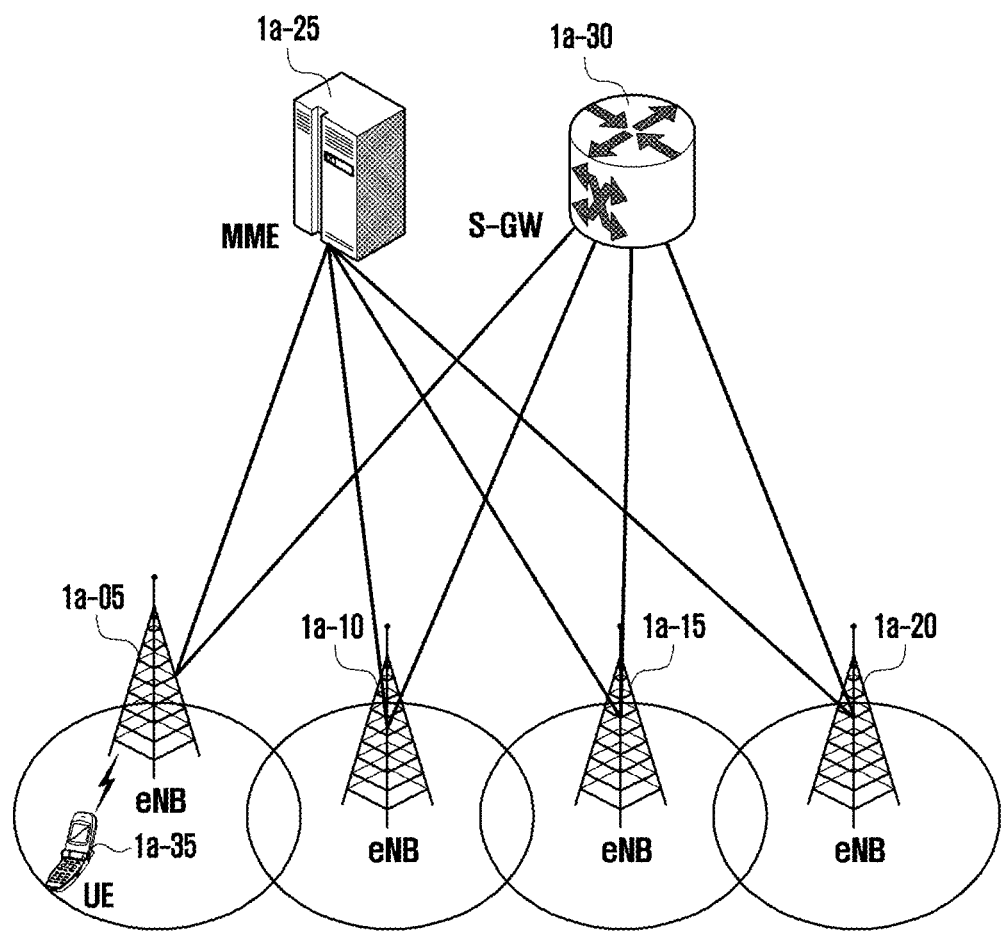
FIG. 1A illustrates a diagram of the structure of an LTE system according to some embodiments of the disclosure.

FIGS. 1A through 2O, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience in explanation, in the disclosure, terms and names defined in the 3rd Generation Partnership Project Long Term Evolution (3GPP LTE) standards are used. However, the disclosure is not restricted by the terms and names, and it may be equally applied to systems complying with other standards.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card. Further, in an embodiment, "~unit" may include one or more processors.

In describing the disclosure, a detailed description of a related known function or configuration will be omitted if it is deemed to make the gist of the disclosure unnecessarily vague. Embodiments of the disclosure are described hereinafter with reference to the accompanying drawings.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used. For example, in the following description, the term "terminal" may call a MAC entity in the terminal existing for each master cell group (MCG) and each secondary cell group (SCG).

For convenience in explanation, in the disclosure, terms and names defined in the 3rd Generation Partnership Project Long Term Evolution (3GPP LTE) standards are used. However, the disclosure is not restricted by the terms and names, and it may be equally applied to systems complying with other standards.

Hereinafter, the base station is the subject that performs resource allocation to the terminal, and it may be at least one of gNode B, eNode B, Node B, base station (BS), radio access unit, base station controller, or node on a network. The terminal may include user equipment (UE), mobile station (MS), cellular phone, smart phone, computer, or multimedia system capable of performing a communication function. However, the base station and the terminal are not limited to those as exemplified above.

In particular, the disclosure may be applied to a 3GPP NR (5th-generation mobile communication standard). Further, the disclosure may be applied to intelligent services based on the 5G communication technology and the IoT-related technology, such as smart home, smart building, smart city, smart car, connected car, health care, digital education, retail, security and safety related services. In the disclosure, for convenience in explanation, the eNB may be interchangeably used with the gNB. That is, the base station being explained as eNB may indicate the gNB. Further, the term "terminal" may indicate a cellular phone, NB-IoT devices, sensors, or other wireless communication devices.

A wireless communication system was initially developed for the purpose of providing a voice-oriented service, but has been expanded to, for example, a broadband wireless communication system that provides a high-speed and high-quality packet data service like the communication standards, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e.

In the LTE system that is a representative example of the broadband wireless communication systems, the downlink (DL) adopts an orthogonal frequency division multiplexing (OFDM) scheme, and the uplink (UL) adopts single carrier frequency division multiple access (SC-FDMA) scheme. The uplink means a radio link in which a terminal (or user equipment (UE) or a mobile station (MS)) transmits data or a control signal to a base station (BS) (or eNode B), and the downlink means a radio link in which the base station transmits data or a control signal to the terminal. According to the above-described multiple access schemes, data of respective users or control information can be discriminated from each other by performing an allocation and an operation so as to prevent time-frequency resources for carrying the data or control information for each user from overlapping each other, that is, to establish orthogonality.

In a 5G communication system that is beyond an LTE communication system, it is necessary to freely reflect various requirements of users and service providers, and services simultaneously satisfying the various requirements should be supported. Services being considered for the 5G communication system may be enhanced mobile broadband (eMBB), massive machine type communication (mMTC), and ultra-reliability low-latency communication (URLLC).

According to some embodiments, the eMBB may aim at providing of more improved data rate than the data rate supported by the existing LTE, LTE-A, or LTE-Pro. For example, in the 5G communication system, it is required that, from the viewpoint of one base station, the eMBB provides a peak data rate of 20 Gbps on downlink and a peak data rate of 10 Gbps on uplink. Further, the 5G communication system should provide a user perceived data rate of increased terminals simultaneously with providing the peak data rate. In order to satisfy such requirements, improvement of various transmission/reception technologies including more improved multi input multi output (MIMO) transmission technology may be required. Further, it becomes possible to satisfy the data rate required in the 5G communication system by using a frequency bandwidth that is wider than 20 MHz in the frequency band of 3 to 6 GHz or 6 GHz whereas in the current LTE, signal transmission is performed using the maximum transmission bandwidth of 20 MHz in the 2 GHz band.

At the same time, in order to support application services, such as Internet of things (IoT), in the 5G communication system, the mMTC is under consideration. In order to efficiently provide the Internet of things in the mMTC, massive terminal access support, terminal coverage improvement, improved battery time, and terminal cost reduction are required in a cell. Since the Internet of things is attached to various sensors and appliances to provide communication functions, it should support a large number of terminals (e.g., 1,000,000 terminals/km$^2$) in the cell. Further, since there is a high possibility that a terminal supporting the mMTC is located in a shaded area that is unable to be covered by the cell, such as underground of a building, due to the characteristics of the service, a wider coverage is demanded as compared with other services. The terminal supporting the mMTC should be configured as an inexpensive terminal, and since it is difficult to frequently replace a battery of the terminal, a very long battery life time, such as 10 to 15 years, may be required.

Last, the URLLC is a cellular-based wireless communication service that is used for a specific purpose (mission-critical), and it is used for remote control of a robot or machinery, industrial automation, unmanned aerial vehicle, remote health care, and emergency alert. Accordingly, the URLLC should provide very low latency (ultra-low latency) and very high reliability (ultra-reliability) communications.

For example, a service supporting the URLLC should satisfy air interface latency that is shorter than 0.5 millisecond and packet error rate requirements of $10^{-5}$ or less at the same time. Accordingly, for the service supporting the URLLC, the 5G system should provide a transmit time interval (TTI) that is shorter than that of other services, and it may require design matters that should allocate wide resources in the frequency band in order to secure reliability of a communication link at the same time.

Three kinds of services, that is, eMBB, URLLC, and mMTC, that are considered in the above-described 5G communication system may be multiplexed and transmitted by one system. In this case, in order to satisfy different requirements of the respective services, different transmission/reception techniques and transmission/reception parameters may be used between the services. However, the above-described mMTC, URLLC, and eMBB are merely examples of different service types, and the service types to which the disclosure is applied are not limited to those as exemplified above.

Hereinafter, although embodiments of the disclosure will be described in a state where the LTE, LTE-A, LTE-Pro, or 5G (or NR, next-generation mobile communication) is exemplified, they may also be applied even to other communication systems having similar technical backgrounds or channel types. Further, embodiments of the disclosure may also be applied to other communication systems through partial modifications thereof within the range that does not greatly deviate from the scope of the disclosure.

FIG. 1A illustrates a diagram of the structure of an LTE system according to some embodiments of the disclosure.

With reference to FIG. 1A, as illustrated, a radio access network of an LTE system may be composed of evolved node Bs (hereinafter, "ENBs", "node Bs", or "base stations") 2a-05, 2a-10, 2a-15, and 2a-20, a mobility management entity (MME) 2a-25, and a serving-gateway (S-GW) 2a-30. User equipment (hereinafter, "UE" or "terminal") 2a-35 may access to an external network through the ENBs 2a-05 to 2a-20 and the S-GW 2a-30.

In FIG. 1A, the ENBs 2a-05 to 2a-20 may correspond to existing node Bs of a UMTS system. The ENBs are connected to the UE 2a-35 on a radio channel, and may play a more complicated role than that of the existing node B. In the LTE system, since all user traffics including a real-time service, such as a voice over Internet protocol (VoIP) through an Internet protocol, are serviced on shared channels. Accordingly, devices performing scheduling through summarization of state information, such as a buffer state, an available transmission power state, and a channel state of each UE, may be necessary, and the ENBs 2a-05 to 2a-20 may take charge of this. In general, one ENB controls a plurality of cells. For example, in order to implement a transmission speed of 100 Mbps, the LTE system uses, for example, orthogonal frequency division multiplexing (OFDM) in a bandwidth of 20 MHz as a radio access technology. Further, the LTE system adopts an adaptive modulation & coding (AMC) scheme that determines a modulation scheme and a channel coding rate to match the channel state of the terminal. The S-GW 2a-30 is a device that provides a data bearer, and it may generate or remove the data bearer under the control of the MME 2a-25. The MME is a device that takes charge of not only mobility management of the terminal but also various kinds of control functions, and it may be connected to the plurality of ENBs.

Figure 1B:
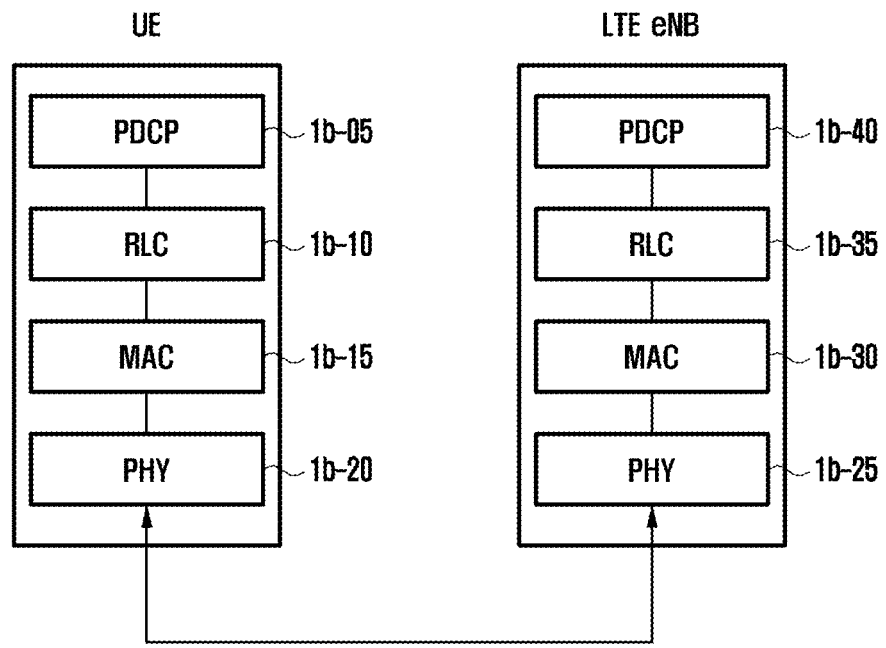
FIG. 1B illustrates a diagram of a radio protocol structure of an LTE system according to some embodiments of the disclosure.

FIG. 1B illustrates a diagram of a radio protocol structure of an LTE system according to some embodiments of the disclosure.

With reference to FIG. 1B, in UE or an ENB, a radio protocol of an LTE system may include a packet data convergence protocol (PDCP) 2b-05 or 2b-40, a radio link control (RLC) 2b-10 or 2b-35, and a medium access control (MAC) 2b-15 or 2b-30. The PDCP may take charge of IP header compression/decompression operations. The main functions of the PDCP may be summarized as follows. Of course, they are not limited to those as exemplified below.

Header compression and decompression: ROHC only
 Transfer of user data
 In-sequence delivery of higher layer PDUs at a PDCP reestablishment procedure for an RLC AM
 For split bearers in DC (only support for an RLC AM): PDCP PDU routing for transmission and PDCP PDU reordering for reception
 Duplicate detection of lower layer SDUs at a PDCP reestablishment procedure for an RLC AM
 Retransmission of PDCP SDUs at handover and, for split bearers in DC, of PDCP PDUs at a PDCP data-recovery procedure, for an RLC AM
 Ciphering and deciphering
 Timer-based SDU discard in an uplink According to some embodiments, the radio link control (RLC) 2b-10 or 2b-35 reconfigures a PDCP packet data unit (PDU) with a proper size, and it may perform an ARQ operation and the like. The main functions of the RLC may be summarized as follows. Of course, they are not limited to those as exemplified below.

Transfer of higher layer PDUs
 Error correction through an ARQ (only for AM data transfer)
 Concatenation, segmentation, and reassembly of RLC SDUs (only for UM and AM data transfer)
 Re-segmentation of RLC data PDUs (only for AM data transfer)
 Reordering of RLC data PDUs (only for UM and AM data transfer)
 Duplicate detection (only for UM and AM data transfer)
 Protocol error detection (only for AM data transfer)
 RLC SDU discard (only for UM and AM data transfer)
 RLC reestablishment According to some embodiments, the MAC 2b-15 or 2b-30 is connected to several RLC layer devices configured in one terminal, and it may perform multiplexing/demultiplexing of RLC PDUs into/from MAC PDU. The main functions of the MAC are summarized as follows. Of course, they are not limited to those as exemplified below.

Mapping between logical channels and transport channels
 Multiplexing/demultiplexing of MAC SDUs belonging to one or different logical channels into/from transport blocks (TB) delivered to/from the physical layer on transport channels
 Scheduling information reporting
 HARQ function (error correction through HARQ)
 Priority handling between logical channels of one UE
 Priority handling between UEs by means of dynamic scheduling
 MBMS service identification
 Transport format selection
 padding According to some embodiments, the physical layer 2b-20 or 2b-25 may perform channel coding and modulation of higher layer data to configure and transmit OFDM symbols on a radio channel, or it may perform demodulation and channel decoding of the OFDM symbols received on the radio channel to transfer the demodulated and channel-decoded symbols to a higher layer. Of course, its operation is not limited to that as exemplified below.

Figure 1C:
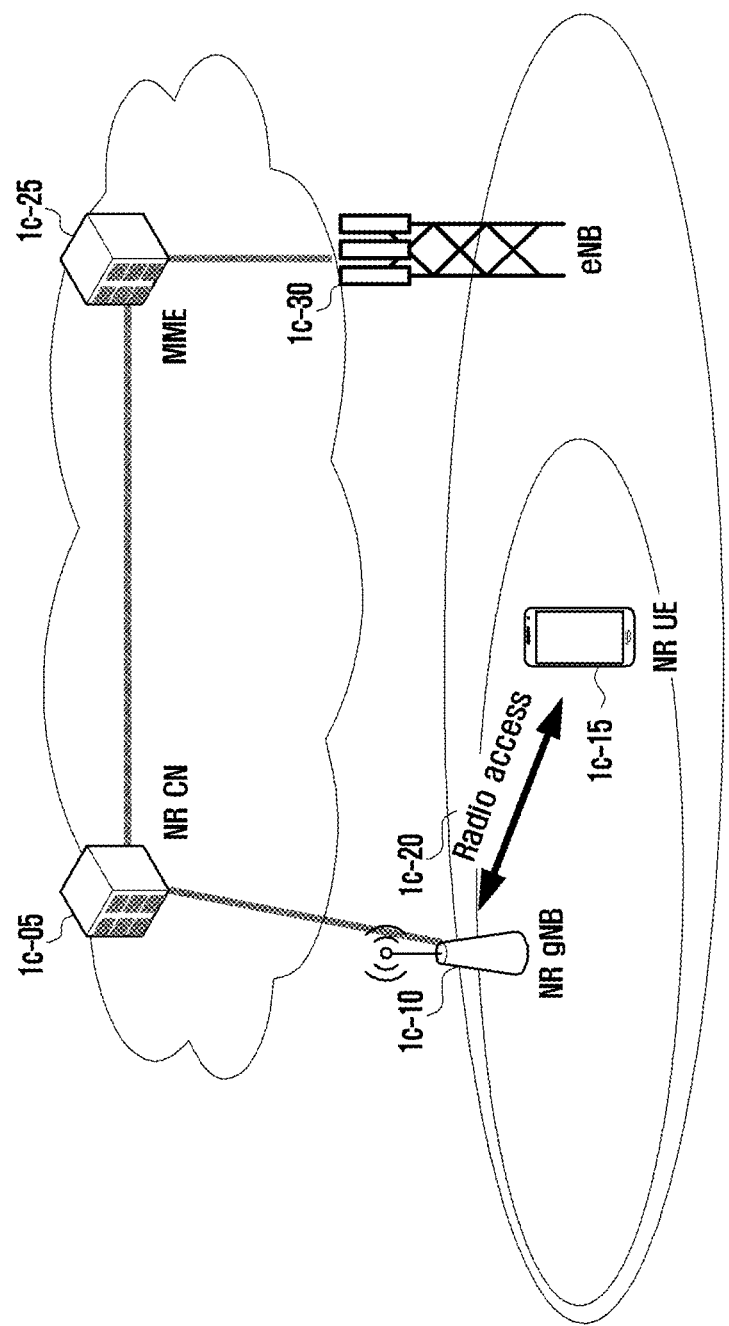
FIG. 1C illustrates a diagram of the structure of a next-generation mobile communication system according to some embodiments of the disclosure.

FIG. 1C illustrates a diagram of the structure of a next-generation mobile communication system according to some embodiments of the disclosure.

With reference to FIG. 1C, a radio access network of a next-generation mobile communication system (hereinafter, "NR" or "5G") may be composed of a new radio node B (hereinafter, "NR gNB" or "NR ENB") 1c-10 and a new radio core network (NR CN) 1c-05. A new radio user equipment (hereinafter, "NR UE" or "terminal") 1c-15 may access to an external network through the NR gNB 1c-10 and the NR CN 1c-05.

In FIG. 1C, the NR gNB 1c-10 may correspond to an evolved node B (eNB) of the existing LTE system. The NR gNB may be connected to the NR UE 1c-15 on a radio channel, and thus it can provide a more superior service than the service of the existing node B. In the next-generation mobile communication system, all user traffics may be serviced on shared channels. Accordingly, a device that performs scheduling through consolidation of state information, such as a buffer state of UEs, an available transmission power state, and a channel state, may be required, and the NR NB 1c-10 may take charge of this. One NR gNB may control a plurality of cells. In order to implement ultrahigh-speed data transmission as compared with the existing LTE, a bandwidth that is equal to or higher than the existing maximum bandwidth may be applied in the next-generation mobile communication system. Further, a beamforming technology may be additionally used in consideration of the orthogonal frequency division multiplexing (OFDM) as a radio access technology.

Further, the NR gNB may adopt an adaptive modulation & coding (hereinafter referred to as "AMC") scheme determining a modulation scheme and a channel coding rate to match the channel state of the UE. The NR CN 1c-05 may perform functions of mobility support, bearer setup, and QoS configuration. The NR CN 1c-05 is a device that takes charge of not only a mobility management function of the UE but also various kinds of control functions, and it may be connected to a plurality of ENBs. Further, the next-generation mobile communication system may interlock with the existing LTE system, and the NR CN may be connected to an MME 1c-25 through a network interface. The MME may be connected to an eNB 1c-30 that is the existing base station.

Figure 1D:
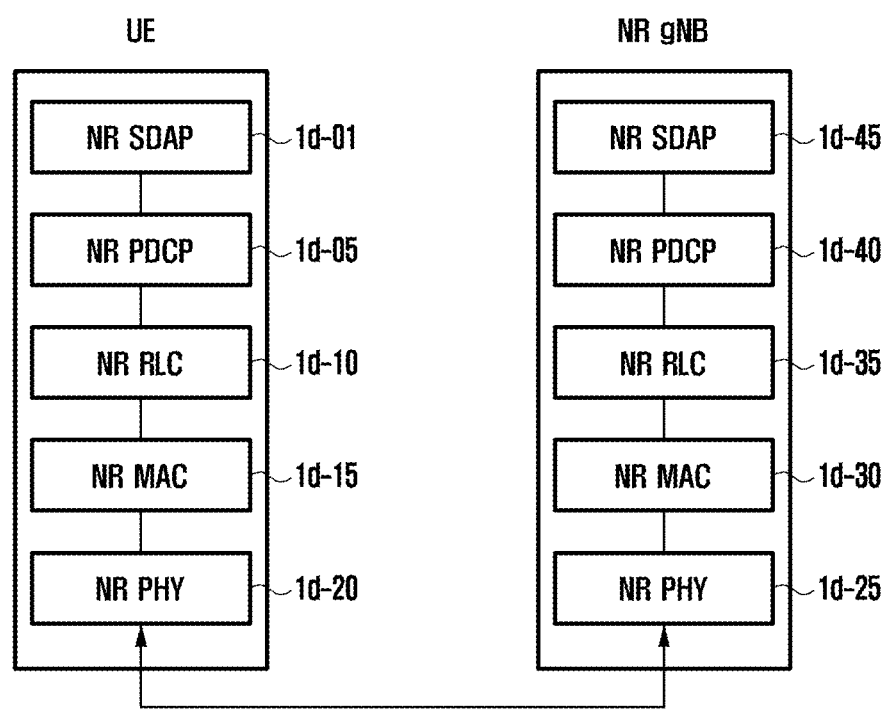
FIG. 1D illustrates a diagram of a radio protocol structure of a next-generation mobile communication system according to some embodiments of the disclosure.

FIG. 1D illustrates a diagram of a radio protocol structure of a next-generation mobile communication system according to some embodiments of the disclosure.

With reference to FIG. 1D, in UE or NR eNB, a radio protocol of the next-generation mobile communication system may include a service data adaptation protocol (SDAP) 1d-01 or 1d-45, NR PDCP 1d-05 or 1d-40, NR RLC 1d-10 or 1d-35, and NR MAC 1d-15 or 1d-30.

According to some embodiments, the main functions of the NR SDAP 1d-01 or 1d-45 may include parts of the following functions. However, they are not limited to those as exemplified below.
  Transfer of user plane data
  Mapping between a QoS flow and a DRB for both DL and UL
  Marking QoS flow ID in both DL and UL packets
  Reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through a radio resource control (RRC) message. Further, if the SDAP header is configured, the UE may indicate that the UE can update and reconfigure mapping information on uplink and downlink QoS flow and the data bearer through a non-access stratum (NAS) quality of service (QoS) reflective configuration 1-bit indicator (NAS reflective QoS) and an access stratum (AS) QoS reflective configuration 1-bit indicator (AS reflective QoS). According to some embodiments, the SDAP header may include QoS flow ID information indicating the QoS. According to some embodiments, the QoS information may be used as a data processing priority for supporting a smooth service, scheduling information, and the like.

According to some embodiments, the main functions of the NR PDCP 1d-05 or 1d-40 may include parts of the following functions. However, they are not limited to those as exemplified below.
  Header compression and decompression: ROHC only
  Transfer of user data
  In-sequence delivery of higher layer PDUs
  Out-of-sequence delivery of higher layer PDUs
  PDCP PDU reordering for reception
  Duplicate detection of lower layer SDUs
  Retransmission of PDCP SDUs
  Ciphering and deciphering
  Timer-based SDU discard in an uplink As described above, reordering of the NR PDCP device may mean reordering of PDCP PDUs received from a lower layer based on PDCP sequence numbers (SNs). The reordering of the NR PDCP device may include transfer of data to a higher layer in the order of reordering, immediate transfer without considering the order, recording of lost PDCP PDUs through reordering, status report for the lost PDCP PDUs to a transmission side, and retransmission request for the lost PDCP PDUs.

According to some embodiments, the main functions of the NR RLC 1d-10 or 1d-35 may include parts of the following functions. However, they are not limited to those as exemplified below.
  Transfer of higher layer PDUs
  In-sequence delivery of higher layer PDUs
  Out-of-sequence delivery of higher layer PDUs
  Error correction through an ARQ
  Concatenation, segmentation, and reassembly of RLC SDUs
  Re-segmentation of RLC data PDUs
  Reordering of RLC data PDUs
  Duplicate detection
  Protocol error detection
  RLC SDU discard
  RLC reestablishment As described above, in-sequence delivery of NR RLC device may mean in-sequence delivery of RLC SDUs received from a lower layer to a higher layer. In the case where one original RLC SDU is segmented into several RLC SDUs to be received, the in-sequence delivery of the NR RLC device may include reassembly and delivery of the RLC SDUs.

The in-sequence delivery of the NR RLC device may include reordering of the received RLC PDUs based on an RLC sequence number (SN) or a PDCP sequence number (SN), recording of lost RLC PDUs through reordering, status report for the lost RLC PDUs to a transmission side, retransmission request for the lost PDCP PDUs.

The in-sequence delivery of the NR RLC device may include in-sequence delivery of only RLC SDUs just before the lost RLC SDU to a higher layer if there is the lost RLC SDU.

The in-sequence delivery of the NR RLC device may include in-sequence delivery of all RLC SDUs received before a specific timer starts its operation to a higher layer if the timer has expired although there is the lost RLC SDU.

The in-sequence delivery of the NR RLC device may include in-sequence delivery of all RLC SDUs received up to now to a higher layer if a specific timer has expired although there is the lost RLC SDU.

The NR RLC device may process RLC PDUs in the order of their reception, and it may transfer the processed RLC PDUs to the NR PDCP device in an out-of-sequence delivery manner.

In the case of receiving segments, the NR RLC device may receive the segments stored in a buffer or to be received later, reconfigure them as one complete RLC PDU, and then transfer the reconfigured RLC PDU to the NR PDCP device.

The NR RLC layer may not include a concatenation function, and the function may be performed by an NR MAC layer or it may be replaced by a multiplexing function of the NR MAC layer.

As described above, the out-of-sequence delivery of the NR RLC device may mean a function of transferring the RLC SDUs received from a lower layer directly to a higher layer regardless of their order. If one original RLC SDU is segmented into several RLC SDUs to be received, the out-of-sequence delivery of the NR RLC device may include reassembly and delivery of the RLC SDUs. The out-of-sequence delivery of the NR RLC device may include functions of storing and ordering the RLC SNs or PDCP SNs of the received RLC PDUs and recording of the lost RLC PDUs.

According to some embodiments, the NR MAC 1d-15 or 1d-30 may be connected to several NR RLC layer devices configured in one UE, and the main functions of the NR MAC may include parts of the following functions. However, they are not limited to those as exemplified below.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
padding The NR PHY layer 1d-20 or 1d-25 may perform channel coding and modulation of higher layer data to configure and transmit OFDM symbols on a radio channel, or it may perform demodulation and channel decoding of the OFDM symbols received on the radio channel to transfer the demodulated and channel-decoded symbols to a higher layer.

Figure 1E:
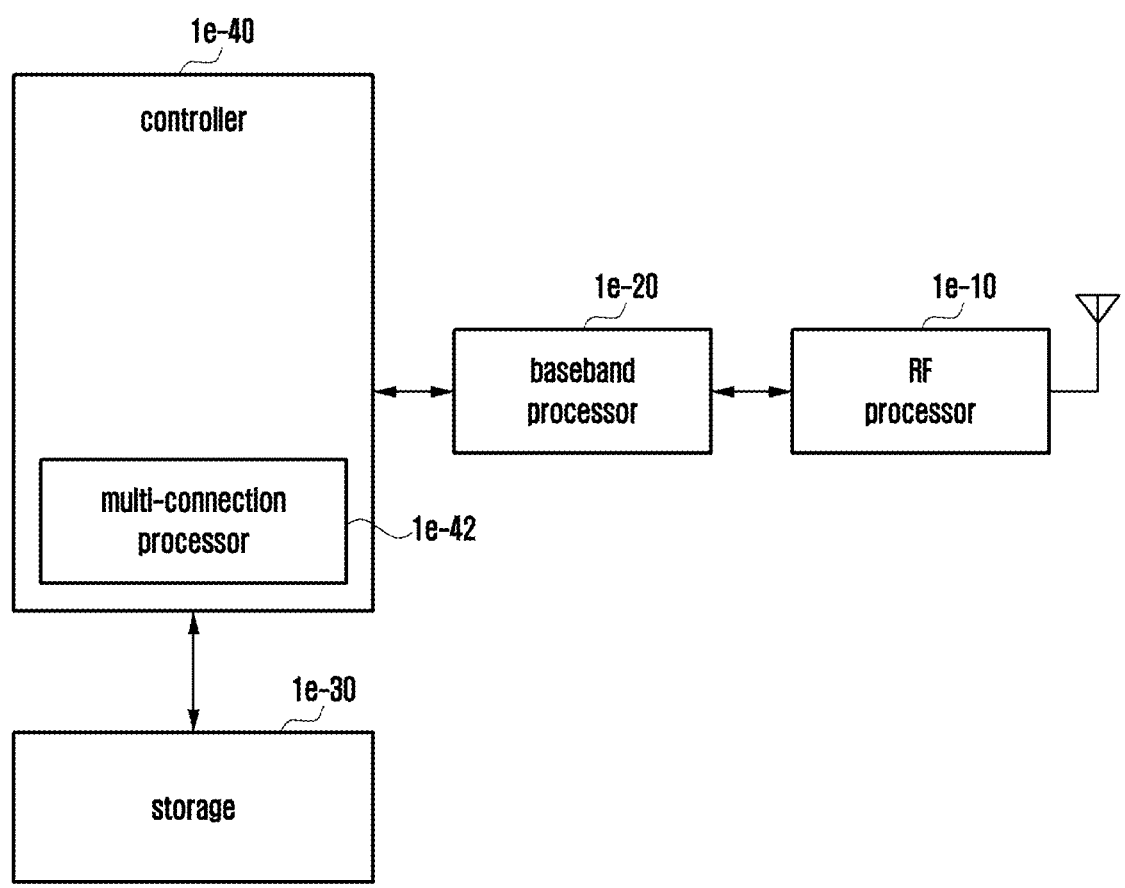
FIG. 1E illustrates a block diagram of the internal structure of a terminal according to some embodiments of the disclosure.

FIG. 1E illustrates a block diagram of the internal structure of a terminal according to some embodiments of the disclosure.

With reference to FIG. 1E, a terminal may include a radio frequency (RF) processor 1e-10, a baseband processor 1e-20, a storage unit 1e-30, and a controller 1e-40. Of course, the configuration of the terminal is not limited to that as exemplified above, and the terminal may include a configuration that is smaller than or larger than the configuration as illustrated in FIG. 1E.

The RF processor 1e-10 may perform a function for transmitting and receiving a signal through a radio channel, such as signal band conversion and amplification. That is, the RF processor 1e-10 may perform up-conversion of a baseband signal provided from the baseband processor 1e-20 into an RF band signal to transmit the converted signal through an antenna, and it may perform down-conversion of the RF band signal received through the antenna into a baseband signal. For example, the RF processor 1e-10 may include a transmission filter, a reception filter, an amplifier, a mixer, an oscillator, a digital-to-analog converter (DAC), and an analog-to-digital converter (ADC). Although only one antenna is illustrated in FIG. 1E, the terminal may be provided with a plurality of antennas. Further, the RF processor 1e-10 may include a plurality of RF chains. Further, the RF processor 1e-10 may perform beamforming. For the beamforming, the RF processor 1e-10 may adjust phases and sizes of signals transmitted or received through the plurality of antennas or antenna elements. Further, the RF processor may perform multi input multi output (MIMO), and it may receive several layers during performing of the MIMO operation.

The baseband processor 1e-20 performs conversion between a baseband signal and a bit string in accordance with the physical layer standard of the system. For example, during data transmission, the baseband processor 1e-20 generates complex symbols by encoding and modulating a transmitted bit string. Further, during data reception, the baseband processor 1e-20 may restore a received bit string by demodulating and decoding the baseband signal provided from the RF processor 1e-10. For example, in the case of following an orthogonal frequency division multiplexing (OFDM) scheme, during data transmission, the baseband processor 1e-20 may generate complex symbols by encoding and modulating a transmitted bit string, perform mapping of the complex symbols on subcarriers, and then configure OFDM symbols through an inverse fast Fourier transform (IFFT) operation and cyclic prefix (CP) insertion. Further, during data reception, the baseband processor 1e-20 may divide the baseband signal provided from the RF processor 1e-10 in the unit of OFDM symbols, restore the signals mapped on the subcarriers through a fast Fourier transform (FFT) operation, and then restore the received bit string through demodulation and decoding.

As described above, the baseband processor 1e-20 and the RF processor 1e-10 transmit and receive the signals. The baseband processor 1e-20 and the RF processor 1e-10 may be called a transmitter, a receiver, a transceiver, or a communication unit. Further, in order to support different radio access technologies, at least one of the baseband processor 1e-20 and the RF processor 1e-10 may include a plurality of communication modules. Further, in order to process signals of different frequency bands, at least one of the baseband processor 1e-20 and the RF processor 1e-10 may include different communication modules. For example, the different radio access technologies may include a wireless LAN (e.g., IEEE 802.11) and a cellular network (e.g., LTE). Further, the different frequency bands may include super high frequency (SHF) (e.g., 2.NR Hz or NR Hz) band and millimeter wave (mmWave) (e.g., 60 GHz) band. The terminal can transmit and receive a signal to and from the base station, and the signal may include control information and data.

The storage unit 1e-30 stores therein a basic program for an operation of the terminal, application programs, and data such as setup information. In particular, the storage unit 1e-30 may store information related to a second access node that performs wireless communication using a second radio access technology. Further, the storage unit 1e-30 provides stored data in accordance with a request from the controller 1e-40. The storage unit 1e-30 may be composed of storage media, such as ROM, RAM, hard disk, CD-ROM, and DVD, or a combination of the storage media. Further, the storage unit 1e-30 may be composed of a plurality of memories.

The controller 1e-40 controls the overall operation of the terminal. For example, the controller 1e-40 may control to transmit and receive signals through the baseband processor 1e-20 and the RF processor 1e-10. Further, the controller 1e-40 records or reads data in or from the storage unit 1e-30. For this, the controller 1e-40 may include at least one processor. For example, the controller 1e-40 may include a communication processor (CP) performing a control for communication and an application processor (AP) controlling a higher layer, such as an application program. Further, at least one configuration in the terminal may be implemented by one chip.

Figure 1F:
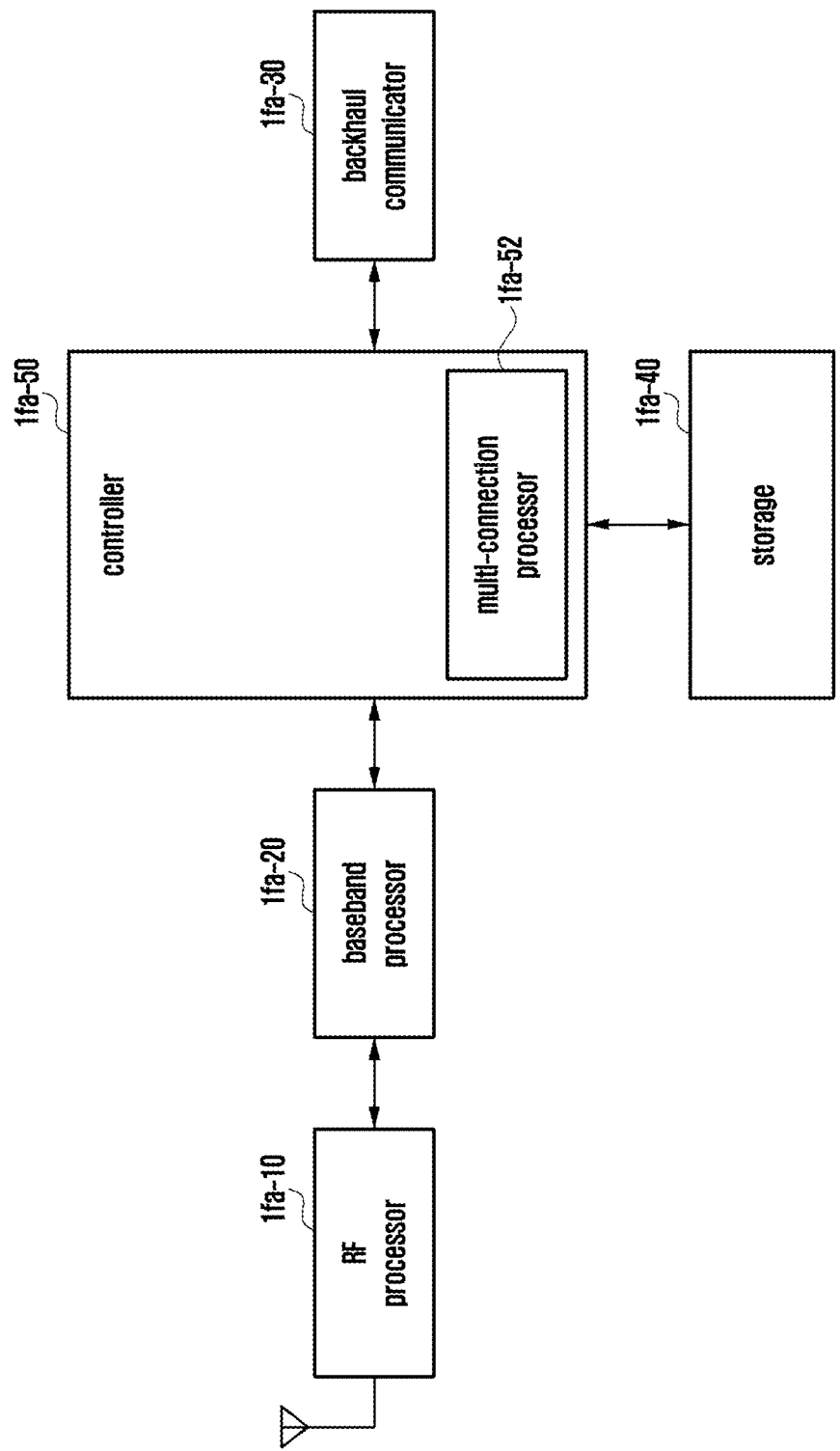
FIG. 1FA illustrates a block diagram of the configuration of a NR base station according to some embodiments of the disclosure.
Figure 1F:
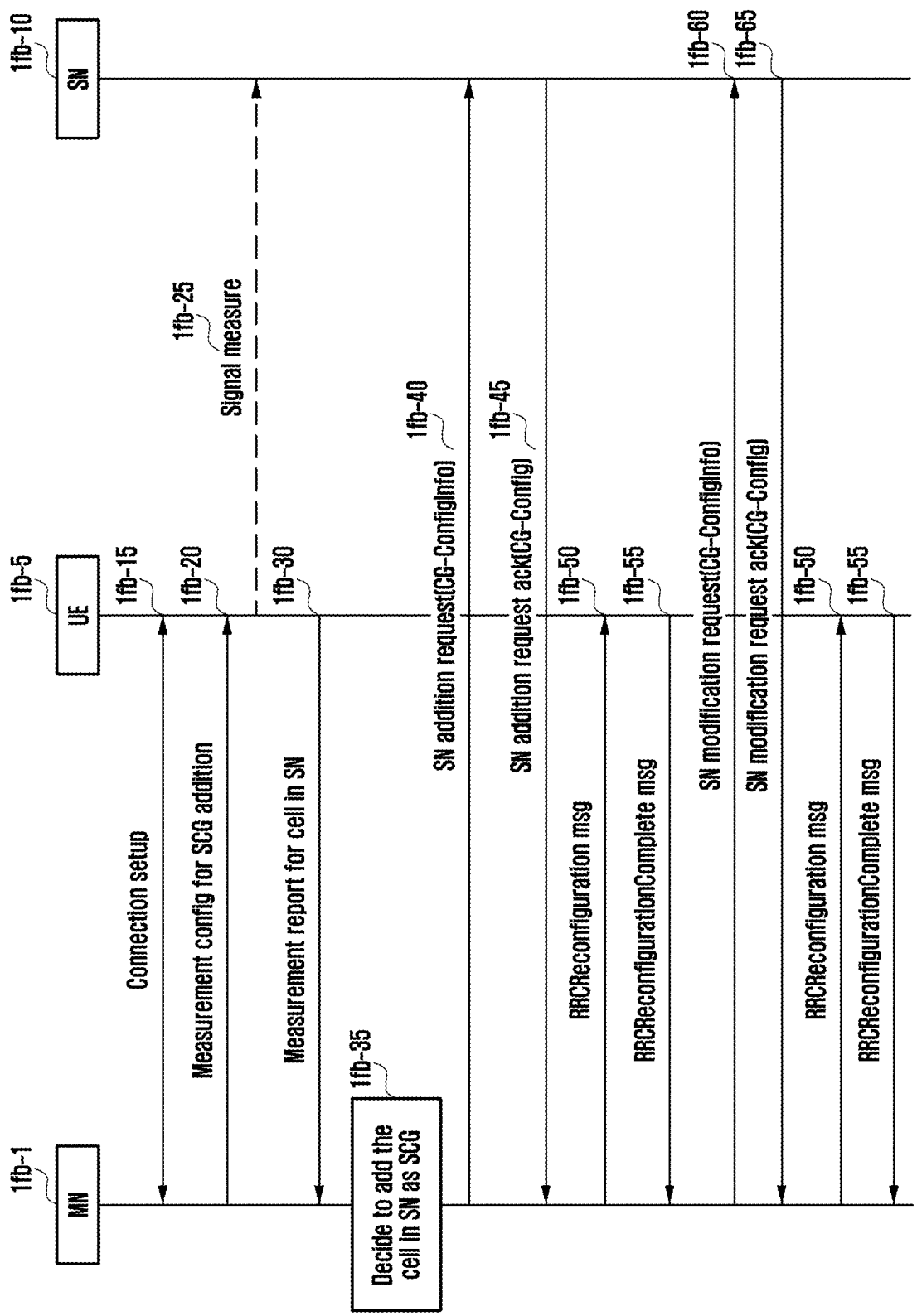

FIG. 1FA illustrates a block diagram of the configuration of a NR base station according to some embodiments of the disclosure.

With reference to FIG. 1FA, a base station may include a RF processor 1fa-10, a baseband processor 1fa-20, a backhaul communication unit 1fa-30, a storage unit 1fa-40, and a controller 1fa-50. Of course, the configuration of the base station is not limited to that as exemplified above, and the base station may include a configuration that is smaller than or larger than the configuration as illustrated in FIG. 1FA.

The RF processor 1fa-10 may perform a function for transmitting and receiving a signal through a radio channel, such as signal band conversion and amplification. That is, the RF processor 1fa-10 performs up-conversion of a baseband signal provided from the baseband processor 1fa-20 into an RF band signal to transmit the converted signal through an antenna, and performs down-conversion of the RF band signal received through the antenna into a baseband signal. For example, the RF processor 1fa-10 may include a transmission filter, a reception filter, an amplifier, a mixer, an oscillator, a DAC, and an ADC. Although only one antenna is illustrated in FIG. 1FA, the RF processor 1fa-10 may be provided with a plurality of antennas. Further, the RF processor 1fa-10 may include a plurality of RF chains. Further, the RF processor 1fa-10 may perform beamforming. For the beamforming, the RF processor 1fa-10 may adjust phases and sizes of signals transmitted or received through the plurality of antennas or antenna elements. The RF processor may perform down MIMO operation through transmission of one or more layers.

The baseband processor 1fa-20 may perform conversion between a baseband signal and a bit string in accordance with the physical layer standard of a first radio access technology. For example, during data transmission, the baseband processor 1fa-20 may generate complex symbols by encoding and modulating a transmitted bit string. Further, during data reception, the baseband processor 1fa-20 may restore a received bit string by demodulating and decoding the baseband signal provided from the RF processor 1fa-10. For example, in the case of following an OFDM scheme, during data transmission, the baseband processor 1fa-20 generates complex symbols by encoding and modulating a transmitted bit string, performs mapping of the complex symbols on subcarriers, and then configures OFDM symbols through an IFFT operation and CP insertion. Further, during data reception, the baseband processor 1fa-20 may divide the baseband signal provided from the RF processor 1fa-10 in the unit of OFDM symbols, restore the signals mapped on the subcarriers through a FFT operation, and then restore the received bit string through demodulation and decoding. The baseband processor 1fa-20 and the RF processor 1fa-10 may transmit and receive the signals as described above. Accordingly, the baseband processor 1fa-20 and the RF processor 1fa-10 may be called a transmitter, a receiver, a transceiver, or a wireless communication unit. The base station may transmit and receive a signal to and from the terminal using the base station processor 1fa-20 and the RF processing unit 1fa-10, and the signal may include control information and data.

The backhaul communication unit 1fa-30 provides an interface for performing communication with other nodes in the network. That is, the backhaul communication unit 1fa-30 may convert a bit string transmitted from a primary base station to another node, for example, an auxiliary base station or a core network, into a physical signal, and it may convert a physical signal received from the other node into a bit string. The backhaul communication unit 1fa-30 may be included in a communication unit.

The storage unit 1fa-40 stores therein a basic program for an operation of the base station, application programs, and data such as setup information. The storage unit 1fa-40 may store information on a bearer allocated to the connected terminal and the measurement result reported from the connected terminal. Further, the storage unit 1fa-40 may store information that becomes a basis of determination whether to provide or suspend a multi-connection to the terminal. Further, the storage unit 1fa-40 provides stored data in accordance with a request from the controller 1fa-50. The storage unit 1fa-40 may be composed of storage media, such as ROM, RAM, hard disk, CD-ROM, and DVD, or a combination of the storage media. Further, the storage unit 1fa-40 may be composed of a plurality of memories. According to some embodiments, the storage unit 1fa-40 may store a program for performing a buffer state report method according to the disclosure.

The controller 1fa-50 controls the overall operation of the base station. For example, the controller 1fa-50 transmits and receives signals through the baseband processor 1fa-40 and the RF processor 1fa-10 or through the backhaul communication unit 1fa-30. Further, the controller 1fa-50 records or reads data in or from the storage unit 1fa-40. For this, the controller 1fa-50 may include at least one processor. Further, at least one configuration of the base station may be implemented by one chip.

FIG. 1FB illustrates a diagram of a case where a terminal that is the basic premise of an operation of the disclosure has a configuration in EUTRA-NR dual connectivity (EN-DC) or multi-RAT dual connectivity (MRDC) state. First, a terminal 1fb-5 may create an RRC connection with a master node (MN) 1fb-1 (1fb-15). Then, if necessary, the MN 1fb-1 may perform SCG addition. For this, the MN 1fb-1 may make measurement configuration to the terminal 1fb-5 by transmitting frequency information including a cell of a SN 1fb-10 (1fb-20). The terminal 1fb-5 having received the measurement configuration may perform measurement of the cell of the SN 1fb-10 (1fb-25). Further, the terminal 1fb-5 may transfer the result of the measurement performance to the MN 1fb-1 (1fb-30). Through this, the MN 1fb-1 may determine whether it can add the corresponding cell to the SCG. If the MN 1fb-1 has determined to add the corresponding cell to the SCG (1fb-35), it may transfer SCG configuration information demanded by the terminal 1fb-5 to the SN 1fb-10. In this case, a SN addition request message may be used as an X2/Xn message, and as an inter-node RRC message, CG-ConfigInfo may be included in the message. For example, the CG-ConfigInfo message is a terminal-specific message, and it may be transferred from the MN 1*fb*-1 to the SN 1*fb*-10 (1*fb*-40). The SN 1*fb*-10 having received the message may put the result of applying the SCG configuration information included in the corresponding SN addition request and information to be actually configured to the corresponding terminal 1*fb*-5 determined by the SN 1*fb*-10 in a SN addition request ack message to be transferred to the MN 1*fb*-1. In this case, in the SN addition request ack message, configuration information determined by the SN 1*fb*-10 to be applied to the corresponding terminal may be transmitted by an inter-node RRC message that is the CG-Config message. In the same manner as the CG-ConfigInfo, the CG-Config message is a terminal-specific message, and it may be transferred from the SN 1*fb*-10 to the MN 1*fb*-1 (1*fb*-45). Thereafter, the MN 1*fb*-1 may put the information to be configured to the terminal and transferred through the CG-Config message in an RRCReconfiguration message to be transferred to the terminal 1*fb*-5 (1*fb*-50). The terminal 1*fb*-5 may send an RRCReconfigurationComplete message to the MN 1*fb*-1 as a response after applying the corresponding configuration (1*fb*-55). Through the above-described process, the terminal 1*fb*-5 may complete the ENDC or MRDC configuration with the MN 1*fb*-1 and the SN 1*fb*-10.

Meanwhile, if the terminal 1*fb*-5 is to change the SCG configuration with the SN 1*fb*-10 after making the RRC connection, the MN 1*fb*-1 may transfer the X2/Xn message of the SN modification request received from the MN 1*fb*-1 to the SN 1*fb*-10. Then, if the SN 1*fb*-10 has confirmed this, the terminal 1*fb*-5 may respond to the MN 1*fb*-1 with the X2/Xn message of the SN modification request ack. In this case, the CG-ConfigInfo may be included in the SN modification request message (1*fb*-60), and the CG-Config message may be included in the SN modification request ack message (1*fb*-65).

All the following embodiments and drawings may be on the assumption that the ENDC or MRDC configuration has been configured with respect to a specific terminal. Further, because the SN addition/modification request including the CG-ConfigInfo or CG-config messages and the ack message with respect to the messages are signaled through terminal discrimination, it is considered that the CG-ConfigInfo or CG-config messages have already been in association with the specific terminal. Further, the expression "to operate or perform the automatic neighbor relation (ANR)" to be described below may include operations in which the base station indicates the measurement through report configuration of reportCGI to the terminal, and the terminal performs the measurement according to the corresponding configuration, reports the result of the measurement when the measurement has succeeded, or reports the result due to expiration of a related timer, to cause the base station to receive the report. In this case, of which cell the cell global identity (CGI) is reported is a matter of indifference. For example, the PCI of the cell to perform the reportCGI is a matter of indifference.

Figure 1G:
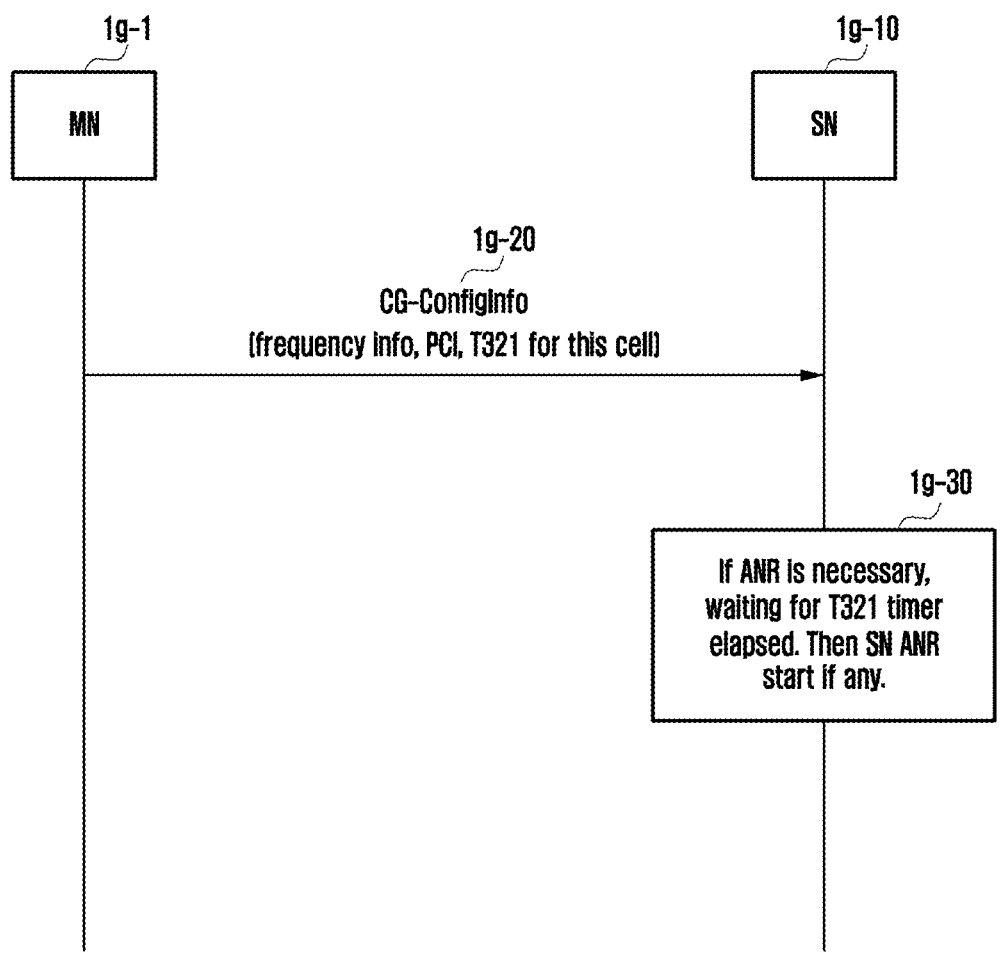
FIG. 1G illustrates a diagram explaining a case where MN notifies SN of performing of an automatic neighbor relation (ANR) according to some embodiments of the disclosure.

FIG. 1G illustrates a diagram of an embodiment in which MN 1*g*-1 notifies SN 1*g*-10 of performing of ANR with respect to a certain terminal according to some embodiments of the disclosure. A master node (MN) 1*g*-1 is in dual connection relation with a secondary node (SN) 1*g*-10. Whenever the MN intends to perform ANR with respect to the terminal, it may notify the SN of performing of the ANR. Specifically, the MN may transfer, to the SN, at least one of a PCI of a target cell, frequency information in which a target cell exists, or T321 values that are measurement duration timer information of the ANR of the target cell as information of the target cell to perform the ANR in the CG-ConfigInfo message (1*g*-20). In the case where the SN 1*g*-10 having received the information should currently perform its own ANR with respect to the terminal, the SN waits for the T321 value given from the MN 1*g*-1, and if the corresponding time elapses or if the timer having the T321 value and being operated by the SN 1*g*-10 expires (the timer starts at the latest time when the ANR information is received from the SN 1*g*-10), the SN 1*g*-10 may perform its own ANR (1*g*-30). The SN 1*g*-10 may restart the timer always based on the reception of the ANR performance information of the MN 1*g*-1 recently received. If the corresponding timer expires, the SN 1*g*-10 may perform its own ANR. As another embodiment, if the message 1*g*-20 is signaled without the T321 timer value, the MN 1*g*-1 may display the ANR end using 1-bit indicator in the CG-ConfigInfo message after a specific time when the ANR operation that the MN makes the terminal perform with respect to the corresponding frequency information and the PCI is ended. If this indication is received, the SN 1*g*-10 may not perform the ANR of the SN after the T321 time as in the process 1*g*-30, but it may make the terminal perform the ANR of the SN 1*g*-10 from the time when the 1-bit indicator is received.

Figure 1H:
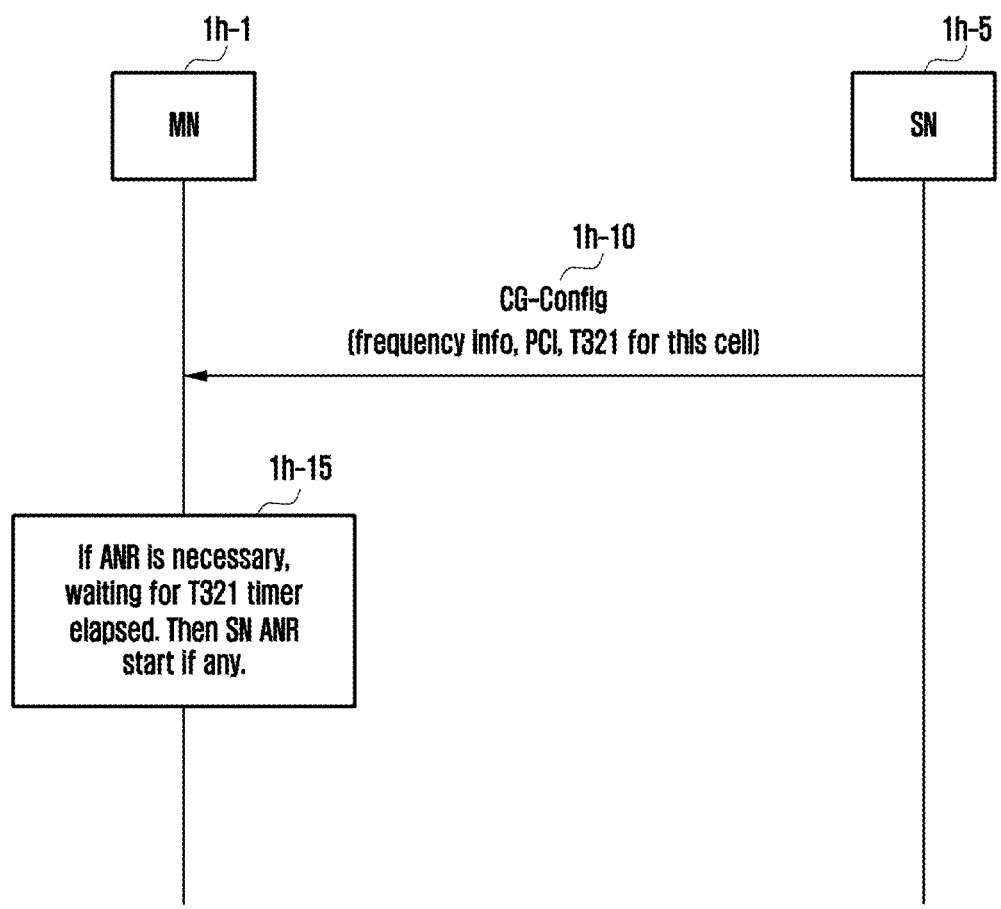
FIG. 1H illustrates a diagram explaining a case where SN notifies MN of performing of ANR according to some embodiments of the disclosure.

FIG. 1H illustrates a diagram explaining a case where SN 1*h*-5 notifies MN 1*h*-01 of performing of ANR with respect to a certain terminal according to some embodiments of the disclosure. The SN 1*h*-5 is in dual connection relation with the MN 1*h*-1. Whenever the SN 1*h*-5 intends to perform the ANR with respect to the terminal, it may notify the MN 1*h*-1 of the performing of the ANR. For this, the SN 1*h*-5 may transfer, to the MN 1*h*-1, at least one of a PCI of a target cell, frequency information in which a target cell exists, or T321 values that are measurement duration timer information of the ANR of the target cell as information of the target cell to perform the ANR in the CG-Config message (1*h*-10). In the case where the MN 1*h*-1 having received the information should currently perform its own ANR with respect to the specific terminal, the MN may wait for the T321 value given from the SN 1*h*-5, and if the corresponding time elapses or if the timer having the T321 value and being operated by the MN expires (the timer starts at the latest time when the ANR information is received from the SN 1*h*-5), the MN 1*h*-1 may perform its own ANR (1*h*-5). The MN 1*h*-1 may restart the timer always based on the reception of the ANR performance information of the SN 1*h*-5 recently received, and if the corresponding timer expires, the MN 1*h*-1 may perform its own ANR. As another embodiment, if the message 1*h*-10 is signaled without the T321 timer value, the SN 1*h*-5 may display the ANR end as 1-bit indicator in the CG-ConfigInfo message after a specific time when the ANR operation that the SN makes the terminal perform with respect to the corresponding frequency information and the PCI is ended. If this indication is received, the MN 1*h*-1 may not perform the ANR of the MN after the T321 time as in the process 1*g*-30, but it may make the terminal perform the ANR of the MN 1*h*-1 from the time when the 1-bit indicator is received.

Figure 1I:
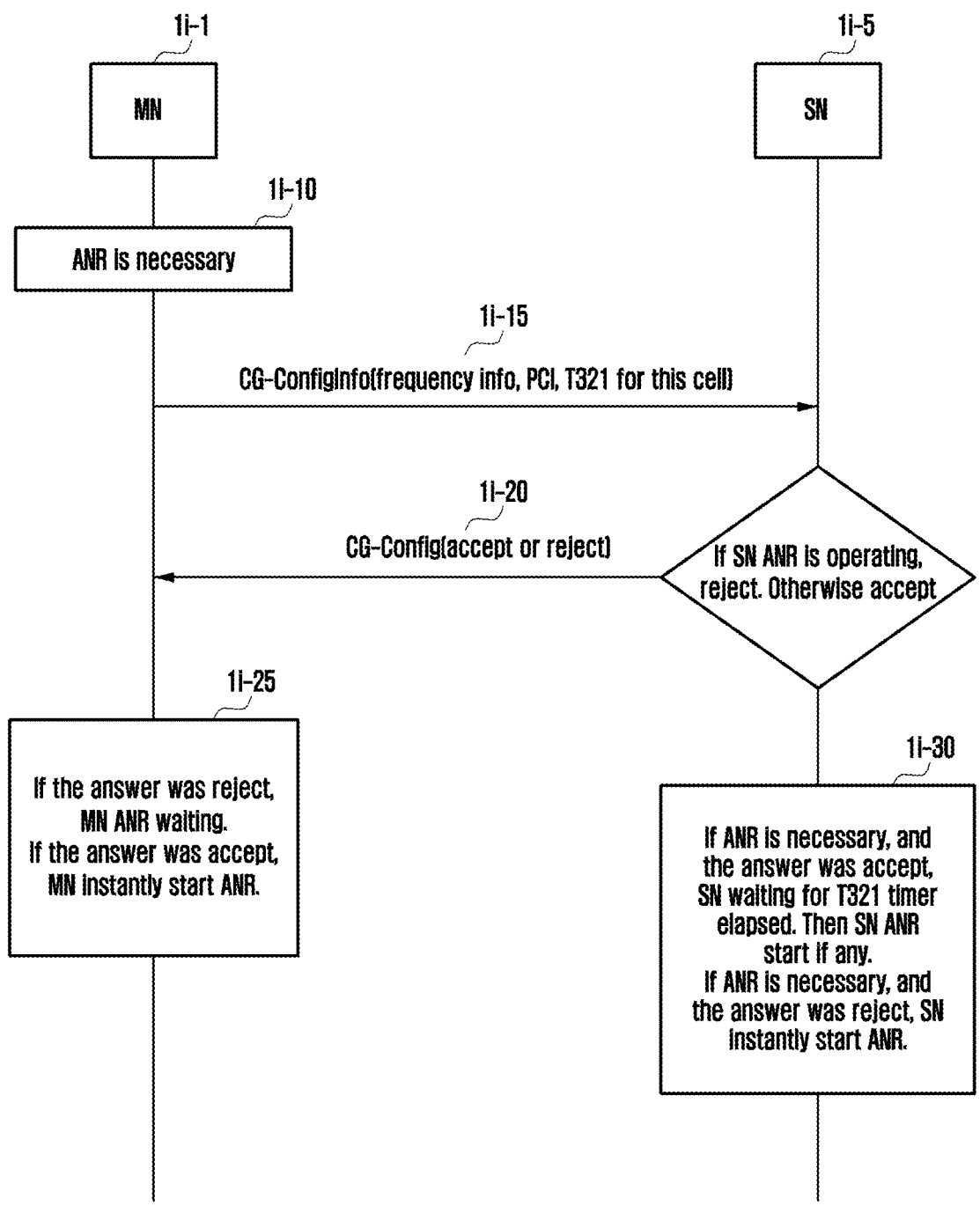
FIG. 1I illustrates a diagram explaining a case where MN inquires of SN whether it is possible to perform ANR and the SN determines and notifies of whether it is possible to perform the ANR according to some embodiments of the disclosure.

FIG. 1I illustrates an embodiment in which MN 1*i*-1 inquires of the SN 1*i*-5 whether it is possible to perform ANR with respect to a certain terminal, and the SN 1*i*-5 determines and notifies of whether it is possible to perform the ANR according to some embodiments of the disclosure. The MN 1*i*-1 and the SN 1*i*-5 are in dual connection relation with each other. If it is determined that ANR is necessary (1*i*-10), the MN 1*i*-1 may inquire of the SN 1*i*-5 whether it is possible to perform its own ANR with respect to the terminal through a CG-ConfigInfo message. In this case, it may transfer, to the SN 1i-5, at least one of PCI of an ANR target cell, frequency information in which the cell exists, or T321 time information for the ANR of the corresponding cell (1i-15). The SN 1i-5 having received the information may determine whether its own ANR is being performed with respect to the terminal. The SN 1i-5 may transfer, to the MN 1i-1, "reject" information if the ANR has already been performed or "accept" information if the ANR has not been performed, using the CG-Config message (1i-20). If the MN 1i-1 receives this information and if the response from the SN 1i-5 is the "accept", the MN 1i-1 may instantly perform its own ANR with respect to the terminal. If the response received from the SN 1i-5 is the "reject", the MN 1i-1 does not perform its own ANR with respect to the terminal (1i-25). If the SN 1i-5 should perform its own ANR after the above-described process 1i-20, and if the previous response to the MN 1i-1 is the "accept", the SN 1i-5 may wait for the time corresponding to the T321 value signaled at operation 1i-15, and then it may perform its own ANR with respect to the terminal. If the response is the "reject", the SN 1i-5 may instantly perform the ANR with respect to the terminal (1i-30). As another embodiment, if the message transmitted at operation 1i-15 is signaled without the T321 timer value, the MN 1i-1 may also display and transfer the ANR end on the side of the MN 1i-1 as 1-bit indicator in the CG-ConfigInfo message after the SN 1i-5 transmits the "accept" at operation 1i-20, or after a specific time when the ANR operation that the MN 1i-1 makes the terminal perform with respect to the corresponding frequency information and the PCI is ended. If the SN 1i-5 has transferred the "accept" at operation 1i-20 and it receives the indication indicating the ANR end after the specific time, the SN 1i-5 may not perform the ANR of the SN 1i-5 after the T321 time as in the process 1i-30, but it may make the terminal perform the ANR of the SN 1i-5 from the time when the 1-bit indicator is received.

Figure 1J:
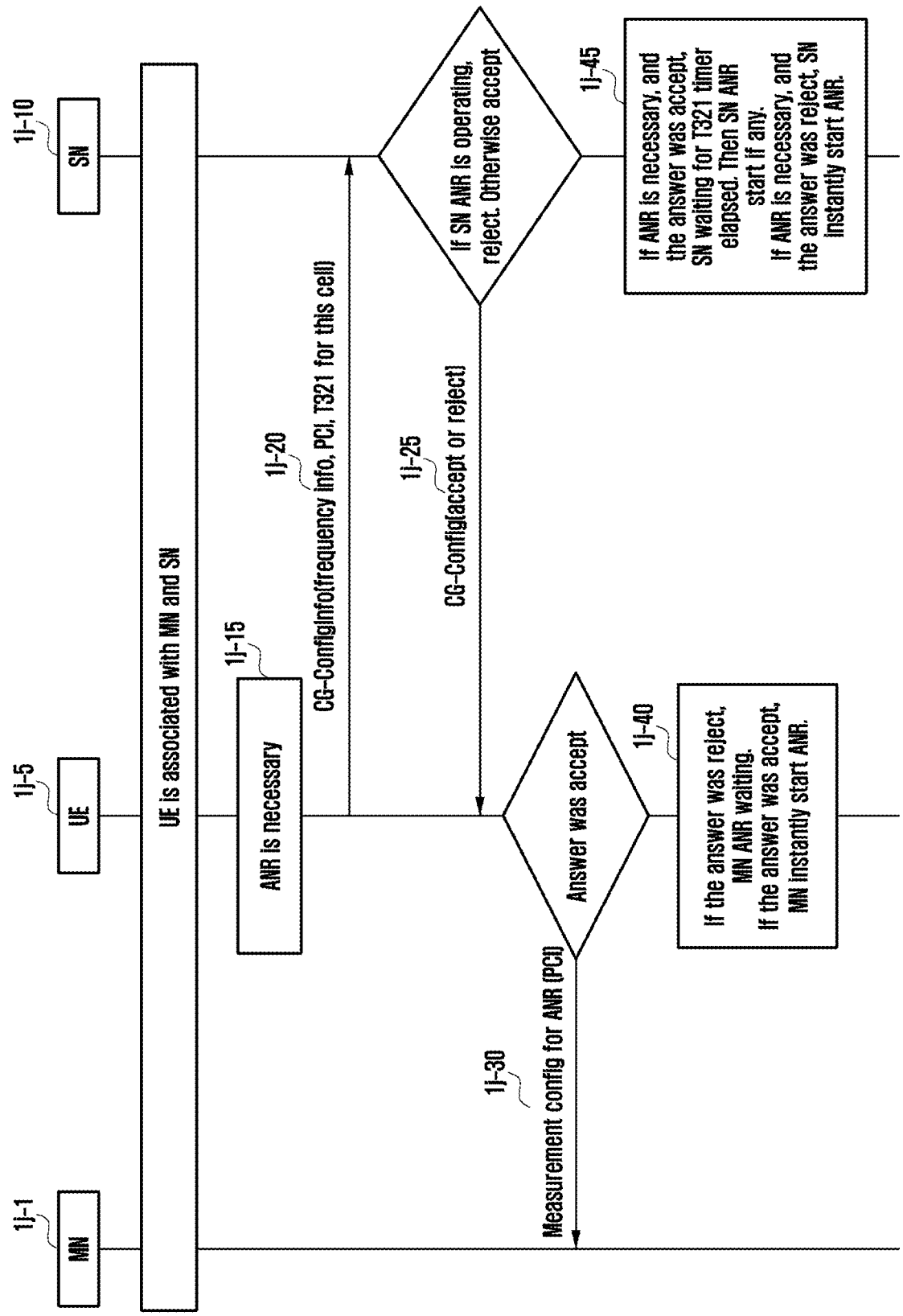
FIG. 1J illustrates a diagram including an operation of a terminal in a case where MN inquires of SN whether it is possible to perform ANR and the SN determines and notifies of whether it is possible to perform the ANR according to some embodiments of the disclosure.

FIG. 1J illustrates a block diagram including an operation of a terminal 1j-1 in the case where MN 1j-5 inquires of SN 1j-10 whether it is possible to perform ANR with respect to a specific terminal and if the SN 1j-10 determines and notifies of whether it is possible to perform the ANR according to some embodiments of the disclosure. The terminal 1j-1 is a terminal specified by a DC relation of MN 1j-5/SN 1j-10. In this case, in the same operation as the operation of FIG. 1I, if the response from the SN 1j-10, which is included in a CG-config, is "accept", the MN 1j-5 may perform its own ANR with respect to the terminal 1j-1. After receiving the "accept" from the SN 1j-10 at operation 1j-25, the MN 1j-5 may transfer, to the terminal 1j-1, corresponding PCI information included at operation 1j-20, frequency information, and timer information (1j-30). Accordingly, the MN 1j-5 may make the terminal 1j-1 perform ANR measurement and report. In this case, the ANR report is configured to the terminal 1j-1 through SRB1.

Meanwhile, if the response received from the SN 1i-5 is "reject" at operation 1j-40, the MN 1j-5 does not perform its own ANR with respect to the terminal. If the SN 1j-10 should perform its own ANR after the above-described operation 1j-25, and if the previous response to the MN 1j-5 is the "accept", the SN 1j-10 may wait for the time corresponding to the T321 value signaled at operation 1j-20, and then it may perform its own ANR with respect to the terminal. If the response is the "reject", the SN 1j-10 may instantly perform the ANR with respect to the corresponding terminal (1j-45). As another embodiment, if the message transmitted at operation 1j-20 is signaled without the T321 timer value, the MN 1j-5 may also display and transfer the ANR end on the side of the MN 1j-5 as 1-bit indicator in the CG-ConfigInfo message after the SN 1j-10 transmits the "accept" at operation 1j-25, or after a specific time when the ANR operation that the MN 1j-5 makes the terminal perform with respect to the corresponding frequency information and the PCI is ended. If the SN 1j-10 has transferred the "accept" at operation 1j-25 and it receives the indication indicating the ANR end after the specific time, the SN 1j-10 may not perform the ANR of the SN 1j-10 after the T321 time as at operation 1j-45, but it may make the terminal perform the ANR of the SN 1j-10 from the time when the 1-bit indicator is received.

Figure 1K:
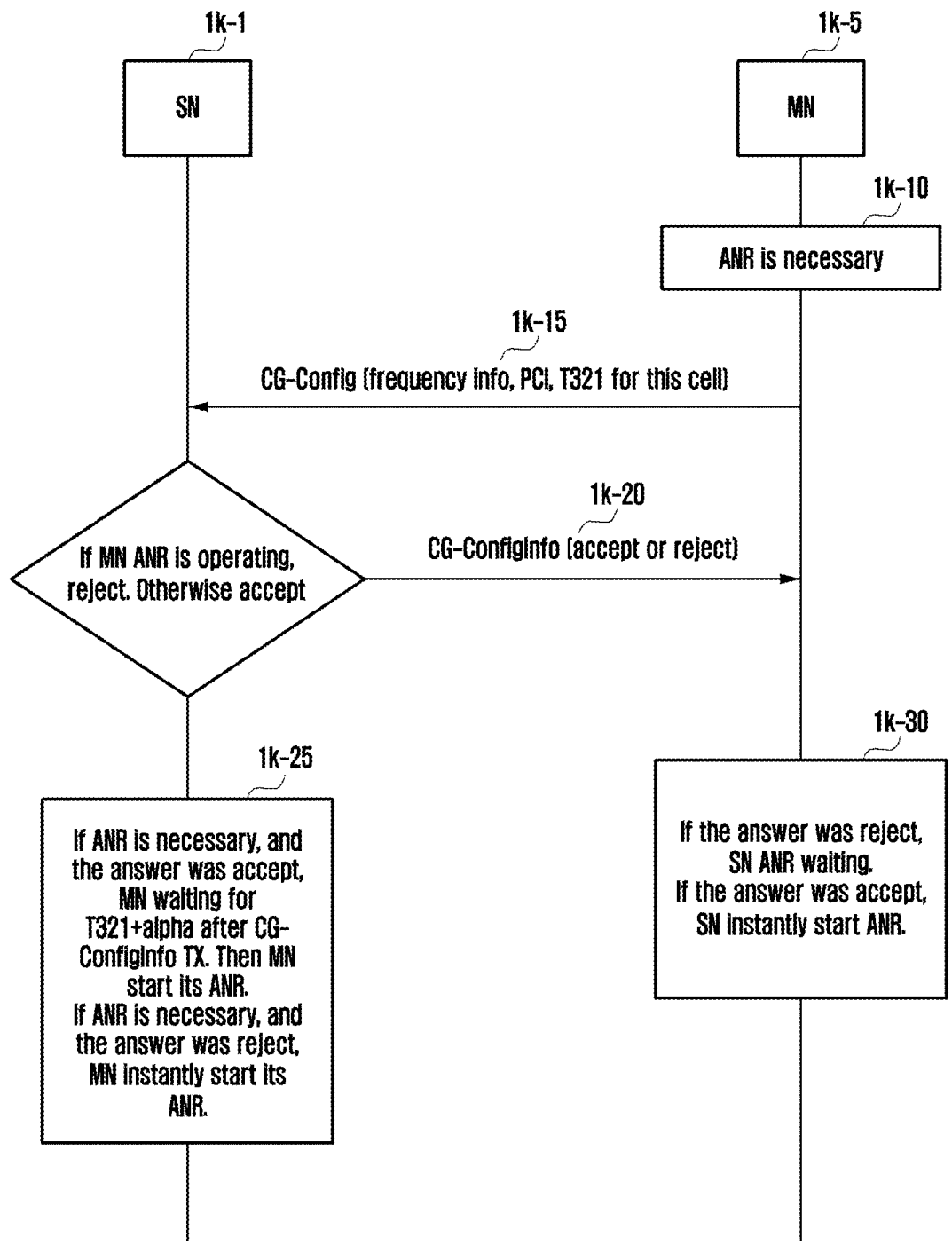
FIG. 1K illustrates a diagram explaining a case where SN inquires of MN whether it is possible to perform ANR and the MN determines and notifies of whether it is possible to perform the ANR according to some embodiments of the disclosure.

FIG. 1K illustrates a diagram of an embodiment in which SN 1k-5 inquires of MN 1k-1 whether it is possible to perform ANR with respect to a corresponding specific terminal and the MN 1k-1 determines and notifies of whether it is possible to perform the ANR according to some embodiments of the disclosure. The MN 1k-1 and the SN 1k-5 are in dual connection relation with each other. If the SN 1k-5 intends to perform ANR with respect to a certain terminal (1k-10), it may inquire of the MN 1k-1 whether it is possible to perform its own ANR with respect to the terminal through a CG-Config message (1k-15). In this case, it may transfer, to the MN 1k-1, at least one of a PCI of an ANR target cell, frequency information in which the cell exists, or T321 time information for performing the ANR of the corresponding cell (1k-15). The MN 1k-1 having received the information may determine whether its own ANR is being performed with respect to the corresponding specific terminal. If the ANR is being performed, the MN 1k-1 may include "reject" information in a CG-ConfigInfo message whereas if the ANR is not being performed, the MN 1k-1 may include "accept" information in the CG-Config-Info message to be transferred to the SN 1k-5 (1k-20). If a response received from the MN 1k-1 is "accept", the SN 1k-5 may perform its own ANR with respect to the terminal. If the response received from the MN 1k-1 is the "reject", the SN1k-5 does not perform its own ANR with respect to the terminal (1k-30). If the response transmitted at operation 1k-20 is the "accept", and the MN 1k-1 should perform its own ANR after the operation 1k-20, the MN 1k-1 may wait for the time corresponding to the T321 value signaled at operation 1k-15, and then it may perform its own ANR with respect to the terminal. If the response transmitted at operation 1k-20 is the "reject", the MN 1k-1 may instantly perform the ANR with respect to the terminal (1k-25). According to an embodiment, at operation 1k-15, information for requesting only a request may be transmitted without frequency information, PCI information, and timer information. In this case, the MN 1k-1 may notify the SN 1k-5 of the "accept" or "reject" by determining whether the terminal currently performs the ANR of the MN 1k-1 in the same manner. In this case, at operation 1k-25, the MN 1k-1 does not wait for T321 when performing the ANR. The remaining operations may be performed in the same manner. As another embodiment, if the message is signaled without the T321 timer value at operation 1k-15, the SN 1k-5 may display and transfer the ANR end on the side of the SN 1k-5 as 1-bit indicator in the CG-Config message after the MN 1k-1 transmits the "accept" at operation 1k-20 or after a specific time when the ANR operation that the SN 1k-5 makes the terminal perform with respect to the corresponding frequency information and the PCI is ended. If the MN 1k-1 has transferred the "accept" at operation 1k-20 and it receives the indication indicating the ANR end from the SN 1k-5 after the specific time, the MN 1k-1 may not perform the ANR of the MN 1k-1 after the T321 time as at the existing operation 1k-25, but it may make the terminal perform the ANR of the MN 1k-1 from the time when the 1-bit indicator is received.

Figure 1L:
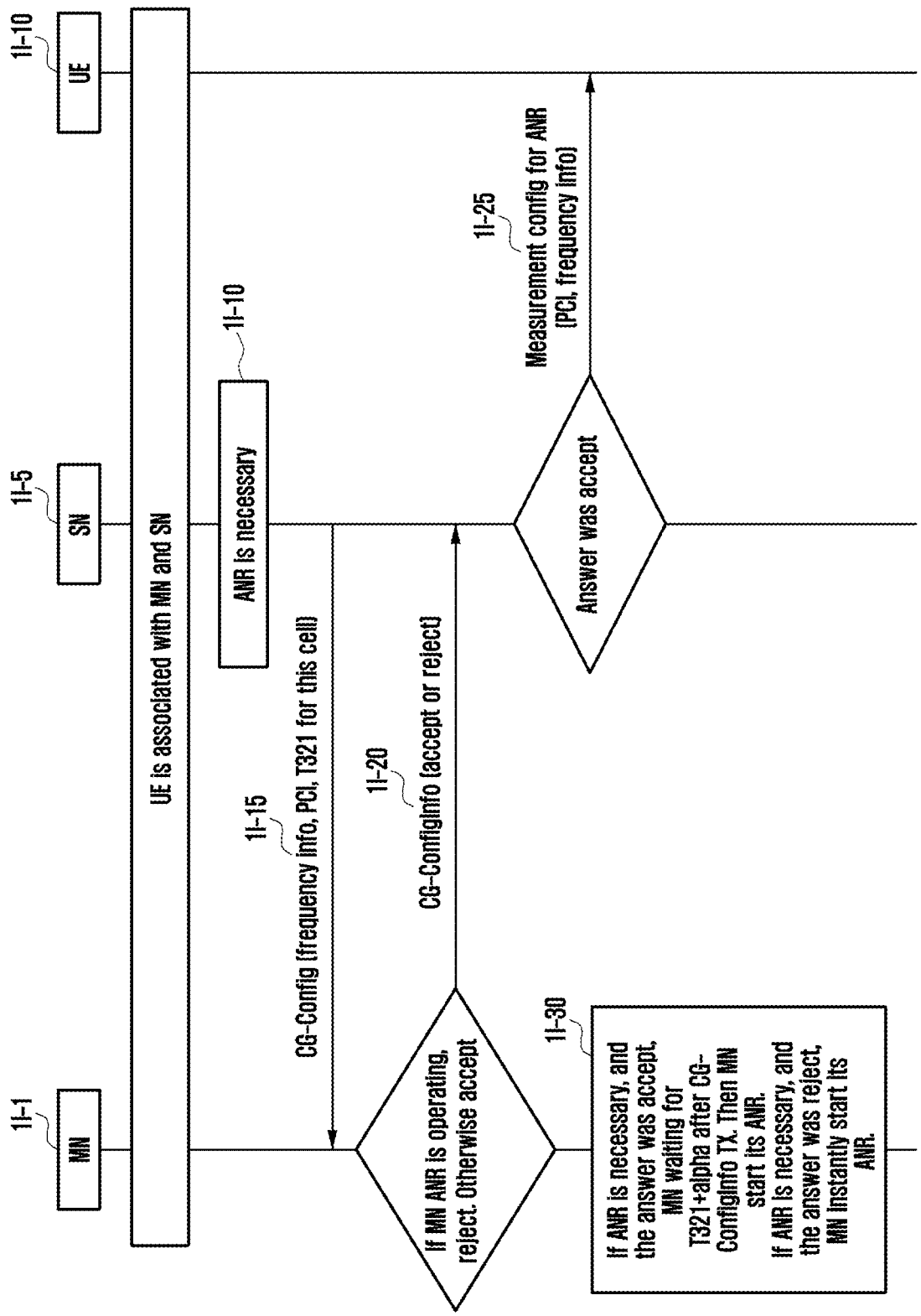
FIG. 1L illustrates a diagram explaining a case where SN operates to perform ANR using SRB3 in the case where SN inquires of MN whether it is possible to perform ANR and the MN determines and notifies of whether it is possible to perform the ANR according to some embodiments of the disclosure.

FIG. 1L illustrates a sequential diagram explaining a case where SN 1l-5 operates to perform ANR using SRB3 if the SN 1l-5 inquires of MN 1l-1 whether it is possible to perform ANR with respect to a certain terminal 1l-10 and the MN 1l-1 determines and notifies of whether it is possible to perform the ANR according to some embodiments of the disclosure. If the SN 1l-5 intends to perform the ANR with respect to the certain terminal (1l-10), it may inquire of the MN 1l-1 whether it is possible to perform its own ANR with respect to the terminal through a CG-Config message. In this case, if information included in a message transmitted from the MN 1l-1 to the SN 1l-5 at operation 1l-20 is "accept" through the above-described operation in FIG. 1K, the SN 1l-5 may make the terminal 1l-10 perform ANR measurement and report by transferring PCI, frequency information, and T321 value, being used at operation 1l-15, with respect to the terminal 1l-10 (1l-25). The remaining operations are the same as those of FIG. 1K. At operation 1k-15, only information for requesting only a request may be included without the frequency information, the PCI information, and the timer information. In this case, the MN 1l-1 may notify the SN 1l-5 of "accept" or "reject" by determining only whether the terminal currently performs the ANR of the MN 1l-1 in the same manner. However, at operation 1k-25, the MN 1l-1 does not wait for T321 when performing the ANR. The remaining operations are the same. As another embodiment, if the message transferred at operation 1l-15 is signaled without the T321 timer value, the SN 1l-5 may display the ANR end on the side of the SN 1l-5 as 1-bit indicator in the CG-Config message to be transferred to the MN 1l-1 after the MN 1l-1 transmits the "accept" at operation 1l-20 or after a specific time when the ANR operation 1l-25 that the SN 1l-5 makes the terminal perform with respect to the corresponding frequency information and PCI is ended. If the MN 1l-1 has transferred the "accept" at operation 1l-20 and it receives an indication for indicating the ANR end from the SN 1l-5 after the specific time, the MN 1l-1 may not perform the ANR of the MN 1l-1 after the time of T321+alpha as at the existing operation 1l-30, but it may make the terminal perform the ANR of the MN 1l-1 from the time when the 1-bit indicator is received.

Figure 1M:
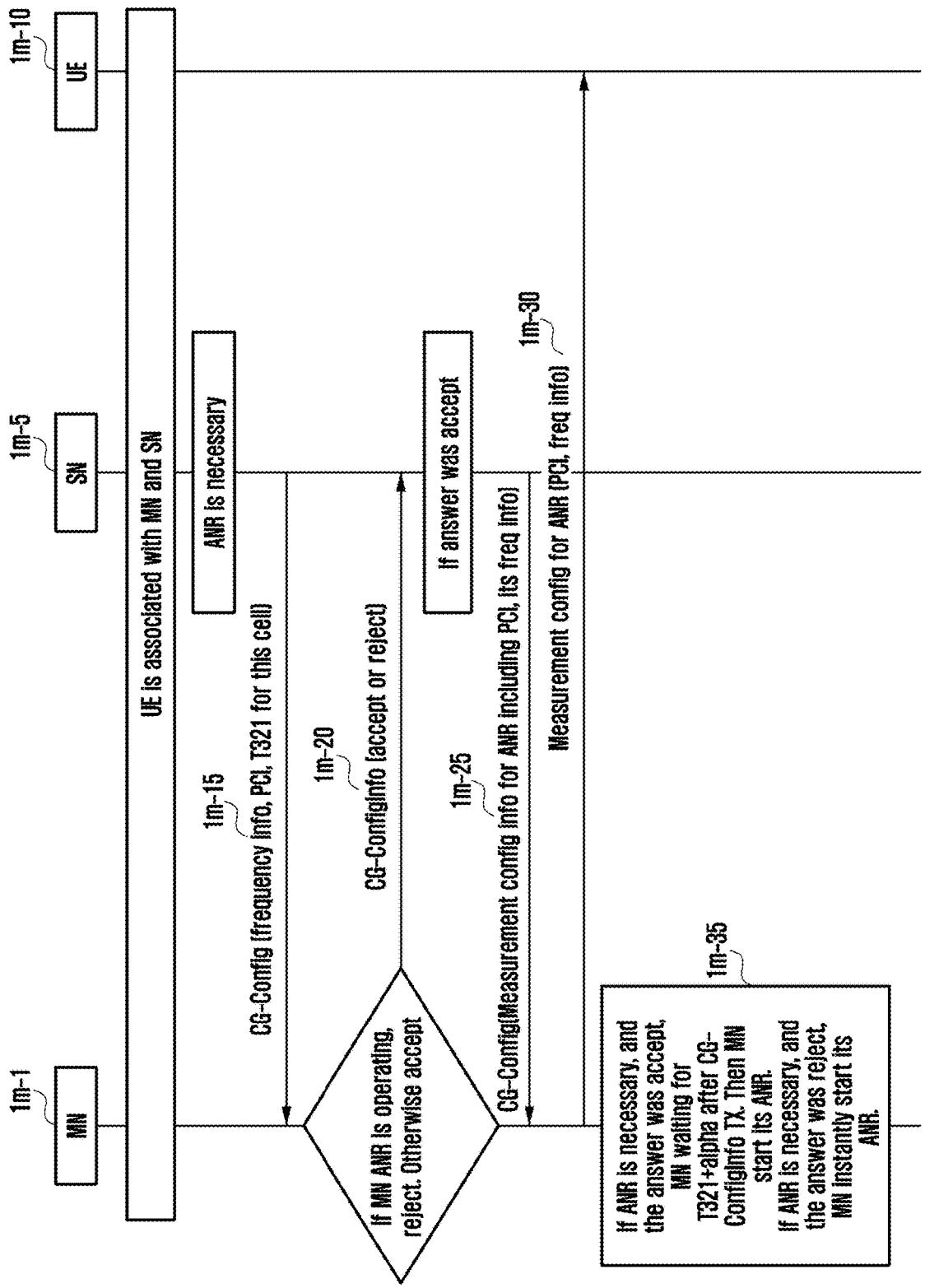
FIG. 1M illustrates a diagram explaining a case where SN operates to perform ANR using SRB1 in the case where SN inquires of MN whether it is possible to perform ANR and the MN determines and notifies of whether it is possible to perform the ANR according to some embodiments of the disclosure.

FIG. 1M illustrates a sequential diagram explaining an embodiment in which SN 1m-5 inquires of MN 1m-1 whether it is possible to perform ANR with respect to a certain terminal 1m-10, the MN 1m-1 determines and notifies the SN 1m-5 whether it is possible to perform the ANR, and the SN 1m-5 operates to perform the ANR using SRB3 according to some embodiments of the disclosure.

The SN 1m-5 may determine that the ANR is necessary for a certain cause. For example, the SN 1m-5 may desire to acquire CGI information corresponding to a certain PCI with respect to the PCI included in a measurement report received from the terminal 1m-10 periodically or aperiodically.

Accordingly, at operation 1m-15, the SN 1m-5 may request the MN 1m-1 to perform the ANR with respect to the terminal 1m-10. In this case, the SN 1m-5 may transmit a CG-configuration including at least one of frequency band information, PCI information, or timer information. For example, the SN 1m-5 may include the PCI that is determined to desire the CGI information acquisition in the CG-configuration to be transmitted.

The MN 1m-1 may determine whether to perform the ANR. If the MN 1m-1 indicates the terminal 1m-10 to perform the ANR with respect to the PCI, and/or if the MN 1m-1 indicates the terminal 1m-10 to perform the ANR with respect to the PCI, but it is unable to receive a report of the result of the ANR performance, the MN 1m-1 may reject the ANR performance request from the SN 1m-5. Except for the case of the rejection, the MN 1m-1 may determine to accept the ANR performance request from the SN 1m-5.

At operation 1m-20, the MN 1m-1 may transmit a message including information on the rejection or acceptance to the SN 1m-5.

If the information transferred at operation 1m-20 is "accept", the SN 1m-5 may request the ANR from the MN 1m-1 by including at least one of PCI, frequency information, or T321 information, being transferred to the terminal 1m-10 in a new CG-config message (1m-25). The MN 1m-1 may perform configuration of the ANR operation to the terminal 1m-10 using the given PCI, frequency, and T321 information using SRB1 (1m-30). The remaining operations are the same as those as described above with reference to FIG. 1K. Even in this case, at operation 1m-15, information for requesting only the request may be given without the frequency information, the PCI, and the T321 timer value. In this case, the MN 1m-1 may notify the SN 1m-5 of the "accept" or "reject" by determining only whether the terminal currently performs the ANR of the MN 1m-1 in the same manner. However, at operation 1m-25, the MN 1m-1 does not wait for T321 when performing the ANR. The remaining operations are the same. However, at operation 1m-25, the corresponding PCI information, frequency information, and T321 information should not be omitted. As another embodiment, if the message transmitted at operation 1m-15 is signaled without the T321 timer value, the SN 1m-5 may also display the ANR end on the side of the SN 1m-5 as 1-bit indicator in the CG-Config message to be transferred to the MN 1m-1 after the MN 1m-1 transmits the "accept" at operation 1m-20, or after a specific time when the ANR operation (1m-25 and 1m-30) that the SN 1m-5 makes the terminal perform with respect to the corresponding frequency information and PCI and an operation for the MN 1m-1 having received a report of the result of the operation 1m-30 to transfer the information to the SN 1m-5 are ended. If the MN 1m-1 has transferred the "accept" at operation 1m-20 and it receives an indication for indicating the ANR end from the SN 1m-5 after the specific time, the MN 1m-1 may not perform the ANR of the MN 1m-1 after the time of T321+alpha as at the existing operation 1m-35, but it may make the terminal perform the ANR of the MN 1m-1 from the time when the 1-bit indicator is received.

Figure 1N:
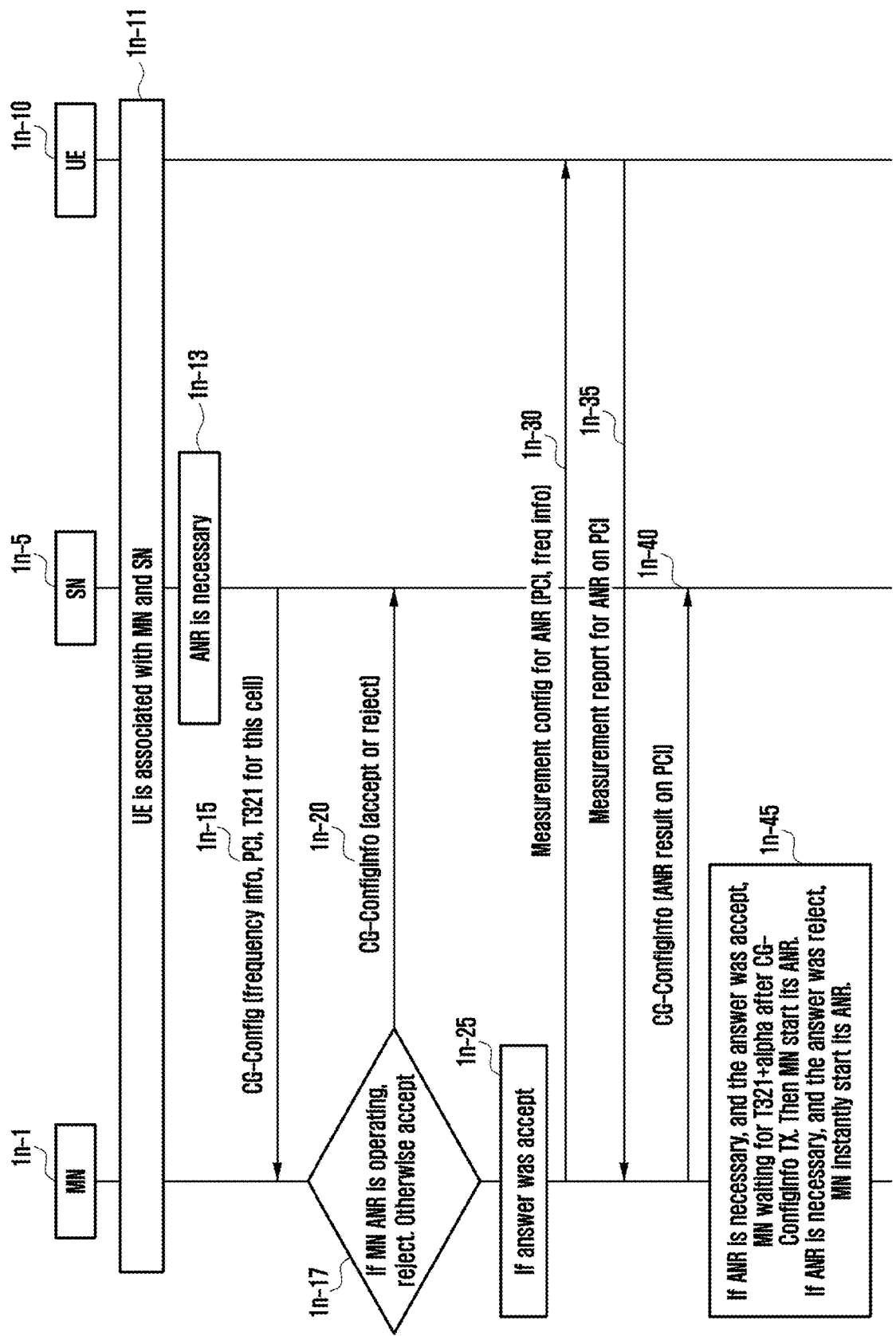
FIG. 1N illustrates a diagram explaining a case where MN operates to perform ANR using information transferred to an existing CG-config without transferring additional ANR information of the SN if the SN operates to perform the ANR using SRB1 in the case where the SN inquires of MN whether it is possible to perform the ANR and the MN determines and notifies of whether it is possible to perform the ANR according to some embodiments of the disclosure.
Figure 10:
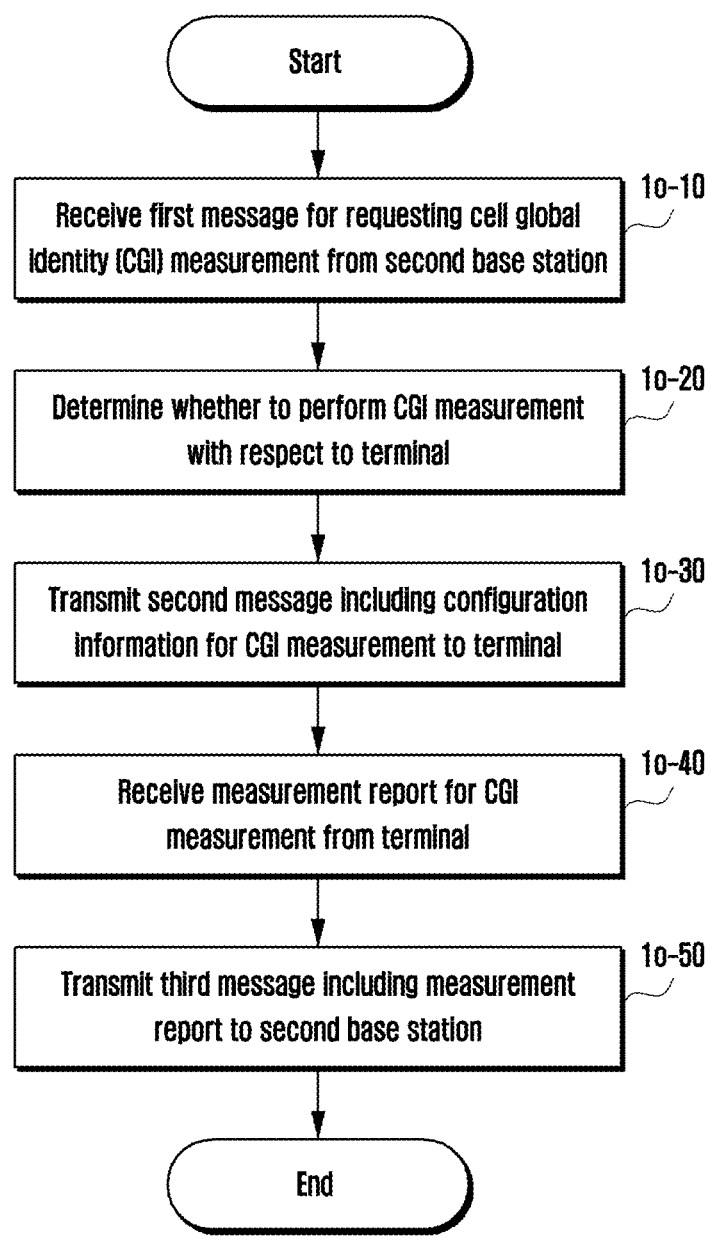

FIG. 1N illustrates a diagram according to some embodiments of the disclosure. Specifically, in an embodiment illustrated in FIG. 1N, SN 1n-5 may inquire of MN 1n-1 whether it is possible to perform ANR. In this case, the MN 1n-1 may determine and notify the SN 1n-5 whether it is possible to perform the ANR. Further, the MN 1n-1 may perform the ANR with respect to a terminal 1n-10 by reusing information transferred to an existing CG-config without transferring additional ANR information of the SN 1n-5, such as the SN 1n-5 performs the ANR using SRB1.

Specifically, at operation 1n-11, the terminal 1n-10 may be connected to the MN 1n-1 and the SN 1n-5. For example, the terminal 1n-10 may form an RRC connection with the MN 1n-1. Further, through SCG addition and the like, the terminal 1n-10 may be connected to the SN 1n-5.

At operation 1n-13, the SN 1n-5 may determine that the ANR is necessary for a certain cause. For example, the SN 1*n*-5 may desire to acquire CGI information corresponding to a certain PCI with respect to the PCI included in a measurement report received from the terminal 1*n*-10 periodically or aperiodically.

Accordingly, at operation 1*n*-15, the SN 1*n*-5 may request the MN 1*n*-1 to perform the ANR with respect to the terminal 1*n*-10. In this case, the SN 1*n*-5 may transmit a CG-config message including at least one of frequency band information, PCI information, or timer information. For example, the SN 1*n*-5 may include the PCI that is determined to desire the CGI information acquisition at operation 1*n*-13 in the CG-config message to be transmitted.

At operation 1*n*-17, the MN 1*n*-1 may determine whether to perform the ANR. If the MN 1*n*-1 indicates the terminal 1*n*-10 to perform the ANR with respect to the PCI, and/or if the MN 1*n*-1 indicates the terminal 1*n*-10 to perform the ANR with respect to the PCI, but it is unable to receive a report of the result of the ANR performance, for example there in ongoing a CGI reporting measurement on the terminal 1*n*-10, the MN 1*n*-1 may reject the ANR performance request from the SN 1*n*-5. Except for the case of the rejection, for example, there is no ongoing a CGI reporting measurement on the terminal 1*n*-10, the MN 1*n*-1 may determine to accept the ANR performance request from the SN 1*n*-5.

At operation 1*n*-20, the MN 1*n*-1 may transmit a message including information on the rejection or acceptance to the SN 1*n*-5.

It is exemplified that the information transferred at operation 1*n*-20 is "accept", and reception of the ANR configuration performed by the SN 1*n*-5 and the measurement result is performed through SRB1 with respect to the terminal 1*n*-10. Specifically, if the information received at operation 1*n*-20 is the "accept" (1*n*-25), the MN 1*n*-1 may indicate the terminal 1*n*-10 to configure the ANR operation using ANR information of the SN included at operation 1*n*-15, for example, PCI, frequency information, and T321 information, without separately receiving information for performing the ANR (e.g., 1*m*-25 of FIG. 1M) from the SN 1*n*-5 (1*n*-30). The terminal 1*n*-10 having received this information may perform measurement for the ANR. For example, the terminal 1*n*-10 may receive system information (e.g., SIB1) from a cell having the PCI based on the received PCI, frequency information, and T321 information. Further, the terminal 1*n*-10 may acquire CGI information from the system information. The terminal 1*n*-10 may receive and report the CGI information of the cell having the corresponding PCI to the MN 1*n*-1 (1*n*-35). If the information is received, the MN 1*n*-1 may transfer the CGI information for the cell of the PCI reported from the SN 1*n*-5. The CGI info may include at least one of frequency information for obtaining the corresponding information, a PLMN ID, a frequency band list being used in the corresponding cell, existence/nonexistence of SIM, or PCI. In this case, at operation 1*n*-40, a CG-ConfigInfo message may be used. The remaining operations are the same as those of FIGS. 1M and 1K. However, in this case, the frequency information, the PCI, and the timer value, being transferred at operation 1*n*-15 may not be omitted. As another embodiment, if the message being transmitted at operation 1*n*-15 is signaled without the T321 timer value, the SN 1*n*-5 may display and transfer the ANR end after the MN 1*n*-1 transmits a message including "accept" information at operation 1*n*-20, or after a specific time when the ANR operation (1*n*-30) that the SN 1*n*-5 makes the terminal perform with respect to the corresponding frequency information and the PCI and an operation 1*n*-40 in which the MN 1*n*-1 having received a report of the corresponding result (1*n*-35) transfers the information to the SN 1*n*-5 are ended. For example, the SN 1*n*-5 may indicate the ANR end as 1-bit indicator in the CG-Config message to be transferred to the MN 1*n*-1. If the MN 1*n*-1 has transferred the "accept" at operation 1*n*-20 and it receives the end indication from the SN 1*n*-5 after the specific time, the MN 1*n*-1 may not perform the ANR of the MN 1*n*-1 after the time of T321+alpha as at the existing operation 1*m*-45, but it may make the terminal perform the ANR of the MN 1*n*-1 from the time when the 1-bit indicator is received.

On the other hand, FIG. 1O illustrates a flowchart of a method of a first base station according to an embodiment of the disclosure. First, at operation 1*o*-10, a first message for requesting cell global identity (CGI) measurement may be received from a second base station. The first message may include at least one of cell identity information for the CGI measurement or information on the frequency band.

Further, at operation 1*o*-20, it may be determined by the first base station whether to perform the CGI measurement with respect to the terminal.

If the CGI measurement with respect to the terminal is determined by the first base station as the result of the determination, at operation 1*o*-30, the first base station may transmit a second message including configuration information for the CGI measurement to the terminal. The second message may include information received from the second base station through the first message. For example, the first base station may include at least one of the cell identity information for the CGI measurement received from the second base station or the information on the frequency band in the second message to be transmitted.

Meanwhile, it may be determined by the first base station not to perform the CGI measurement with respect to the terminal as the result of the determination. For example, while the CGI measurement with respect to the terminal is being performed by the first base station, the first base station may transmit a fourth message for rejecting the request to the second base station.

At operation 1*o*-40, the first base station may receive a measurement report for the CGI measurement from the terminal.

Further, at operation 1*o*-50, the first base station may transmit a third message including the measurement report to the second base station. In this case, the third message may include the CGI corresponding to the cell identity information transmitted by the second base station.

Figure 1P:
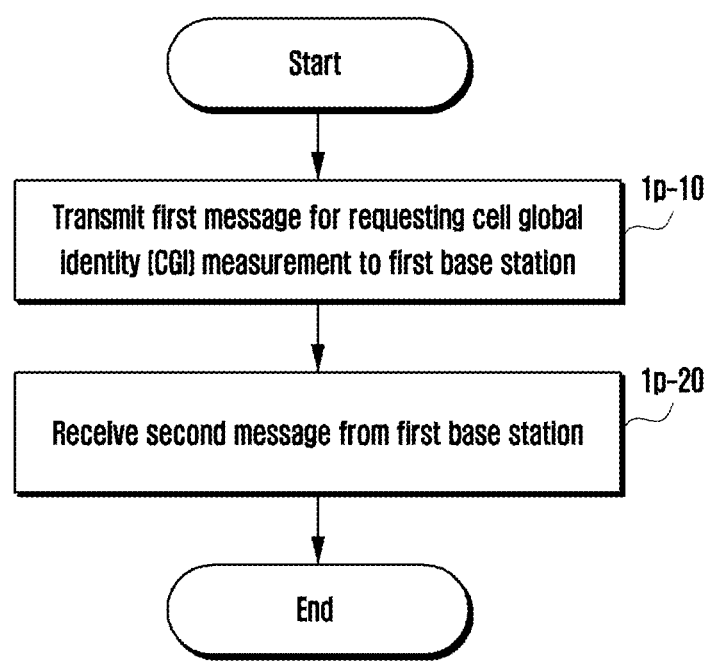
FIG. 1P illustrates a flowchart of a method by a second base station according to an embodiment of the disclosure.

On the other hand, FIG. 1P illustrates a flowchart of a method of the second base station according to an embodiment of the disclosure.

First, at operation 1*p*-10, the second base station may transmit a first message for requesting cell global identity (CGI) measurement to a first base station. The first message may include at least one of the cell identity information for the CGI measurement or the information on the frequency band.

Further, at operation 1*p*-20, the second base station may receive a second message from the first base station. The second message may include "reject" information for the CGI measurement. Further, if performing of the CGI measurement with respect to the terminal is determined by the first base station, a third message including configuration information for the CGI measurement is transmitted from the first base station to the terminal, and if the measurement report for the CGI measurement has been transmitted from the terminal to the first base station, the second message may include the result of the measurement report for the CGI measurement.

Second Embodiment

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience in explanation, in the disclosure, terms and names defined in the 3rd Generation Partnership Project Long Term Evolution (3GPP LTE) standards are used. However, the disclosure is not restricted by the terms and names, and it may be equally applied to systems complying with other standards.

Figure 2A:
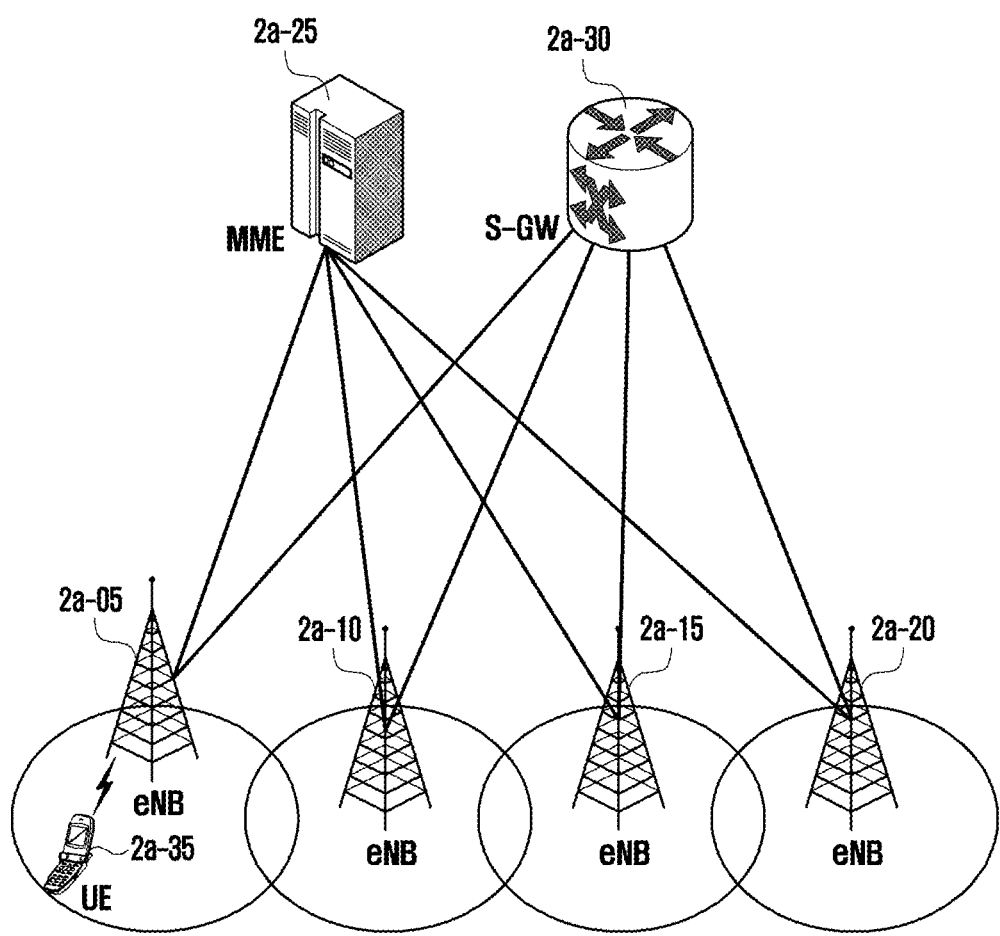
FIG. 2A illustrates a diagram of the structure of an LTE system being referred to for explanation of the disclosure.

FIG. 2A illustrates a diagram of the structure of an LTE system being referred to for explanation of the disclosure.

With reference to FIG. 2A, as illustrated, a radio access network of an LTE system is composed of evolved node Bs (hereinafter, "eNBs", "node Bs", or "base stations") 2a-05, 2a-10, 2a-15, and 2a-20, a mobility management entity (MME) 2a-25, and a serving-gateway (S-GW) 2a-30. User equipment (hereinafter, "UE" or "terminal") 2a-35 may access to an external network through the eNBs 2a-05 to 2a-20 and the S-GW 2a-30.

In FIG. 2A, the ENBs 2a-05 to 2a-20 corresponds to existing node Bs of a UMTS system. The eNBs are connected to the UE 2a-35 on a radio channel, and plays a more complicated role than that of the existing node B. In the LTE system, since all user traffics including a real-time service, such as a voice over Internet protocol (VoW) through an Internet protocol, are serviced on shared channels. Accordingly, devices performing scheduling through summarization of state information, such as a buffer state, an available transmission power state, and a channel state of each UE, are necessary, and the ENBs 2a-05 to 2a-20 take charge of this. In general, one eNB controls a plurality of cells. For example, in order to implement a transmission speed of 100 Mbps, the LTE system uses, for example, orthogonal frequency division multiplexing (OFDM) in a bandwidth of 20 MHz as a radio access technology. Further, the LTE system adopts an adaptive modulation & coding (AMC) scheme that determines a modulation scheme and a channel coding rate to match the channel state of the terminal. The S-GW 2a-30 is a device that provides a data bearer, and it generates or removes the data bearer under the control of the MME 2a-25. The MME is a device that takes charge of not only mobility management of the terminal but also various kinds of control functions, and it is connected to the plurality of eNBs.

Figure 2B:
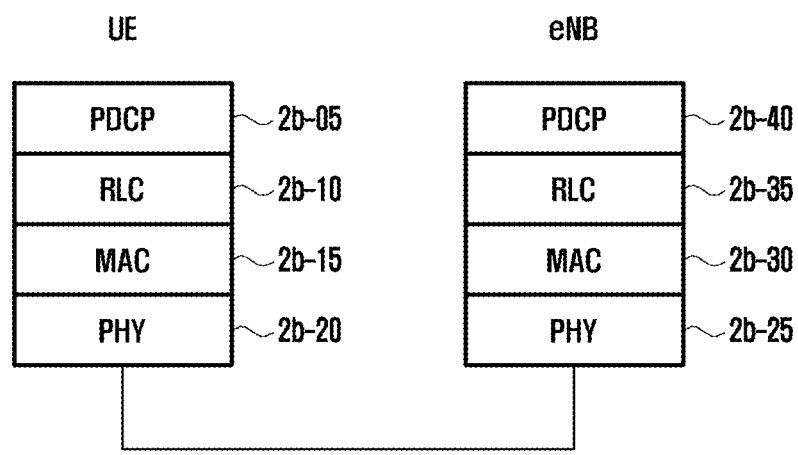
FIG. 2B illustrates a diagram of a radio protocol structure of an LTE system being referred to for explanation of the disclosure.

FIG. 2B illustrates a diagram of a radio protocol structure of an LTE system being referred to for explanation of the disclosure.

With reference to FIG. 2B, in UE or an eNB, a radio protocol of an LTE system includes a packet data convergence protocol (PDCP) 2b-05 or 2b-40, a radio link control (RLC) 2b-10 or 2b-35, and a medium access control (MAC) 2b-15 or 2b-30. The PDCP takes charge of IP header compression/decompression operations. The main functions of the PDCP are summarized as follows.

- Header compression and decompression: ROHC only
- Transfer of user data
- In-sequence delivery of higher layer PDUs at a PDCP reestablishment procedure for an RLC AM
- For split bearers in DC (only support for an RLC AM): PDCP PDU routing for transmission and PDCP PDU reordering for reception
- Duplicate detection of lower layer SDUs at a PDCP reestablishment procedure for an RLC AM
- Retransmission of PDCP SDUs at handover and, for split bearers in DC, of PDCP PDUs at a PDCP data-recovery procedure, for an RLC AM
- Ciphering and deciphering
- Timer-based SDU discard in an uplink The radio link control (RLC) 2b-10 or 2b-35 reconfigures a PDCP packet data unit (PDU) with a proper size, and it performs an ARQ operation and the like. The main functions of the RLC may be summarized as follows.

- Transfer of higher layer PDUs
- Error correction through an ARQ (only for AM data transfer)
- Concatenation, segmentation, and reassembly of RLC SDUs (only for UM and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC reestablishment The MAC 2b-15 or 2b-30 is connected to several RLC layer devices configured in one terminal, and it performs multiplexing/demultiplexing of RLC PDUs into/from MAC PDU. The main functions of the MAC are summarized as follows.

- Mapping between logical channels and transport channels
- Multiplexing/demultiplexing of MAC SDUs belonging to one or different logical channels into/from transport blocks (TB) delivered to/from the physical layer on transport channels
- Scheduling information reporting
- HARQ function (error correction through HARQ)
- Priority handling between logical channels of one UE
- Priority handling between UEs by means of dynamic scheduling
- MBMS service identification
- Transport format selection
- padding The physical layer 2b-20 or 2b-25 performs channel coding and modulation of higher layer data to configure and transmit OFDM symbols on a radio channel, or it performs demodulation and channel decoding of the OFDM symbols received on the radio channel to transfer the demodulated and channel-decoded symbols to a higher layer. Further, even in a physical layer, a hybrid ARQ (HARQ) is being used for additional error correction, and a reception end transmits whether to receive a packet transmitted by a transmission end by 1 bit. This is called HARQ ACK/NACK information. Downlink HARQ ACK/NACK information for uplink transmission is transferred through a physical hybrid-ARQ indicator channel (PHICH), and uplink HARQ ACK/NACK information for downlink transmission is transmitted through a physical uplink control channel (PUCCH) or a physical uplink shared channel (PUSCH).

On the other hand, the PHY layer may be composed of one or a plurality of frequencies/carriers, and a technology to simultaneously configure and use a plurality of frequencies is called carrier aggregation (hereinafter referred to as "CA"). The CA technology can remarkably increase throughput as many as the number of secondary carriers by additionally using one primary carrier and a plurality of secondary carriers rather than using only one carrier for communication between a terminal (or user equipment (UE)) and a base station (E-UTRAN NodeB (eNB)). On the other hand, in LTE, a cell in the base station using the primary carrier is called a primary cell (PCell), and a cell using the secondary carrier is called a secondary cell (SCell).

Although not illustrated in the drawing, on a higher position of a PDCP layer of the terminal and the base station, a radio resource control (hereinafter, referred to as "RRC") layer exists, and the RRC layers may send and receive an access/measurement related control message for radio resource control.

Figure 2C:
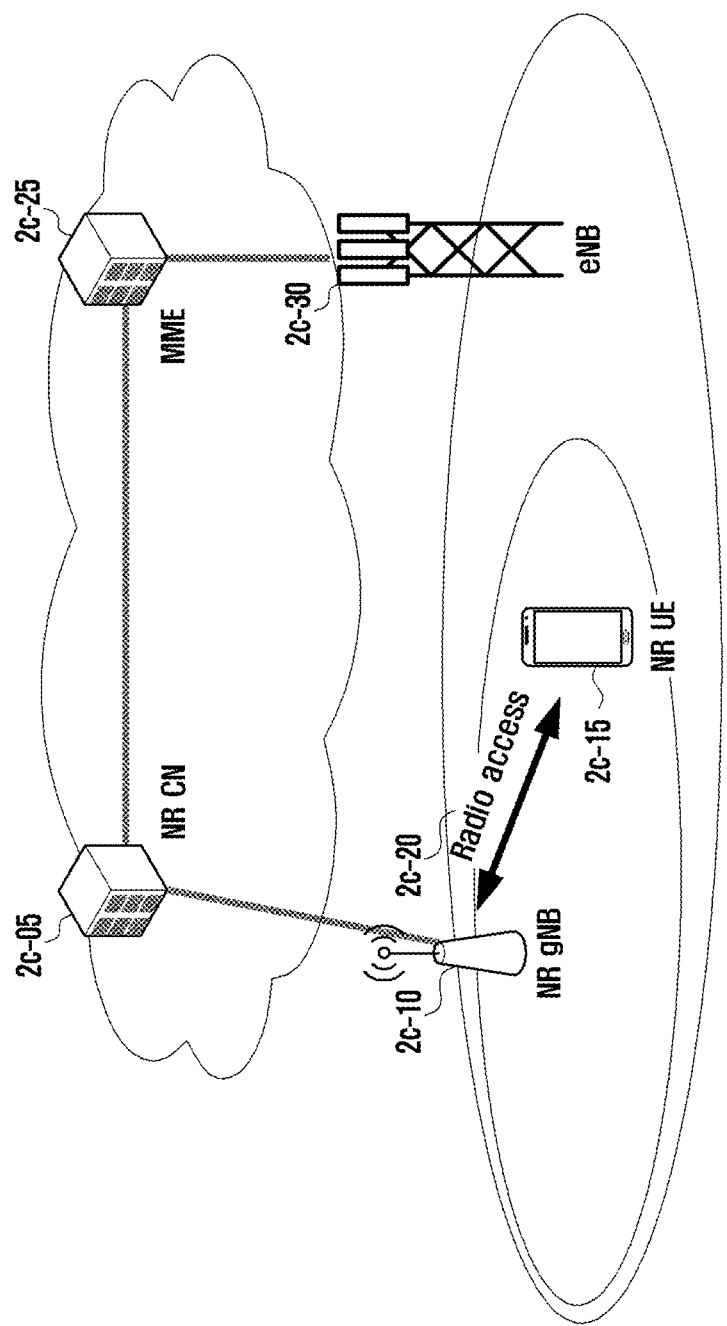
FIG. 2C illustrates a diagram of the structure of a next-generation mobile communication system to which the disclosure is applied.

FIG. 2C illustrates a diagram of the structure of a next-generation mobile communication system being referred to for explanation of the disclosure.

With reference to FIG. 2C, as illustrated, a radio access network of a next-generation mobile communication system is composed of a new radio node B (hereinafter, "NR NB") 2c-10 and a new radio core network (NR CN) or next generation core network (NG CN) 2c-05. New radio user equipment (hereinafter, "NR UE" or "terminal") 2c-15 accesses to an external network through the NR NB 2c-10 and the NR CN 2c-05.

In FIG. 2C, the NR NB 2c-10 may correspond to an evolved node B (eNB) of the existing LTE system. The NR NB may be connected to the NR UE 2c-15 on a radio channel, and thus it can provide a more superior service than the service of the existing node B. In the next-generation mobile communication system, all user traffics may be serviced on shared channels. Accordingly, a device that performs scheduling through consolidation of state information, such as a buffer state of UEs, an available transmission power state, and a channel state, may be required, and the NR NB 2c-10 may take charge of this. One NR NB may control a plurality of cells. In order to implement ultrahigh-speed data transmission as compared with the existing LTE, a bandwidth that is equal to or higher than the existing maximum bandwidth may be applied in the next-generation mobile communication system. Further, a beamforming technology may be additionally used in consideration of the orthogonal frequency division multiplexing (OFDM) as a radio access technology. Further, the NR NB may adopt an adaptive modulation & coding (hereinafter referred to as "AMC") scheme determining a modulation scheme and a channel coding rate to match the channel state of the UE. The NR CN 2c-05 may perform functions of mobility support, bearer setup, and QoS configuration. The NR CN 2c-05 is a device that takes charge of not only a mobility management function of the UE but also various kinds of control functions, and it may be connected to a plurality of eNBs. Further, the next-generation mobile communication system may interlock with the existing LTE system, and the NR CN may be connected to an MME 2c-25 through a network interface. The MME may be connected to an eNB 2c-30 that is the existing base station.

Figure 2D:
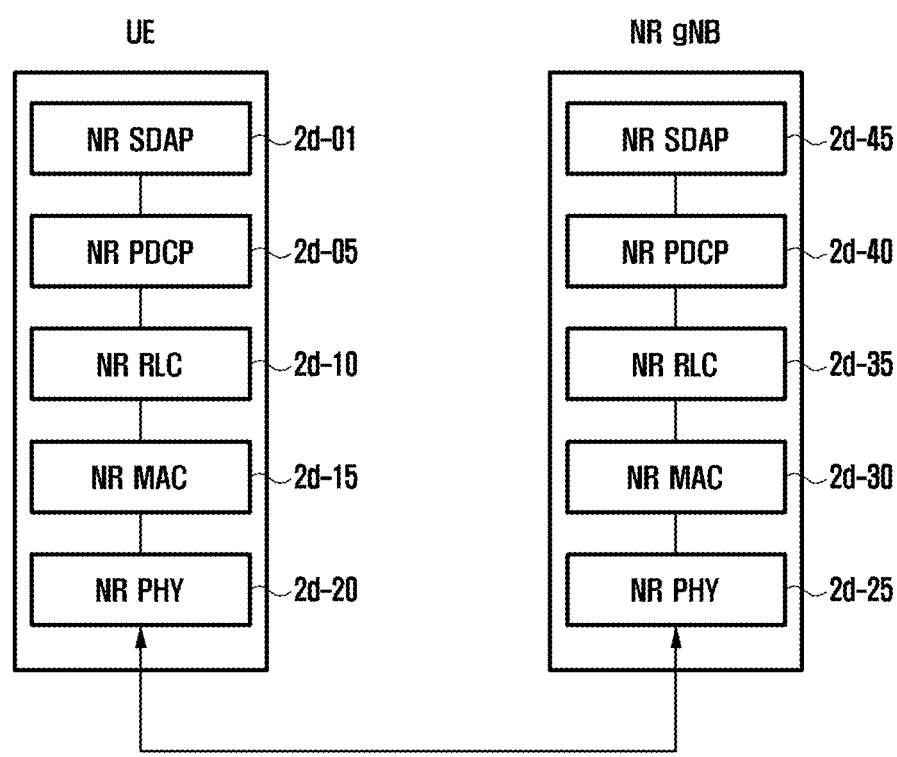
FIG. 2D illustrates a diagram of a radio protocol structure of a next-generation mobile communication system to which the disclosure can be applied.

FIG. 2D illustrates a diagram of a radio protocol structure of a next-generation mobile communication system being referred to for explanation of the disclosure.

With reference to FIG. 2D, in UE or NR eNB, a radio protocol of the next-generation mobile communication system may include a NR SDAP 2d-01 or 2d-45, NR PDCP 2d-05 or 2d-40, NR RLC 2d-10 or 2d-35, and NR MAC 2d-15 or 2d-30.

The main functions of the NR SDAP 2d-01 or 2d-45 may include parts of the following functions.

Transfer of user plane data
    Mapping between a QoS flow and a DRB for both DL and UL
    Marking QoS flow ID in both DL and UL packets
    Reflective QoS flow to DRB mapping for the UL SDAP PDUs With respect to the SDAP layer device, the UE may be configured whether to use a header of the SDAP layer device or whether to use the function of the SDAP layer device for each PDCP layer device, bearer, or logical channel through a radio resource control (RRC) message. Further, if the SDAP header is configured, the UE may indicate that the UE can update and reconfigure mapping information on uplink and downlink QoS flow and the data bearer through a non-access stratum (NAS) quality of service (QoS) reflective configuration 1-bit indicator (NAS reflective QoS) and an access stratum (AS) QoS reflective configuration 1-bit indicator (AS reflective QoS). According to some embodiments, the SDAP header may include QoS flow ID information indicating the QoS. According to some embodiments, the QoS information may be used as a data processing priority for supporting a smooth service, scheduling information, and the like.

The main functions of the NR PDCP 2d-05 or 2d-40 may include parts of the following functions.

Header compression and decompression: ROHC only
    Transfer of user data
    In-sequence delivery of higher layer PDUs
    Out-of-sequence delivery of higher layer PDUs
    PDCP PDU reordering for reception
    Duplicate detection of lower layer SDUs
    Retransmission of PDCP SDUs
    Ciphering and deciphering
    Timer-based SDU discard in an uplink As described above, reordering of the NR PDCP device means reordering of PDCP PDUs received from a lower layer based on PDCP sequence numbers (SNs). The reordering of the NR PDCP device may include transfer of data to a higher layer in the order of reordering, immediate transfer without considering the order, recording of lost PDCP PDUs through reordering, status report for the lost PDCP PDUs to a transmission side, and retransmission request for the lost PDCP PDUs.

The main functions of the NR RLC 2d-10 or 2d-35 may include parts of the following functions.

Transfer of higher layer PDUs
    In-sequence delivery of higher layer PDUs
    Out-of-sequence delivery of higher layer PDUs
    Error correction through an ARQ
    Concatenation, segmentation, and reassembly of RLC SDUs
    Re-segmentation of RLC data PDUs
    Reordering of RLC data PDUs
    Duplicate detection Protocol error detection RLC SDU discard RLC reestablishment As described above, in-sequence delivery of NR RLC device may mean in-sequence delivery of RLC SDUs received from a lower layer to a higher layer. In the case where one original RLC SDU is segmented into several RLC SDUs to be received, the in-sequence delivery of the NR RLC device may include reassembly and delivery of the RLC SDUs, reordering of the received RLC PDUs based on an RLC sequence number (SN) or a PDCP sequence number (SN), recording of lost RLC PDUs through reordering, status report for the lost RLC PDUs to a transmission side, retransmission request for the lost PDCP PDUs. The in-sequence delivery of the NR RLC device may include in-sequence delivery of only RLC SDUs just before the lost RLC SDU to a higher layer if there is the lost RLC SDU, in-sequence delivery of all RLC SDUs received before a specific timer starts its operation to a higher layer if the timer has expired although there is the lost RLC SDU, in-sequence delivery of all RLC SDUs received up to now to a higher layer if a specific timer has expired although there is the lost RLC SDU. The NR RLC device may process RLC PDUs in the order of their reception, and it may transfer the processed RLC PDUs to the NR PDCP device in an out-of-sequence delivery manner, and in the case of receiving segments, the NR RLC device may receive the segments stored in a buffer or to be received later, reconfigure them as one complete RLC PDU, and then transfer the reconfigured RLC PDU to the NR PDCP device. The NR RLC layer may not include a concatenation function, and the function may be performed by an NR MAC layer or it may be replaced by a multiplexing function of the NR MAC layer.

As described above, the out-of-sequence delivery of the NR RLC device may mean a function of transferring the RLC SDUs received from a lower layer directly to a higher layer regardless of their order. If one original RLC SDU is segmented into several RLC SDUs to be received, the out-of-sequence delivery of the NR RLC device may include reassembly and delivery of the RLC SDUs. The out-of-sequence delivery of the NR RLC device may include functions of storing and ordering the RLC SNs or PDCP SNs of the received RLC PDUs and recording of the lost RLC PDUs.

The NR MAC $2d$-15 or $2d$-30 may be connected to several NR RLC layer devices configured in one UE, and the main functions of the NR MAC may include parts of the following functions.

Mapping between logical channels and transport channels

Multiplexing/demultiplexing of MAC SDUs

Scheduling information reporting

HARQ function (error correction through HARQ)

Priority handling between logical channels of one UE

Priority handling between UEs by means of dynamic scheduling

MBMS service identification

Transport format selection padding

The NR PHY layer $2d$-20 or $2d$-25 may perform channel coding and modulation of higher layer data to configure and transmit OFDM symbols on a radio channel, or it may perform demodulation and channel decoding of the OFDM symbols received on the radio channel to transfer the demodulated and channel-decoded symbols to a higher layer.

Figure 2E:
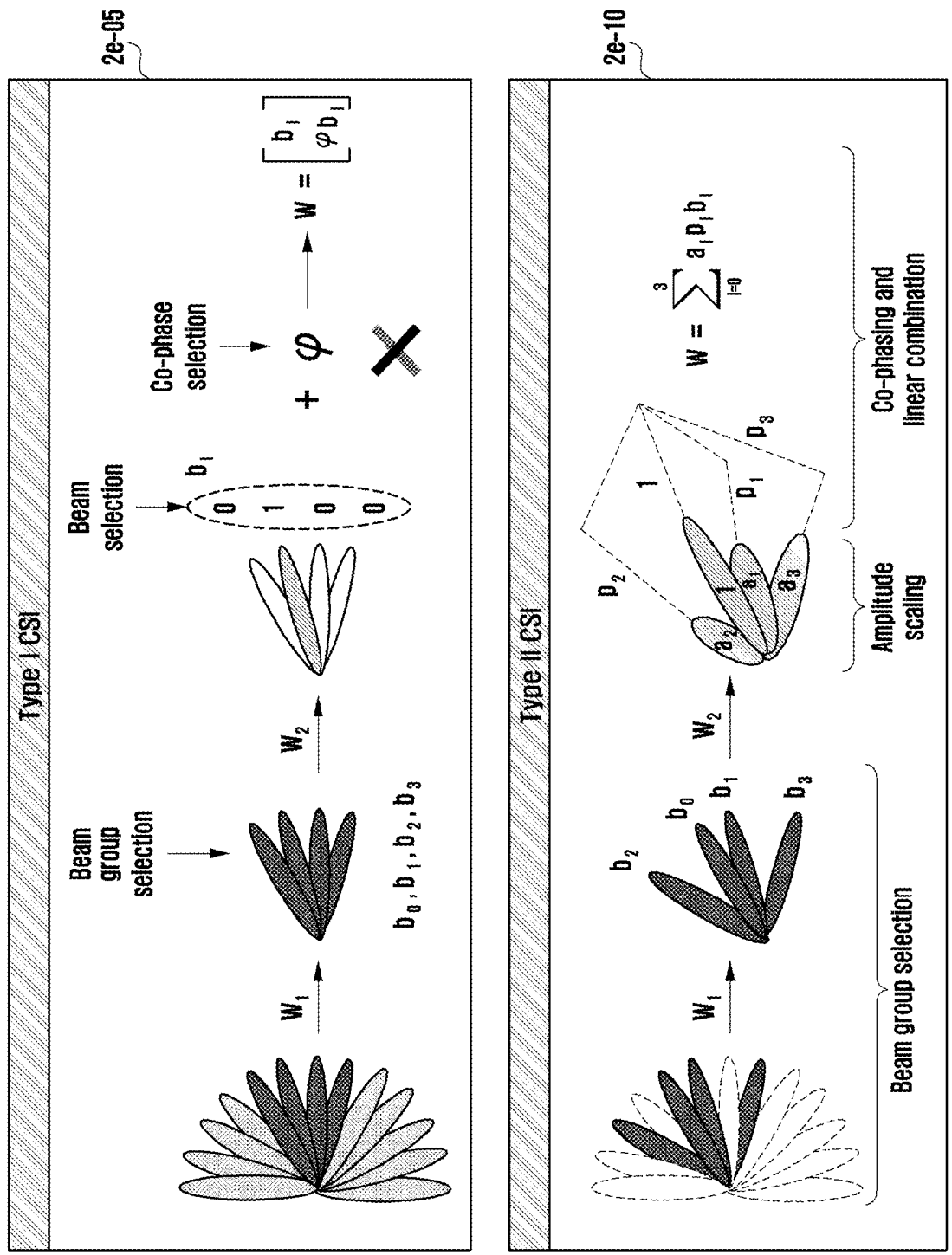
FIG. 2E illustrates a diagram of an overall explanation of a CSI codebook type in a NR system.

FIG. 2E illustrates a diagram of an overall explanation of a CSI codebook type in a NR system.

In order to report channel state information (CSI) to a base station, a terminal supporting MIMO may use a codebook based method. This is a method for reporting a precoding matrix indicator (PMI), and in this method, the base station can grasp the channel state by transmitting a corresponding indicator among predetermined precoding matrices in order to report the channel stat measured by the terminal. For reference, the base station having received a report of channel state information from the terminal may configure a better channel state through digital/analog beamforming based on the corresponding information.

In FIG. 2E, the reference numeral $2e$-05 is to explain type I CSI codebook in a method for the PMI. In NR, the terminal may have several beams, and the channel state may differ depending on what beam is selected. The type I CSI codebook means a CSI codebook that is applied in the case where the terminal selects a beam group composed of successive beams, selects a specific beam from the corresponding beam group, and perform communication with the base station. For example, this is actually a single beam based transmission, and the codebook may be selected in accordance with the channel state of the corresponding beam. In this case, the terminal may support a single panel and multi-panel codebook. For example, the configured type I CSI codebook may be configured by a single-panel or multiple-panel to be transmitted.

The reference numeral $2e$-10 is to explain type II CSI codebook in the method for the PMI. In contrast with the type I CSI codebook, the type II CSI codebook does not determine a beam group with initial successive beams, but determines the beam group in accordance with a specific condition. As an example, the terminal may configure L beams having a good beam performance as one group. Thereafter, the whole corresponding beam group is configured as a transmission beams, and the terminal measures and reports the channel performance for the corresponding beams. If the corresponding codebook is actually configured, transmission is performed using beams of the configured beam group, and thus it may be considered as multi-beam based transmission.

FIGS. 2FA and 2FB are diagrams explaining arrangement of terminal report parameters in accordance with a CSI codebook type in a NR system.

For example, in FIGS. 2FA and 2FB, a CSI codebook that can be supported by a terminal and additional codebook types have been enumerated, and parameters that are necessary in the case of supporting the corresponding codebook have been arranged.

1. TypeI-SinglePanelCodebook ($2f$-05): This corresponds to a case where a single panel of type I CSI codebook as described above with reference to FIG. 2E is used, and it includes the following parameters.

A. maxNumberTxPortsPerResource: The maximum number of transmission antenna ports capable of being applied within one resource that is simultaneously applied to all component carriers B. maxNumberResources: The number of resources simultaneously applied to all component carriers C. totalNumberTxPorts: The total number of transmission antenna ports simultaneously applied to all component carriers D. supportedCodebookMode: Supported codebook mode (mode 1 or both of mode 1 and mode 2).

E. maxNumberCSI-RS-PerResourceSet: The maximum number of CSI-RS resources in one resource set 2. TypeI-MultiPanelCodebook (2f-10): This corresponds to a case where a multi-panel of type I CSI codebook as described above with reference to FIG. 2E is used.

A. maxNumberTxPortsPerResource: The maximum number of transmission antenna ports capable of being applied within one resource that is simultaneously applied to all component carriers B. maxNumberResources: The number of resources simultaneously applied to all component carriers C. totalNumberTxPorts: The total number of transmission antenna ports simultaneously applied to all component carriers D. supportedCodebookMode: Supported codebook mode (mode 1 or both of mode 1 and mode 2).

E. supportedNumberPanels: The number of supported panels

F. maxNumberCSI-RS-PerResourceSet: The maximum number of CSI-RS resources in one resource set 3. TypeII-Codebook (2f-15): This corresponds to a case where type I CSI codebook as described above with reference to FIG. 2E is used, and it includes the following parameters.

A. maxNumberTxPortsPerResource: The maximum number of transmission antenna ports capable of being applied in one resource that is simultaneously applied to all component carriers B. maxNumberResources: The number of resources simultaneously applied to all component carriers C. totalNumberTxPorts: The total number of transmission antenna ports simultaneously applied to all component carriers D. parameterLx: This indicates a parameter "Lx" used to generate a codebook. Here, "Lx" means an index of transmission antenna ports indicated as maxNumberTxPortsPerResource.

E. amplitudeScalingType: This means an amplitude scaling type supported by a terminal (wideband or both of wideband and sub-band).

F. amplitudeSubsetRestriction: Indicator indicating whether a terminal support amplitude subset restriction 4. TypeII-CodebookPortSelection (2f-20): This corresponds to a case where a method capable of selecting a transmission antenna port in type II CSI codebook as described above with reference to FIG. 2E, and it include the following parameters.

A. maxNumberTxPortsPerResource: The maximum number of transmission antenna ports capable of being applied in one resource that is simultaneously applied to all component carriers B. maxNumberResources: The number of resources simultaneously applied to all component carriers C. totalNumberTxPorts: The total number of transmission antenna ports simultaneously applied to all component carriers D. parameterLx: This indicates a parameter "Lx" used to generate a codebook. Here, "Lx" means an index of transmission antenna ports indicated as maxNumberTxPortsPerResource.

E. amplitudeScalingType: This means an amplitude scaling type supported by a terminal (wideband or both of wideband and sub-band)

5. SRS-AssocCSI-RS (2f-25): This indicates whether a measured channel associated with a CSI-RS resource can be replaced in the case where a terminal calculates a precoder for SRS transmission, and it includes the following parameters.

A. maxNumberTxPortsPerResource: The maximum number of transmission antenna ports capable of being applied in one resource that is simultaneously applied to all component carriers B. maxNumberResources: The number of resources simultaneously applied to all component carriers C. totalNumberTxPorts: The total number of transmission antenna ports simultaneously applied to all component carriers The existing structure means that signaling for supporting respective codebooks exist in FeatureSetDownlink, and this becomes signaling for the corresponding band in each band combination (BC). For reference, FeatureSetDownlink matches per band per band combination in 1:1 manner. In other words, it is required to send signaling for the codebook support for each band in a BC supported by a terminal. For example, the terminal may transmit a parameter disclosed in FIGS. 2FA and 2FB for the first band and a parameter disclosed in FIGS. 2FB and 2FB for the second band. In addition, if the terminal supports a BC in which the first band and the second band are combined with each other, the terminal may further transmit a parameter disclosed in FIGS. 2FA and 2FB for the first band and a parameter disclosed in FIGS. 2FB and 2FB for the second band in the BC. In general, because the terminal generally supports a large number of BCs, a corresponding signaling overhead is considerably high. However, as can be seen from the above-described arrangement, it can be known that three common parameters (maxNumberTxPortsPerResource, maxNumberResources, totalNumberTxPorts) 2f-30, 2f-35, 2f-40, 2f-45, and 2f-50 exist in configuring all codebooks. In particular, because the three common parameters are configured to be simultaneously applied to all component carriers, they are not signaled through per band per BC, and the common codebook parameters may be signaled through per BC. Accordingly, the common codebook parameters have the same configuration value with respect to all bands in BC.

Further, even with respect to the remaining parameters that are not common codebook parameters (e.g., bluish grouped parameters in the drawing) 2f-55, 2f-60, 2f-65, and 2f-70, signaling may be performed through the existing per band per BC, or per band signaling may be configured.

Figure 2G:
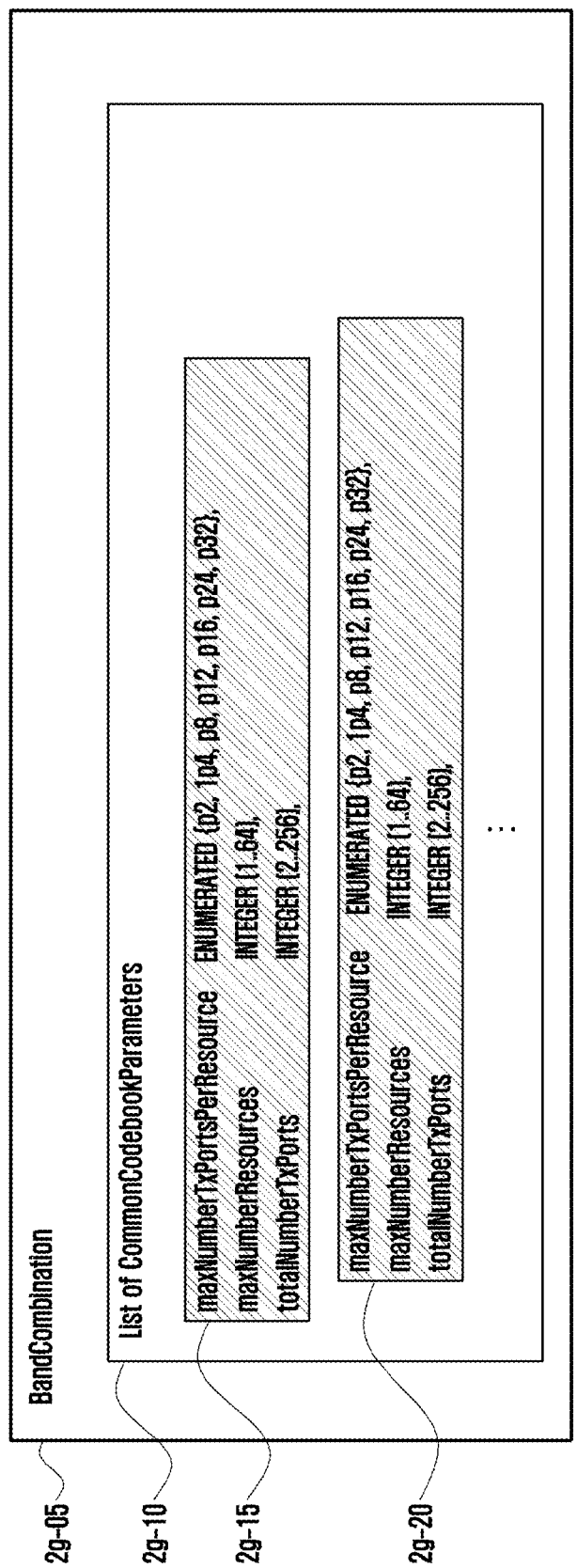
FIG. 2GA illustrates a diagram explaining embodiment 1 that is a candidate of a CSI codebook related UE capability report method in a NR system to which the disclosure is applied.
Figure 2G:
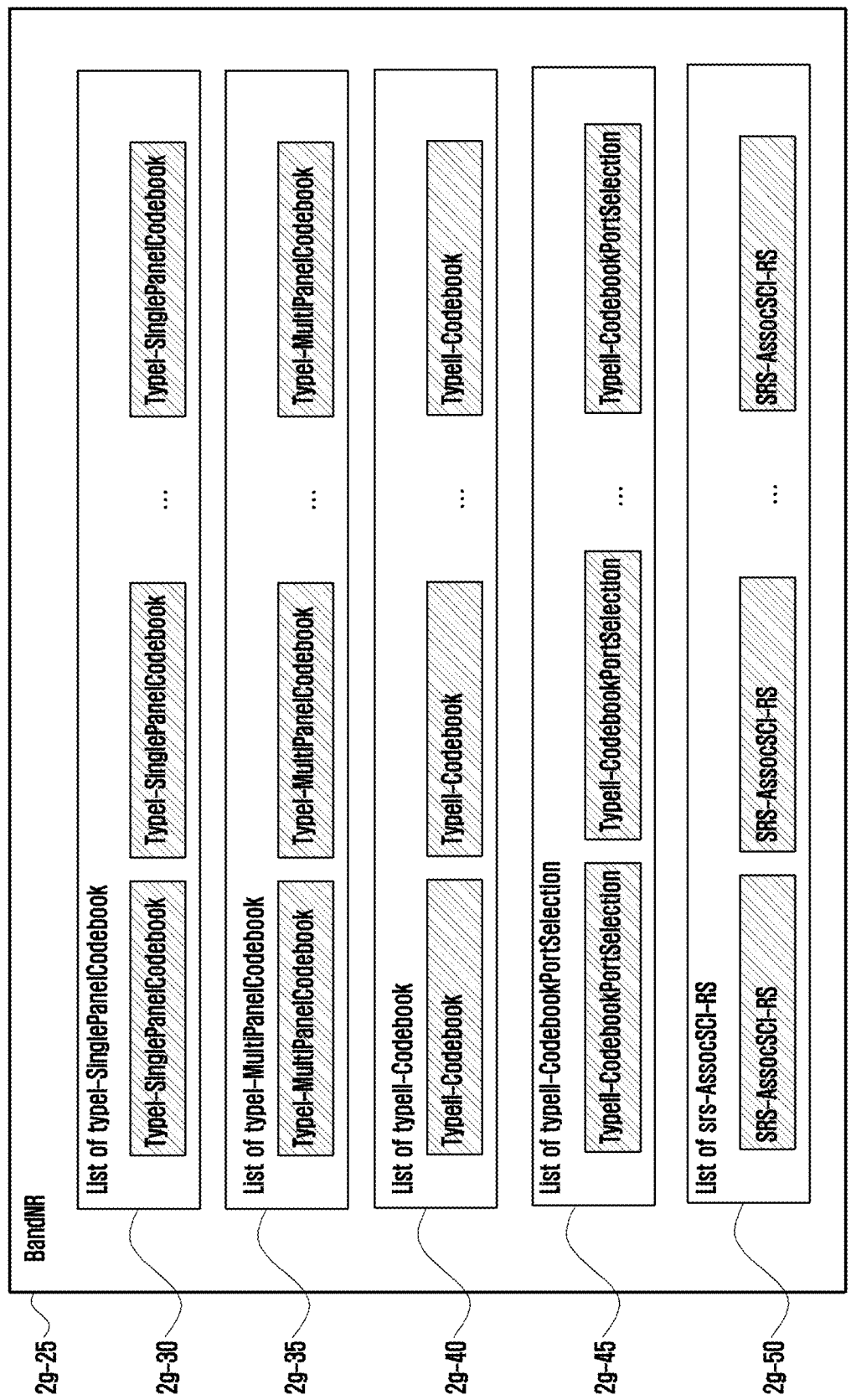

FIGS. 2GA and 2GB are diagrams explaining embodiment 1 that is a candidate of a CSI codebook related UE capability report method in a NR system to which the disclosure is applied.

Parameters that are necessary to report the CSI codebook methods in FIGS. 2FA and 2FB as described above as UE capability may be briefly divided into common code parameters and specific codebook parameters. Here, common codebook parameters 2g-15 and 2g-20 composed of maxNumberTxPortsPerResource, maxNumberResources, and totalNumberTxPorts may be signaled for each band combination 2g-05. For example, a list 2g-10 of common codebook parameters is signaled in each band combination reported by the terminal. This is because the terminal does not support only one common codebook parameter with respect to one band combination, but the terminal can support a plurality of different common codebook parameters. As an example, the size of the list may be 8 or 16.

Among parameters according to the CSI codebook types as described above with reference to FIGS. 2FA and 2FB, specific parameters for a specific CSI codebook exist, and they have been configured as specific codebook parameters. They correspond to the remaining parameters excluding the common codebook parameters among the codebook parameters in FIGS. 2FA and 2FB. Embodiment 1 proposes a structure in which the corresponding specific codebook parameters are signaled for respective bands.

In accordance with 4 codebook types, a plurality of lists including respective specific codebook parameters may exist. This is because the terminal does not support only one parameter combination with respect to a selected codebook, but it can support a plurality of parameter combinations. As an example, the size of the list may be 8 or 16. In accordance with the selected one of 4 codebook types, the following specific codebook parameters are included. For reference, in SRS-AssocCSI-RS (2*f*-25) of FIG. 2F, specific codebook parameters do not exist. For example, only the common codebook parameters are configured. However, if a new parameter is introduced later, the structure as denoted by a drawing reference numeral 2*g*-50 may be included.

1. TypeI-SinglePanelCodebook (2*g*-30): Configuration of a plurality of lists including the following parameters in the form of a list A. supportedCodebookMode: Supported codebook mode (mode 1 or both of mode 1 and mode 2).

B. maxNumberCSI-RS-PerResourceSet: The maximum number of CSI-RS resources in one resource set 2. TypeI-MultiPanelCodebook (2*g*-35): Configuration of a plurality of lists including the following parameters in the form of a list A. supportedCodebookMode: Supported codebook mode (mode 1 or both of mode 1 and mode 2).

B. supportedNumberPanels: The number of supported panels

C. maxNumberCSI-RS-PerResourceSet: The maximum number of CSI-RS resources in one resource set 3. TypeII-Codebook (2*g*-40): Configuration of a plurality of lists including the following parameters in the form of a list A. parameterLx: This indicates parameter "Lx" used to generate codebook. Here, "Lx" means an index of a transmission antenna port indicated as maxNumberTxPortsPerResource B. amplitudeScalingType: Amplitude scaling type supported by a terminal (wideband or both of wideband and sub-band)

C. amplitudeSubsetRestriction: Indicator indicating whether a terminal supports amplitude subset restriction 4. TypeII-CodebookPortSelection (2*g*-45): Configuration of a plurality of lists including the following parameters in the form of a list A. parameterLx: This indicates parameter "Lx" used to generate codebook. Here, "Lx" means an index of a transmission antenna port indicated as maxNumberTxPortsPerResource B. amplitudeScalingType: Amplitude scaling type supported by a terminal (wideband or both of wideband and sub-band)

Figure 2H:
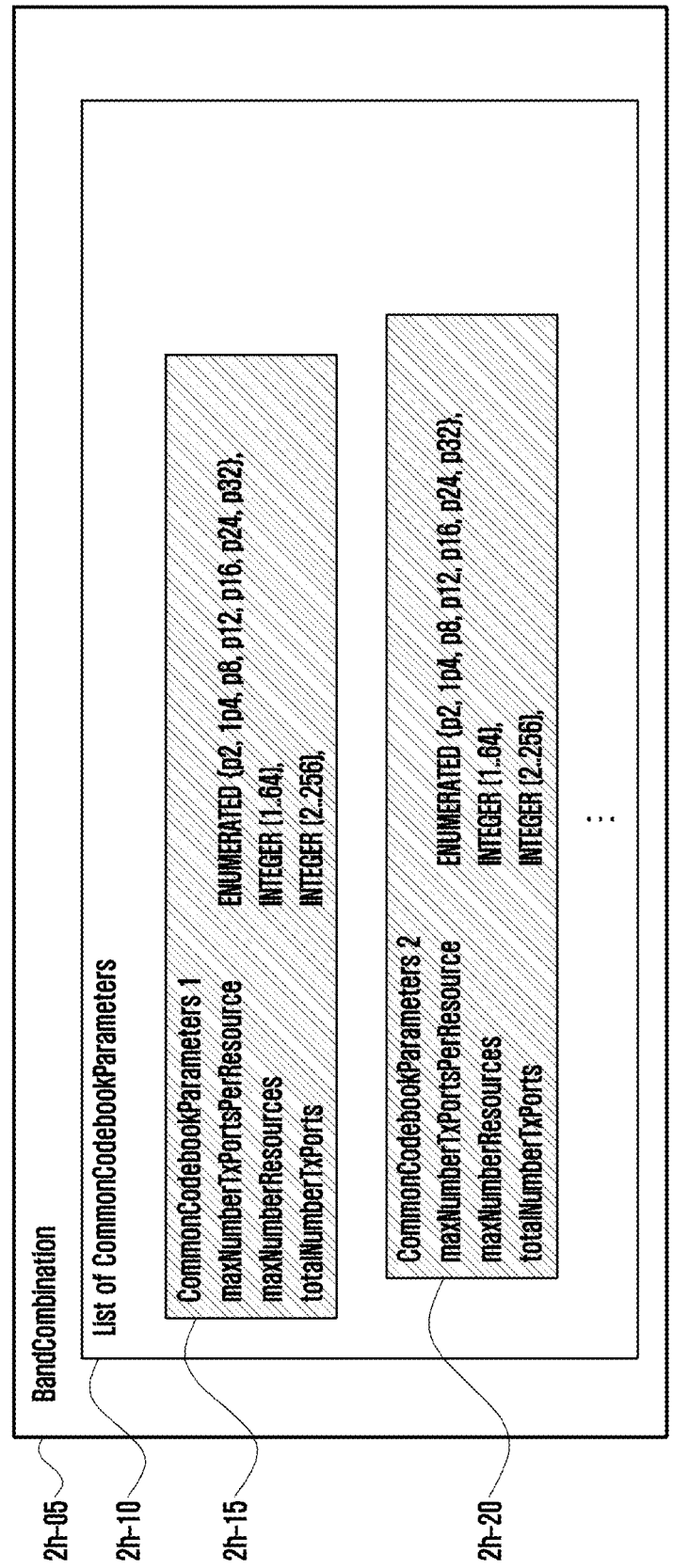
FIG. 2HA illustrates a diagram explaining embodiment 2 that is a candidate of a CSI codebook related UE capability report method in a NR system to which the disclosure is applied.
Figure 2H:
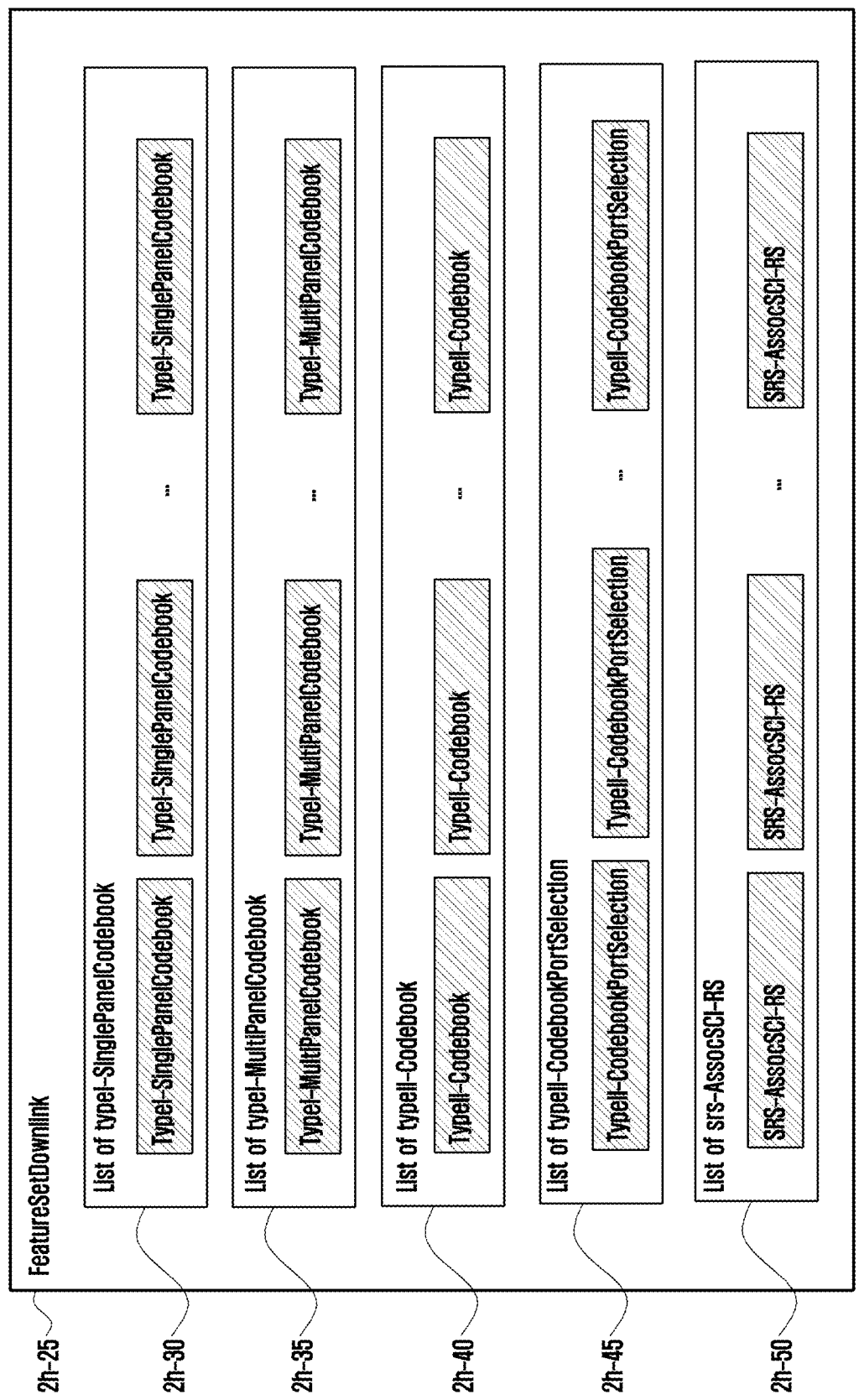

FIGS. 2HA and 2HB are diagrams explaining embodiment 2 that is a candidate of a CSI codebook related UE capability report method in a NR system to which the disclosure is applied.

Parameters that are necessary to report the CSI codebook methods in FIGS. 2FA and 2FB as described above as the UE capability may be briefly divided into common code parameters and specific codebook parameters. Here, common codebook parameters 2*h*-15 and 2*h*-20 composed of maxNumberTxPortsPerResource, maxNumberResources, and totalNumberTxPorts may be signaled for each band combination 2*h*-05. For example, a list 2*h*-10 of common codebook parameters is signaled in each band combination reported by the terminal. This is because the terminal does not support only one common codebook parameter with respect to one band combination, but the terminal can support a plurality of different common codebook parameters. As an example, the size of the list may be 8 or 16.

Among parameters according to the CSI codebook types as described above with reference to FIGS. 2FA and 2FB, specific parameters for a specific CSI codebook exist, and they have been configured as specific codebook parameters. They correspond to the remaining parameters excluding the common codebook parameters among the codebook parameters in FIGS. 2FA and 2FB. Embodiment 2 proposes a structure in which the corresponding specific codebook parameters are signaled per band per band combination. For reference, in the current NR standards, UE capabilities being signaled as above are tied into FeatureSet to be signaled. The corresponding features are downlink related features, and thus they are included in FeatureSetDownlink.

In accordance with 4 codebook types, a plurality of lists including respective specific codebook parameters may exist. This is because the terminal does not support only one parameter combination with respect to a selected codebook, but it can support a plurality of parameter combinations. As an example, the size of the list may be 8 or 16. In accordance with the selected one of 4 codebook types, the following specific codebook parameters are included. For reference, in SRS-AssocCSI-RS (2*f*-25) of FIG. 2F, specific codebook parameters do not exist. For example, only the common codebook parameters are configured. However, if a new parameter is introduced later, the structure as denoted by a drawing reference numeral 2*h*-50 may be included.

1. TypeI-SinglePanelCodebook (2*h*-30): Configuration of a plurality of lists including the following parameters in the form of a list A. supportedCodebookMode: Supported codebook mode (mode 1 or both of mode 1 and mode 2).

B. maxNumberCSI-RS-PerResourceSet: The maximum number of CSI-RS resources in one resource set 2. TypeI-MultiPanelCodebook (2*h*-35): Configuration of a plurality of lists including the following parameters in the form of a list A. supportedCodebookMode: Supported codebook mode (mode 1 or both of mode 1 and mode 2).

B. supportedNumberPanels: The number of supported panels C. maxNumberCSI-RS-PerResourceSet: The maximum number of CSI-RS resources in one resource set 3. TypeII-Codebook (2*h*-40): Configuration of a plurality of lists including the following parameters in the form of a list A. parameterLx: This indicates parameter "Lx" used to generate codebook. Here, "Lx" means an index of a transmission antenna port indicated as maxNumberTxPortsPerResource B. amplitudeScalingType: Amplitude scaling type supported by a terminal (wideband or both of wideband and sub-band)

C. amplitudeSubsetRestriction: Indicator indicating whether a terminal supports amplitude subset restriction 4. TypeII-CodebookPortSelection (2*h*-45): Configuration of a plurality of lists including the following parameters in the form of a list A. parameterLx: This indicates parameter "Lx" used to generate codebook. Here, "Lx" means an index of a transmission antenna port indicated as maxNumberTxPortsPerResource B. amplitudeScalingType: Amplitude scaling type supported by a terminal (wideband or both of wideband and sub-band)

Figure 2I:
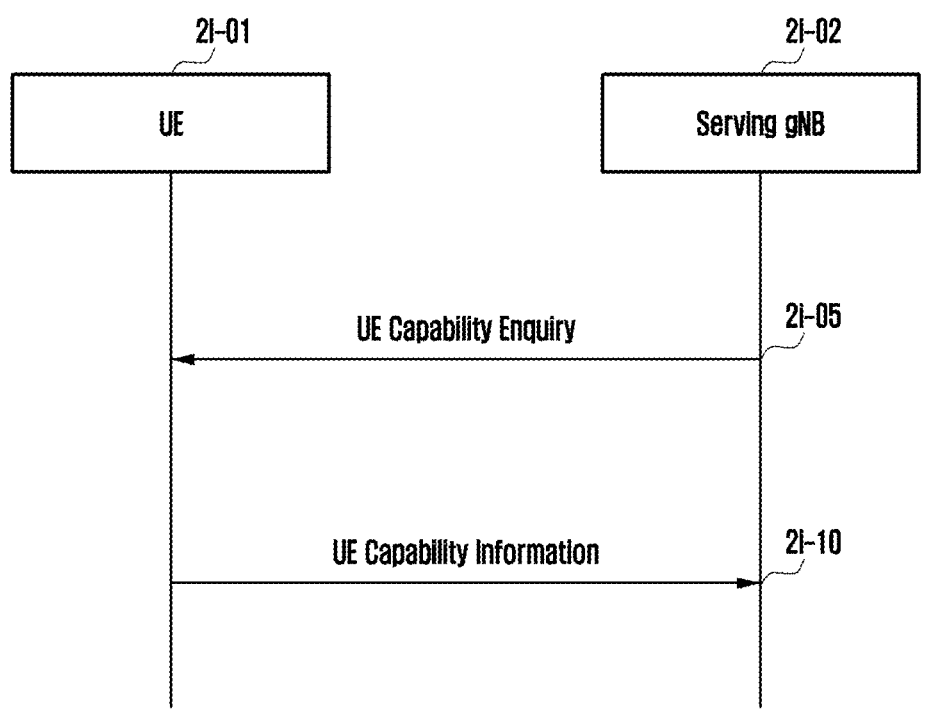
FIG. 2I illustrates a diagram of a message structure for reporting a UE capability in a NR system.

FIG. 2I illustrates a diagram of a method for indicating a UE capability in a NR system according to an embodiment.

A terminal 2i-01 may report capability supported by the terminal to a serving base station 2i-02 in a connected state to the corresponding base station. At operation 2i-05, the base station transfers a UE capability enquiry message for requesting a capability report to the terminal in a connected state. The massage may include frequency band information requested by the base station 2i-02, and if it is desired to receive capability in all frequencies supported by the terminal 2i-01, a specific frequency may not be designated. Further, the message can be requested for each RAT of the terminal 2i-01. For example, the base station 2i-02 may request the UE capability for MR-DC including NR, LTE, and EN-DC. For reference, it is general to initially send the UE capability enquiry message after the connection of the terminal, but if necessary, the base station may request the message on any condition.

The terminal 2i-01 having received the UE capability report request from the base station 2i-02 in the above-described process may configure the UE capability in accordance with the RAT type and band information requested from the base station 2i-02. If the terminal 2i-01 does not designate a specific band, it may configure the capability with respect to all bands supported by the terminal 2i-01. After the UE capability is configured, the terminal 2i-01, at operation 2i-10, may transfer a UE capability information message including the UE capability to the base station 2i-02. Then, the base station 2i-02 may perform proper scheduling and transmission/reception management with respect to the corresponding terminal 2i-01 based on the UE capability received from the terminal 2i-01.

In embodiment 1 and embodiment 2 as described above, the terminal may report CSI codebook related parameters supported by itself, and the base station may perform codebook configuration in accordance with the reported value. However, the terminal may not report the CSI codebook, and in this case, the terminal performs minimum CSI codebook support. For example, a default value supported by the terminal should be configured in the case where the terminal exists in frequency range 1 (FR1) and it supports wideband CSI reporting, in the case where the terminal exists in frequency range 1 (FR1) and it supports subband CSI reporting, and in the case where the terminal exists in frequency range 2 (FR2) and it supports subband CSI reporting.

The easiest method is a method in which a corresponding CSI codebook parameter supported by the terminal is defined based on a default value, and if the terminal does not report the corresponding CSI codebook information to the UE capability, the corresponding default value is applied. In the above-described method, common codebook parameters are predefined as specific values, and if the CSI codebook information is not included in the corresponding BC, the default value is applied.

Detailed examples are defined below.

1. In the case of FR1 wideband CSI reporting, usage of codebooks of 8 transmission antennas is basically defined, and the following common codebook parameters are provided as default values.

| | |
|---|---|
| maxNumberTxPortsPerResource | p4, |
| maxNumberResources | 1, |
| totalNumberTxPorts | 4, |

2. In the case of FR1 subband CSI reporting, usage of codebooks of 4 transmission antennas is basically defined, and the following common codebook parameters are provided as default values.

| | |
|---|---|
| maxNumberTxPortsPerResource | p8, |
| maxNumberResources | 1, |
| totalNumberTxPorts | 8, |

3. In the case of FR2 subband CSI reporting, usage of codebooks of 2 transmission antennas is basically defined, and the following common codebook parameters are provided as default values.

| | |
|---|---|
| maxNumberTxPortsPerResource | p2, |
| maxNumberResources | 1, |
| totalNumberTxPorts | 2, |

The default application values of detailed parameters may differ from each other, and the corresponding values are values applied to the whole terminal, and they may be defined as signaling for each terminal, rather than signaling for each BC of the UE capability, or as a value mandatorily supported without separate signaling. In the following drawings, it has been defined how to apply the default value in the case where the CSI codebook default value of the terminal is not specified as described above. As previously described, the CSI codebook default value of the terminal is applied in the case where the CSI codebook related capability of the terminal is not included in the UE capability. In contrast, from the viewpoint of the terminal, if the terminal desires to apply the CSI codebook related default value, the CSI codebook capability of the terminal may be omitted with respect to the corresponding BC.

Figure 2J:
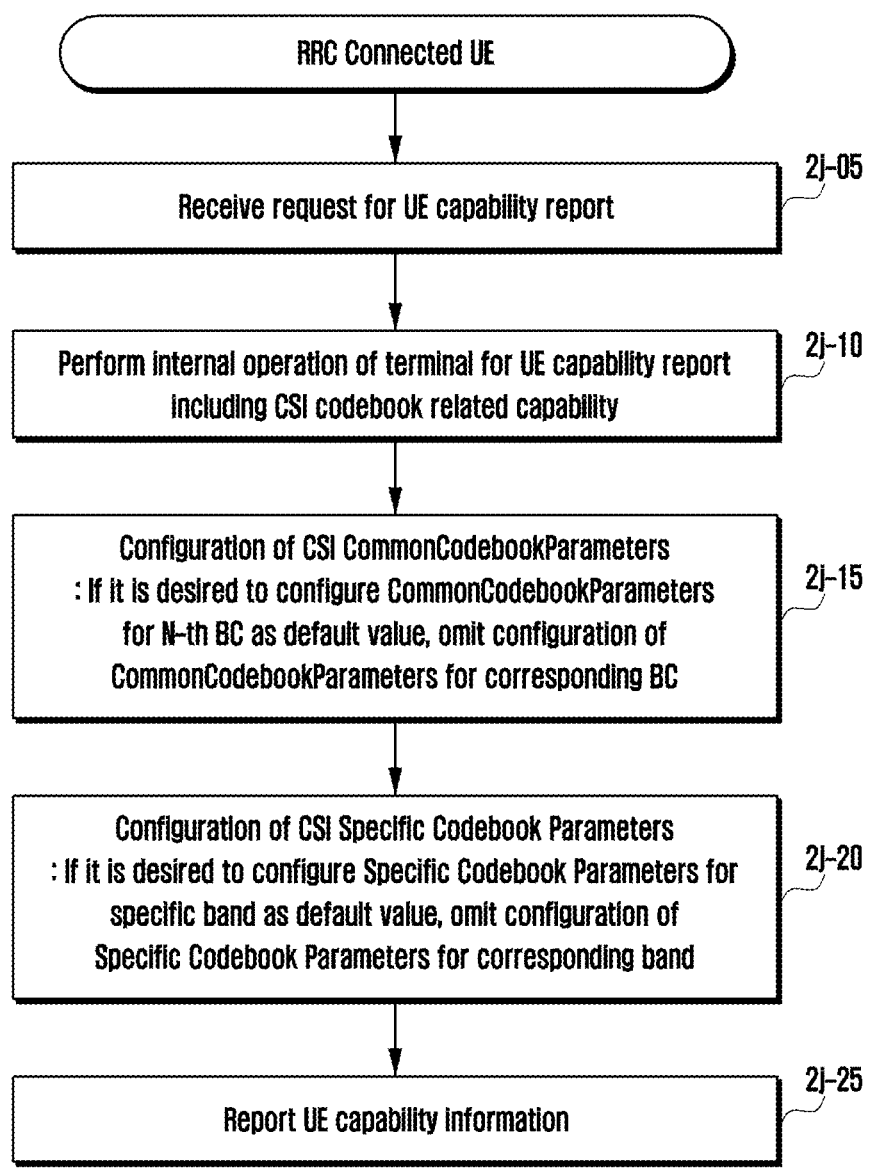
FIG. 2J illustrates a diagram of a first operation of a terminal in which the terminal configures a CSI codebook capability in the case where embodiment 1 of the disclosure is applied.

FIG. 2J illustrates a diagram of a first operation of a terminal in which the terminal configures a CSI codebook capability in the case where embodiment 1 of the disclosure is applied. For example, the corresponding terminal operation may be applied in the case where CSI common codebook parameters are signaled for each BC and the CSI specific codebook parameters are signaled for each band. On the other hand, this is merely an embodiment, and the CSI common codebook parameters may be applied to a certain band regardless of the BC. For example, the CSI common codebook parameters may also be signaled for each band.

At operation 2j-05, the terminal in an RRC connected state may receive a UE capability enquiry to request reporting of the UE capability from the base station. In this case, the terminal may configure the UE capability in accordance with the corresponding request. The message may include frequency band information requested by the base station, and if the terminal desires to receive capability in all frequencies supported by the terminal, a specific frequency may not be designated. Further, the message can be requested for each RAT of the terminal. For example, the base station may request the UE capability for the MR-DC including the NR, LTE, and EN-DC. For reference, although it is general to initially send the UE capability enquiry message after the terminal connection, the base station, if necessary, may request the message on any condition.

At operation 2j-10, the terminal may configure the UE capability in accordance with a base station request. CSI codebook related parameters may be included in the above-described contents. At operation 2j-15, the terminal may configure the CSI common codebook parameter for each BC supported by the terminal. Further, regardless of the BC, the terminal may apply the CSI common codebook parameter to a certain band. For example, the CSI common codebook parameters may also be signaled for each band. If it is desired to configure the specific n-th entry value as the default value with respect to CommonCodebookParameters for the N-th BC, the terminal omits the n-th entry configuration of CommonCodebookParameters for the N-th BC. In the same manner, at operation 2j-20, the terminal may configure the CSI specific codebook parameter for each band supported by the terminal. If it is desired to configure the m-th entry as the default value with respect to the specific codebook parameter for the M-th band, the terminal omits the configuration of the m-th entry of the specific codebook parameter for the M-th band.

Figure 2K:
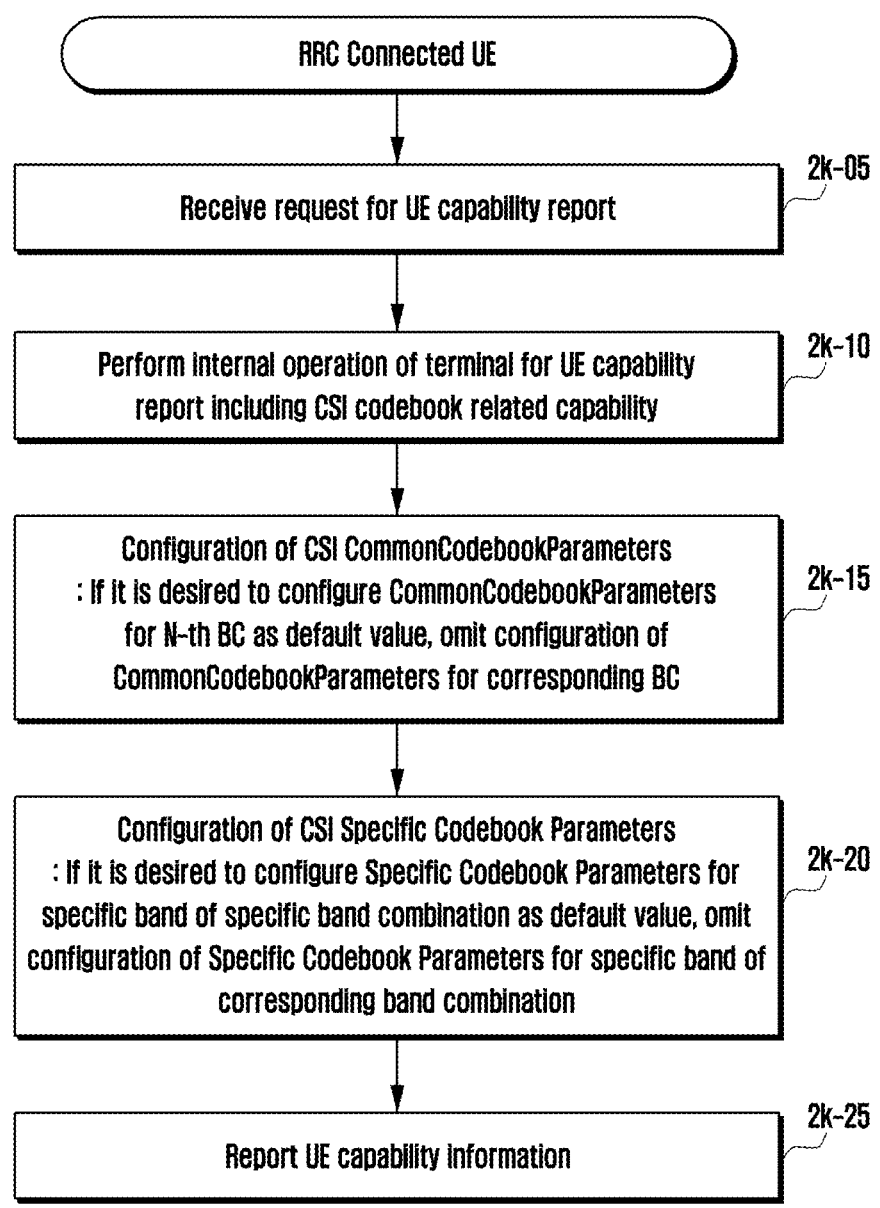
FIG. 2K illustrates a diagram of a second operation of a terminal in which the terminal configures a CSI codebook capability in the case where embodiment 2 of the disclosure is applied.

FIG. 2K illustrates a diagram of a second operation of a terminal in which the terminal configures a CSI codebook capability in the case where embodiment 2 of the disclosure is applied. For example, the corresponding terminal operation is applied in the case where CSI common codebook parameters are signaled for each BC and the CSI specific codebook parameters are signaled for each band of a band combination.

If a UE capability enquiry to request reporting of the UE capability is received from the base station, the terminal in an RRC connected state, at operation 2k-05, configures the UE capability in accordance with the corresponding request. The message may include frequency band information requested by the base station, and if the terminal desires to receive the capability in all frequencies supported by the terminal, a specific frequency may not be designated. Further, the message can be requested for each RAT of the terminal. For example, the base station may request the UE capability for the MR-DC including the NR, LTE, and EN-DC. For reference, although it is general to initially send the UE capability enquiry message after the terminal connection, the base station, if necessary, may request the message on any condition.

At operation 2k-10, the terminal configures UE capability in accordance with a base station request. CSI codebook related parameters may be included in the above-described contents. At operation 2k-15, the terminal may configure the CSI common codebook parameter for each BC supported by the terminal. If it is desired to configure the specific n-th entry value as the default value with respect to CommonCodebookParameters for the N-th BC, the terminal omits the n-th entry configuration of CommonCodebookParameters for the N-th BC. In the same manner, at operation 2k-20, the terminal may configure the CSI specific codebook parameter for each band of a band combination supported by the terminal. If it is desired to configure the m-th entry as the default value with respect to the specific codebook parameter for a specific band of the M-th band combination, the terminal omits the configuration of the m-th entry of the specific codebook parameter for the corresponding band of the M-th band combination.

Figure 2L:
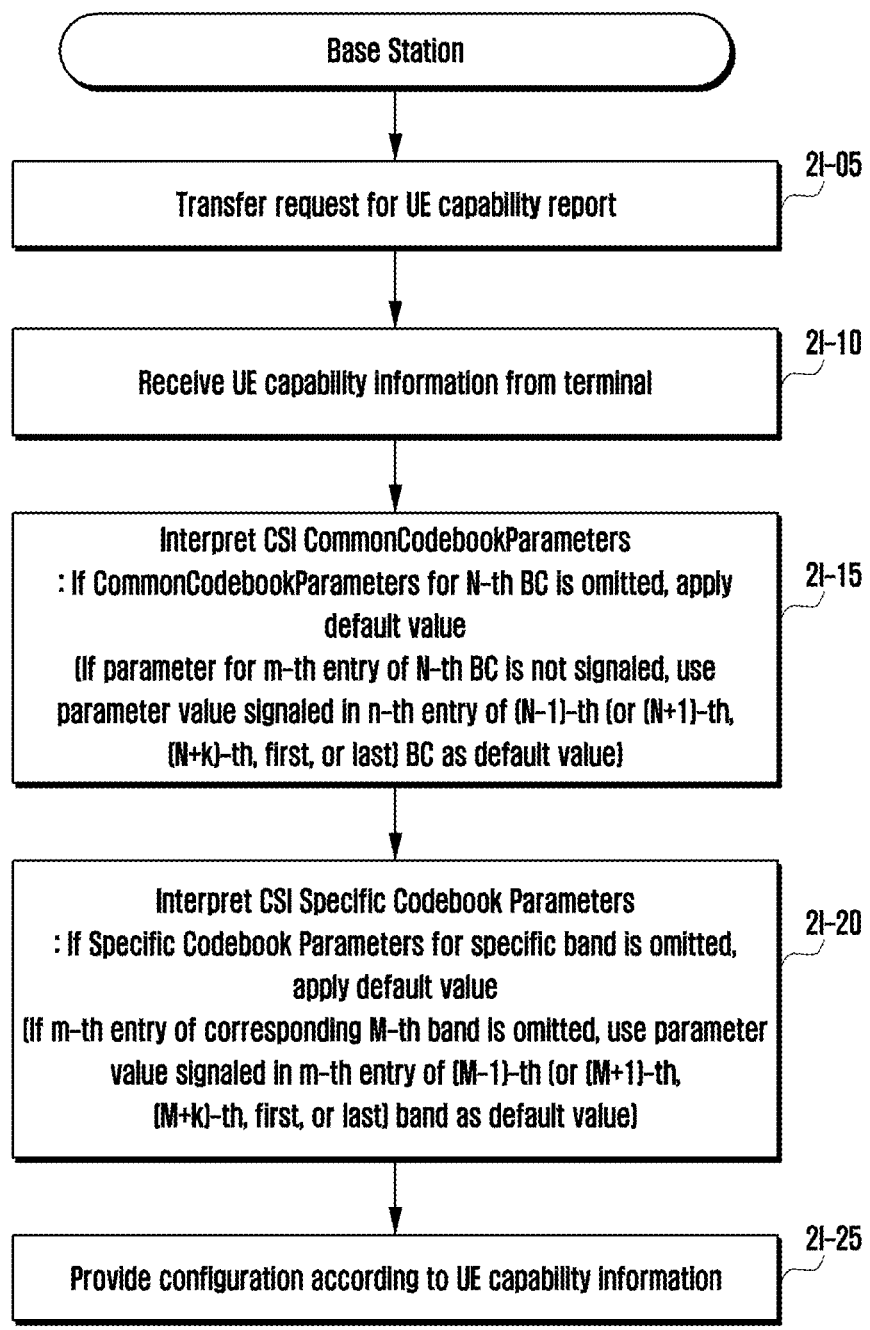
FIG. 2L illustrates a diagram of a first operation of a base station in which the base station interprets a CSI codebook capability in the case where embodiment 1 of the disclosure is applied.

FIG. 2L illustrates a diagram of a first operation of a base station in which the base station interprets a CSI codebook capability in the case where embodiment 1 of the disclosure is applied. For example, the corresponding base station operation is applied in the case where CSI common codebook parameters are signaled for each BC and the CSI specific codebook parameters are signaled for each band of a band combination. Meanwhile, this is merely an embodiment, and the CSI common codebook parameters may be applied to a certain band regardless of the BC. For example, the CSI common codebook parameters may also be signaled for each band.

At operation 2l-05, the terminal in an RRC connected state requests the base station to report the UE capability (UE capability enquiry), and at operation 2l-10, the base station receives capability information from the terminal. If the capability is received from the terminal in the above-described process, it is necessary that the base station analyzes and interprets the corresponding capability.

At operation 2l-15, the base station interprets the received CSI codebook related terminal capability, and in particular, common codebook parameters. If CommonCodebookParameters for the N-th BC are omitted, the base station applies the default value in configuring the CSI codebook for the corresponding BC. As an example, if the parameter for the n-th entry of the N-th BC is not signaled, the base station may use the parameter value signaled in the n-th entry of the (N−1)-th (or (N+1)-th, (N+k)-th, first, or last) BC as the default value. At operation 2l-20, the base station interprets the received CSI codebook related UE capability, and in particular, the specific codebook parameters. If the specific codebook parameters for the M-th band are omitted, the base station applies the default value in configuring the CSI codebook for the corresponding band. As an example, if the m-th entry of the M-th band is omitted, the base station may use the parameter value signaled in the m-th entry of the (M−1)-th (or (M+1)-th, (M+k)-th, first, or last) band as the default value.

At operation 2l-25, the base station provides configuration information to the terminal based on the interpreted UE capability.

Figure 2M:
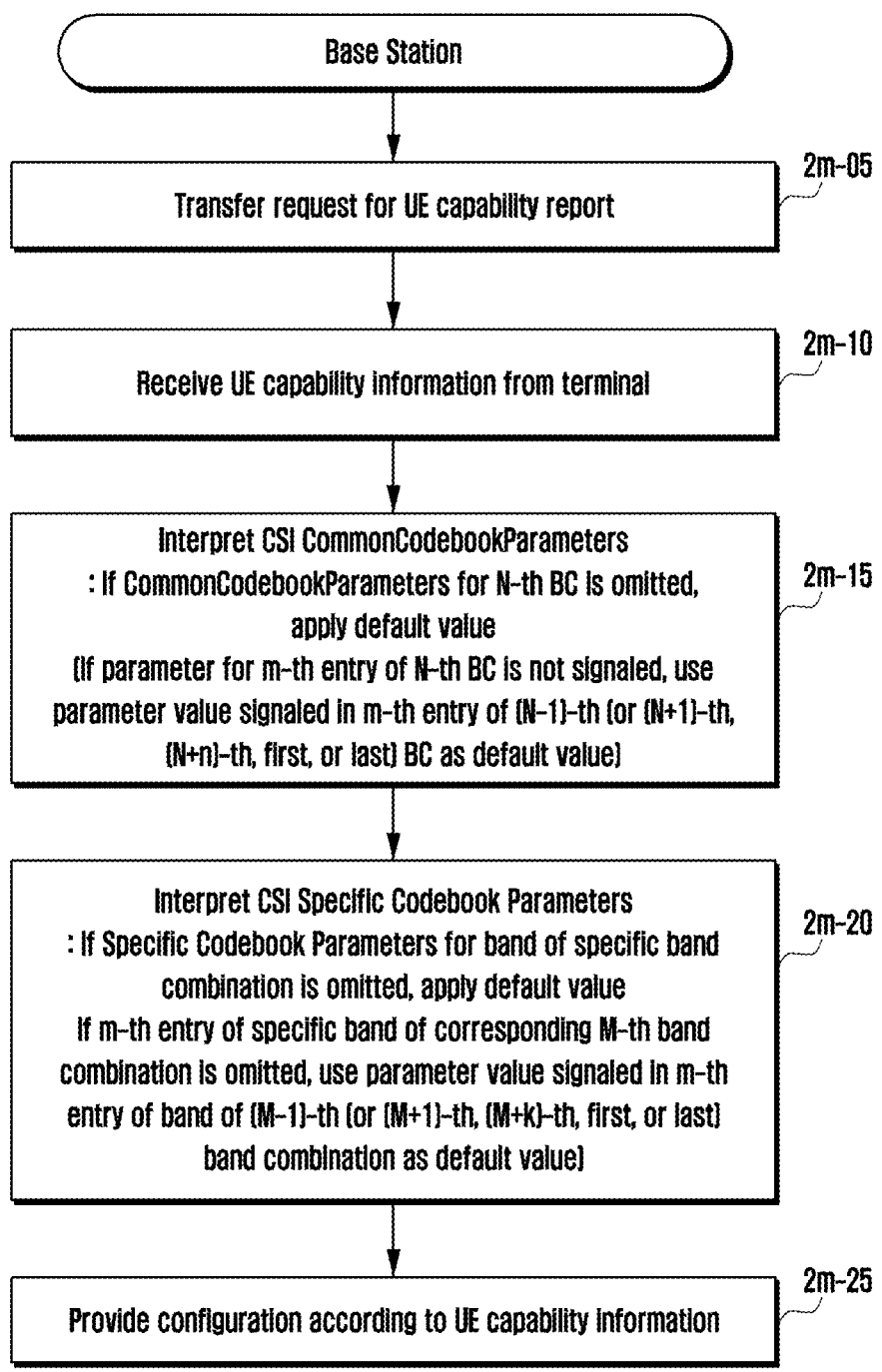
FIG. 2M illustrates a diagram of a second operation of a base station in which the base station interprets a CSI codebook capability in the case where embodiment 1 of the disclosure is applied.

FIG. 2M illustrates a diagram of a second operation of a base station in which the base station interprets a CSI codebook capability in the case where embodiment 1 of the disclosure is applied. For example, the corresponding base station operation is applied in the case where CSI common codebook parameters are signaled for each BC and the CSI specific codebook parameters are signaled for each band of a band combination.

At operation 2m-05, the terminal in an RRC connected state may request the base station to report the UE capability (UE capability enquiry). Further, at operation 2m-10, the base station receives capability information from the terminal. If the capability is received from the terminal in the above-described process, it is necessary that the base station analyzes and interprets the corresponding capability.

At operation 2m-15, the base station interprets the received CSI codebook related terminal capability, for example, common codebook parameters. If CommonCodebookParameters for the N-th BC are omitted, the base station applies the default value in configuring the CSI codebook for the corresponding BC. As an example, if the parameter for the n-th entry of the N-th BC is not signaled, the base station may use the parameter value signaled in the n-th entry of the (N−1)-th (or (N+1)-th, (N+k)-th, first, or last) BC as the default value. At operation 2m-20, the base station interprets the received CSI codebook related UE capability, and in particular, the specific codebook parameters. If the specific codebook parameters for the specific band of the M-th band combination are omitted, the base station applies the default value in configuring the CSI codebook for the specific band of the corresponding band combination. As an example, if the m-th entry of the M-th band is omitted, the base station may use the parameter value signaled in the m-th entry of the (M−1)-th (or (M+1)-th, (M+k)-th, first, or last) band as the default value.

At operation 2m-25, the base station provides configuration information to the terminal based on the interpreted UE capability.

Figure 2N:
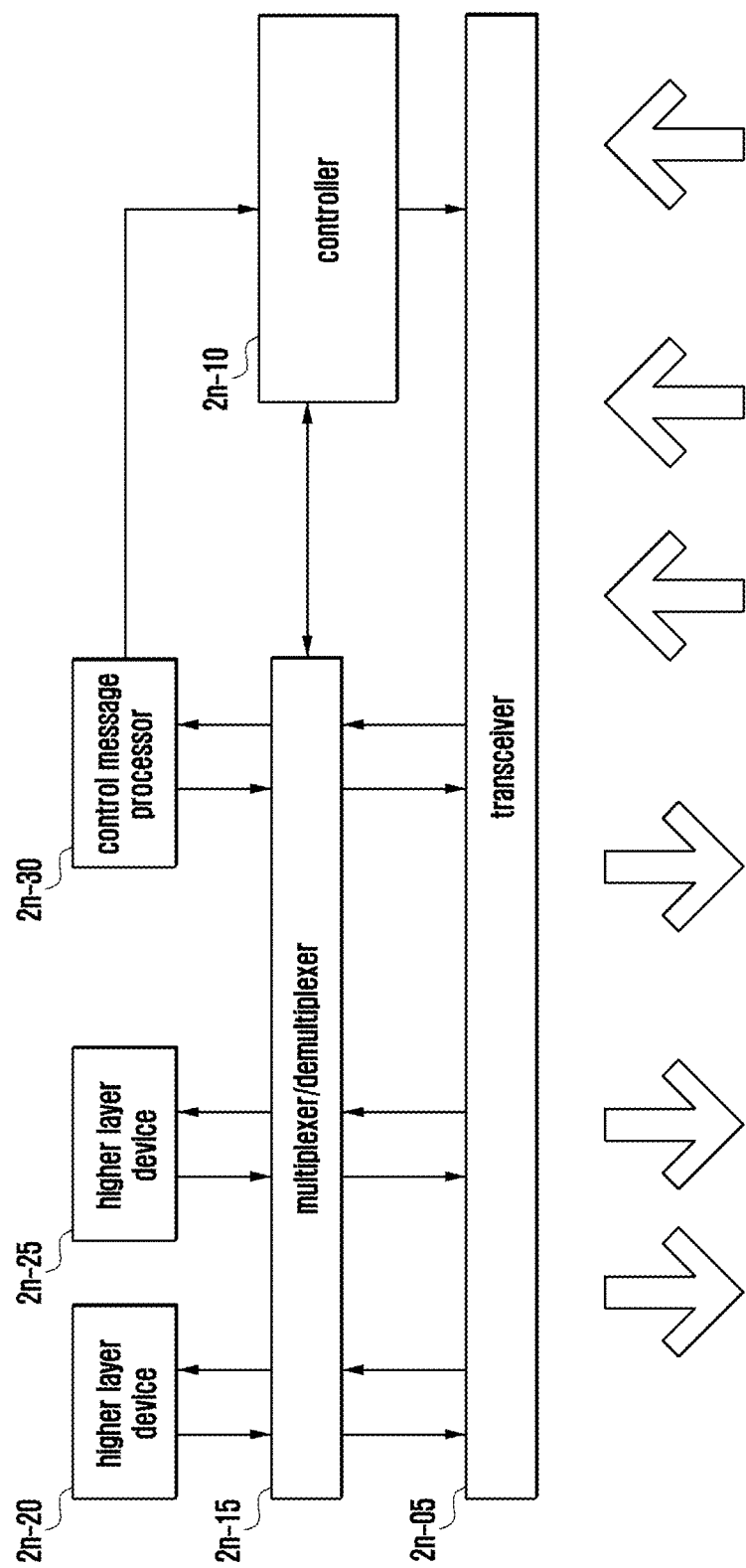
FIG. 2N illustrates a diagram of the block configuration of a terminal according to an embodiment of the disclosure.
Figure 20:
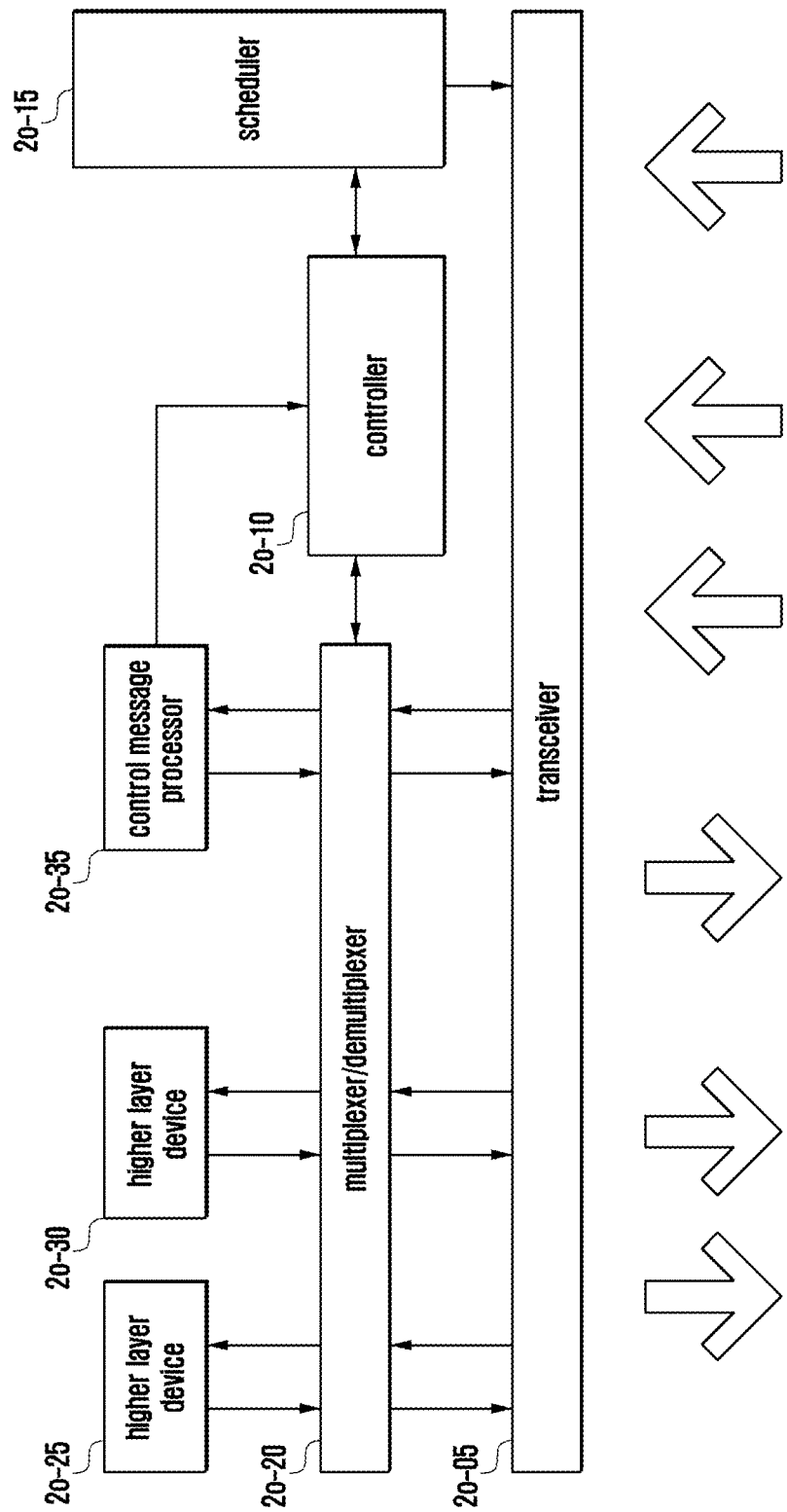

FIG. 2N illustrates a diagram of the block configuration of a terminal according to an embodiment of the disclosure.

As illustrated in FIG. 2N, a terminal according to an embodiment of the disclosure includes a transceiver 2n-05, a controller 2n-10, a multiplexer/demultiplexer 2n-15, various kinds of higher layer processors 2n-20 and 2n-25, and a control message processor 2n-30.

The transceiver 2n-05 receives data and a specific control signal on a forward channel of a serving cell, and it transits the data and the specific control signal on a backward channel. If a plurality of serving cells are configured, the transceiver 2n-05 performs transmission and reception of the data and the control signal through the plurality of serving cells. The multiplexer/demultiplexer 2n-15 serves to multiplex data generated by the higher layer processors 2n-20 and 2n-25 or the control message processor 2n-30, to demultiplex the data received through the transceiver 2n-05, and to transfer the multiplexed or demultiplexed data properly to the higher layer processors 2n-20 and 2n-25 or the control message processor 2n-30. The control message processor 2n-30 takes a necessary operation through transmitting and receiving a control message from a base station. Here, the control message processor includes functions of processing a control message, such as an RRC message and MAC CE, and performing a report of a CBR measurement value, and receiving an RRC message for a resource pool and the terminal operation. The higher layer processor 2n-20 or 2n-25 means a DRB device, and it may be configured for each service. The higher layer processor processes data generated through a user service, such as a file transfer protocol (FTP) or voice over Internet protocol (VoIP), and transfers the processed data to the multiplexer/demultiplexer 2n-15, or processes data transferred from the multiplexer/demultiplexer 2n-15 and transfers the processed data to a service application of a higher layer. The controller 2n-10 controls the transceiver 2n-05 and the multiplexer/demultiplexer 2n-15 to identify scheduling commands, for example, backward grants, received through the transceiver 2n-05 and to perform backward transfer thereof as proper transfer resources at a proper time. On the other hand, although it has been described that the terminal is composed of a plurality of blocks and the blocks perform different functions, this is merely exemplary, and the embodiment is not limited thereto. For example, the controller 2n-10 may perform the function performed by the demultiplexer 2n-15.

FIG. 2O illustrates a diagram of the block configuration of a base station according to an embodiment of the disclosure.

A base station of FIG. 2O includes a transceiver 2o-05, a controller 2o-10, a multiplexer/demultiplexer 2o-20, a control message processor 2o-35, various kinds of higher layer processors 2o-25 and 2o-30, and a scheduler 2o-15.

The transceiver 2o-05 transmits data and a specific control signal on a forward carrier, and it receives the data and the specific control signal on a backward carrier. The multiplexer/demultiplexer 2o-20 serves to multiplex data generated by the higher layer processors 2o-25 and 2o-30 or the control message processor 2o-35, to demultiplex the data received through the transceiver 2o-05, and to transfer the multiplexed or demultiplexed data properly to the higher layer processors 2o-25 and 2o-30, the control message processor 2o-35, or the controller 2o-10. The control message processor 2o-35 generates a message to be transferred to the terminal and it transfers the generated message to a lower layer. The higher layer processors 2o-25 and 2o-30 may be configured for each terminal and for each service. The higher layer processors 2o-25 and 2o-30 process data generated in a user service, such as FTP or VoIP and transfer the generated data to the multiplexer/demultiplexer 2o-20, or they process data transferred from the multiplexer/demultiplexer 2o-20 and transfer the processed data to a service application of a higher layer. The scheduler 2o-15 allocates a transmission resource to the terminal at proper time in consideration of the terminal buffer state, channel state, and terminal active time, processes the signal transmitted from the terminal to the transceiver, or transmits the signal to the terminal.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the present disclosure has been described with various embodiments, various changes and modifications may be suggested to one skilled in the art. It is intended that the present disclosure encompass such changes and modifications as fall within the scope of the appended claims.

What is claimed is:

1. A method by a master base station in a wireless communication system, the method comprising:
   receiving, from a secondary base station, a first message for requesting a cell global identity (CGI) measurement, the first message including cell identity information on a cell requesting the CGI measurement;
   transmitting, to a terminal, a second message including configuration information for the CGI measurement based on the first message, in case that the CGI measurement on the terminal is not performed;
   transmitting, to the secondary base station, a third message for a measurement report including a CGI corresponding to the cell identity information in case that the measurement report is received from the terminal based on the configuration information; and
   transmitting, to the secondary base station, a fourth message for rejecting the request, in case that a CGI measurement on the terminal is performed.

2. The method of claim 1, wherein the first message further comprises information on a frequency band.

3. The method of claim 2, wherein the second message comprises information received from the secondary base station using the first message.

4. The method of claim 1, wherein the third message includes at least one the cell identity information, or information on a frequency band.

5. A master base station in a wireless communication system, comprising:
   a transceiver; and
   at least one processor coupled to the transceiver and configured to control the transceiver to:
      receive, from a secondary base station, a first message for requesting a cell global identity (CGI) measurement, the first message including cell identity information on a cell requesting the CGI measurement, transmit, to a terminal, a second message for a measurement report including configuration information for the CGI measurement based on the first message, in case that the CGI measurement on the terminal is not performed, transmit, to the secondary base station, a third message including a CGI corresponding to the cell identity information in case that the measurement report is received from the terminal based on the configuration information, and transmit, to the secondary base station, a fourth message for rejecting the request in case that a CGI measurement on the terminal is performed.

6. The master base station of claim 5, wherein the first message further comprises information on a frequency band.

7. The master base station of claim 6, wherein the second message comprises information received from the secondary base station using the first message.

8. The master base station of claim 5, wherein the third message includes at least one the cell identity information, or information on a frequency band.

9. A method by a secondary base station in a wireless communication system, comprising:

transmitting, to a master base station, a first message for requesting a cell global identity (CGI) measurement, the first message including cell identity information on a cell requesting the CGI measurement, wherein a second message including configuration information for the CGI measurement is transmitted based on the first message from the master base station to a terminal, in case that the CGI measurement on the terminal is not performed;

receiving, from the master base station, a third message for a measurement report including a CGI corresponding to the cell identity information in case that the measurement report is received from the terminal based on the configuration information; and receiving, from the master base station, a fourth message for rejecting the request in case that a CGI measurement on the terminal is performed.

10. The method of claim 9, wherein the first message further comprises information on a frequency band.

11. The method of claim 10, wherein the second message comprises information transmitted from the secondary base station using the first message.

12. The method of claim 9, wherein
the third message includes at least one the cell identity information, or information on a frequency band.

13. A secondary base station in a wireless communication system, comprising:

a transceiver; and at least one processor coupled to the transceiver and configured to control the transceiver to:

transmit, to a master base station, a first message for requesting a cell global identity (CGI) measurement, the first message including cell identity information on a cell requesting the CGI measurement, wherein a second message including configuration information for the CGI measurement is transmitted based on the first message from the master base station to a terminal, in case that the CGI measurement on the terminal is not performed, receive, from the master base station, a third message for a measurement report including a CGI corresponding to the cell identity information in case that the measurement report is received from the terminal based on the configuration information, and receive, from the master base station, a fourth message for rejecting the request in case that a CGI measurement on the terminal is performed.

14. The secondary base station of claim 13, wherein the first message further comprises information on a frequency band.

15. The secondary base station of claim 14, wherein the second message comprises information transmitted from the secondary base station using the first message.

16. The secondary base station of claim 13, wherein the third message includes at least one the cell identity information, or information on a frequency band.

* * * * *